(12) United States Patent
Wright

(10) Patent No.: US 12,496,896 B2
(45) Date of Patent: Dec. 16, 2025

(54) LIQUID COOLING SYSTEM FOR AN ELECTRIC VEHICLE

(71) Applicant: KUBOTA CORPORATION, Osaka (JP)

(72) Inventor: Ian Wright, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 181 days.

(21) Appl. No.: 18/379,788

(22) Filed: Oct. 13, 2023

(65) Prior Publication Data

US 2025/0121675 A1 Apr. 17, 2025

(51) Int. Cl.
*B60K 11/04* (2006.01)
*B60K 1/04* (2019.01)
(Continued)

(52) U.S. Cl.
CPC ............. *B60K 11/04* (2013.01); *B60K 1/04* (2013.01); *B60L 53/20* (2019.02);
(Continued)

(58) Field of Classification Search
CPC .... B60K 11/04; B60K 1/04; B60K 2001/005; B60K 2001/006; B60K 11/02; B60K 11/06; B60K 2001/0411; B60K 1/00; B60L 53/20; B60L 2210/10; H01M 10/613; H01M 10/625; H01M 10/6563; H01M 50/204; H01M 50/249; H01M 50/258; H01M 2220/20; H05K 7/20263; H05K 7/20272; H05K 7/20927; B60Y 2200/22; B60Y 2200/41
See application file for complete search history.

(56) References Cited

U.S. PATENT DOCUMENTS

| 2006/0000429 A1* | 1/2006 | Stone | B60K 11/04 165/41 |
| 2007/0215398 A1* | 9/2007 | Ferdows | B60K 1/04 180/68.4 |

(Continued)

FOREIGN PATENT DOCUMENTS

| CN | 102089172 A | * | 6/2011 | ............. B60K 11/04 |
| CN | 202315175 U | * | 7/2012 | ......... Y02T 10/7072 |

(Continued)

OTHER PUBLICATIONS

Boyd, "Liquid Cooling System for an Electric Vehicle", U.S. Appl. No. 18/379,783, filed Oct. 13, 2023.

(Continued)

*Primary Examiner* — Emmanuel E Duke
(74) *Attorney, Agent, or Firm* — Keating & Bennett, LLP

(57) ABSTRACT

A vehicle includes a chassis, a housing to house one or more battery modules, the housing being supported by the chassis, an electric motor to receive electrical power from the one or more battery modules, a liquid cooling system including a radiator to cool a coolant when the coolant flows through the radiator, and one or more coolant pumps connected to the radiator to circulate the coolant, and an air cooling system to cool the one or more battery modules. The air cooling system includes a compressor, a condenser, and one or more evaporator coils, and the radiator and the condenser are located adjacent to each other.

15 Claims, 44 Drawing Sheets

(51) Int. Cl.
*B60L 53/20* (2019.01)
*H01M 10/613* (2014.01)
*H01M 10/625* (2014.01)
*H01M 10/6564* (2014.01)
*H01M 50/204* (2021.01)
*H01M 50/249* (2021.01)
*H01M 50/258* (2021.01)
*H05K 7/20* (2006.01)
*B60K 1/00* (2006.01)

(52) U.S. Cl.
CPC ....... *H01M 10/613* (2015.04); *H01M 10/625* (2015.04); *H01M 10/6564* (2015.04); *H01M 50/204* (2021.01); *H01M 50/249* (2021.01); *H01M 50/258* (2021.01); *H05K 7/20263* (2013.01); *H05K 7/20272* (2013.01); *H05K 7/20927* (2013.01); *B60K 2001/005* (2013.01); *B60K 2001/006* (2013.01); *B60L 2210/10* (2013.01); *H01M 2220/20* (2013.01)

(56) References Cited

U.S. PATENT DOCUMENTS

2020/0317083 A1\* 10/2020 Messina .................... B60P 3/16
2021/0003065 A1\* 1/2021 Cremering ................ F01P 3/18

FOREIGN PATENT DOCUMENTS

| CN | 207902088 U | \* | 9/2018 | |
|---|---|---|---|---|
| CN | 218463442 U | \* | 2/2023 | |
| DE | 4137002 C2 | \* | 12/1996 | ........... F01N 3/0892 |
| RU | 2633109 C1 | \* | 10/2017 | ............. B60K 11/04 |
| WO | WO-2011083976 A2 | \* | 7/2011 | ......... B60H 1/00278 |

OTHER PUBLICATIONS

Boyd, "Liquid Cooling System for an Electric Vehicle", U.S. Appl. No. 18/379,785, filed Oct. 13, 2023.
Official Communication issued in corresponding European Patent Application No. 24203396.7, mailed on Mar. 24, 2025, 9 pages.

\* cited by examiner

RIGHT ←→ LEFT

LIQUID COOLING SYSTEM FOR AN ELECTRIC VEHICLE

BACKGROUND OF THE INVENTION

1. Field of the Invention

The present invention relates to liquid cooling systems and electric vehicles including structures and arrangements which can be used to cool components of the electric vehicle. More specifically, the present invention relates to liquid cooling systems and electric vehicles including structures and arrangements that can be used to circulate coolant through components of the electric vehicle to thereby effectively cool the components of the electric vehicle.

2. Description of the Related Art

Conventional structures and arrangements used to cool components of a vehicle typically only use liquid cooling for engine components and air cooling for operators of the vehicle. However, electric vehicles also require cooling for various additional components, which cooling cannot be provided using conventional liquid cooling and air cooling systems.

SUMMARY OF THE INVENTION

Preferred embodiments of the present invention provide liquid cooling systems and electric vehicles that each include structures and arrangements which can be used to efficiently cool components of the electric vehicle.

A vehicle according to a preferred embodiment of the present invention includes a chassis, a housing to house one or more battery modules, the housing being supported by the chassis, an electric motor to receive electrical power from the one or more battery modules, a liquid cooling system including a radiator to cool a coolant when the coolant flows through the radiator, and one or more coolant pumps connected to the radiator to circulate the coolant, and an air cooling system to cool the one or more battery modules. The air cooling system includes a compressor, a condenser, and one or more evaporator coils, and the radiator and the condenser are located adjacent to each other.

In a preferred embodiment of the present invention, the vehicle further includes a roof supported by the chassis, and the radiator and the condenser are both mounted on the roof.

In a preferred embodiment of the present invention, the condenser is located forward of the radiator in a front-rear direction of the vehicle.

In a preferred embodiment of the present invention, the housing includes a first housing supported by the chassis, and a first side housing and a second side housing arranged on opposing lateral sides of the first housing. Each of the first housing, the first side housing, and the second side housing house a portion of the one or more battery modules, the one or more coolant pumps include a first coolant pump and a second coolant pump, and the first coolant pump and the second coolant pump are both mounted on the second side housing.

In a preferred embodiment of the present invention, the vehicle further includes a cabin frame that is connected to the chassis and supports a roof of the vehicle, and a fluid connection between the radiator and the first coolant pump and a fluid connection between the radiator and the second coolant pump extend through internal portions of the cabin frame.

In a preferred embodiment of the present invention, the first coolant pump and the second coolant pump are located adjacent to one another on a front surface of the second side housing.

In a preferred embodiment of the present invention, the vehicle further includes a roof supported by the chassis, and a blower fan to direct air across the radiator, and the blower fan is mounted on the roof adjacent to the radiator.

In a preferred embodiment of the present invention, the blower fan is located between the condenser and the radiator.

In a preferred embodiment of the present invention, the condenser is located forward of the radiator in a front-rear direction of the vehicle.

In a preferred embodiment of the present invention, the blower fan includes a first blower fan and a second blower fan, the first blower fan is located between the condenser and the radiator, and the second blower fan is located forward of both the condenser and the radiator in a front-rear direction of the vehicle.

In a preferred embodiment of the present invention, the liquid cooling system further includes an inverter to be cooled by the coolant, an electric motor to be cooled by the coolant and connected to the inverter, a heat exchanger through which the coolant and another liquid can circulate, an Onboard Battery Charger with a DC-to-DC converter to be cooled by the coolant, a secondary DC-to-DC converter to be cooled by the coolant, and the one or more coolant pumps include a first coolant pump and a second coolant pump to circulate the coolant.

In a preferred embodiment of the present invention, the first coolant pump, the inverter, and the electric motor are included in a first coolant path circuit, and the second coolant pump, the heat exchanger, the Onboard Battery Charger with the DC-to-DC converter, and the secondary DC-to-DC converter are included in a second coolant path circuit, and the first coolant path circuit and the second coolant path circuit are parallel coolant path circuits.

In a preferred embodiment of the present invention, the vehicle further includes a first coolant path coupling and a second coolant path coupling. The first coolant path coupling is located between the radiator and each of the first coolant pump and the second coolant pump, and the second coolant path coupling is located between the radiator and an end of the first coolant path circuit and between the radiator and an end of the second coolant path circuit.

In a preferred embodiment of the present invention, in the first coolant path circuit, the coolant flows from the first coolant pump to the inverter and from the inverter to the electric motor.

In a preferred embodiment of the present invention, in the second coolant path circuit, the coolant flows from the second coolant pump to the heat exchanger, from the heat exchanger to the Onboard Battery Charger with the DC-to-DC converter, and from the Onboard Battery Charger with the DC-to-DC converter to the secondary DC-to-DC converter.

In a preferred embodiment of the present invention, the another liquid includes a hydraulic fluid, and the heat exchanger removes heat from the another liquid when the coolant and the another liquid are circulated through the heat exchanger.

In a preferred embodiment of the present invention, the liquid cooling system further includes an inverter to be cooled by the coolant, and an electric motor to be cooled by the coolant and connected to the inverter, and the inverter is located forward of the electric motor in a front-rear direction of the vehicle.

In a preferred embodiment of the present invention, the housing includes a first housing supported by the chassis, and a first side housing and a second side housing arranged on opposing lateral sides of the first housing. Each of the first housing, the first side housing, and the second side housing house a portion of the one or more battery modules, and the inverter is mounted to a bottom of the chassis and under the first housing.

In a preferred embodiment of the present invention, the liquid cooling system further includes a heat exchanger through which the coolant and another liquid can circulate, an Onboard Battery Charger with a DC-to-DC converter to be cooled by the coolant, and a secondary DC-to-DC converter to be cooled by the coolant.

In a preferred embodiment of the present invention, the housing includes a first housing supported by the chassis, and a first side housing and a second side housing arranged on opposing lateral sides of the first housing. Each of the first housing, the first side housing, and the second side housing house a portion of the one or more battery modules, and the Onboard Battery Charger with the DC-to-DC converter is mounted to a bottom of the chassis and under the first housing.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
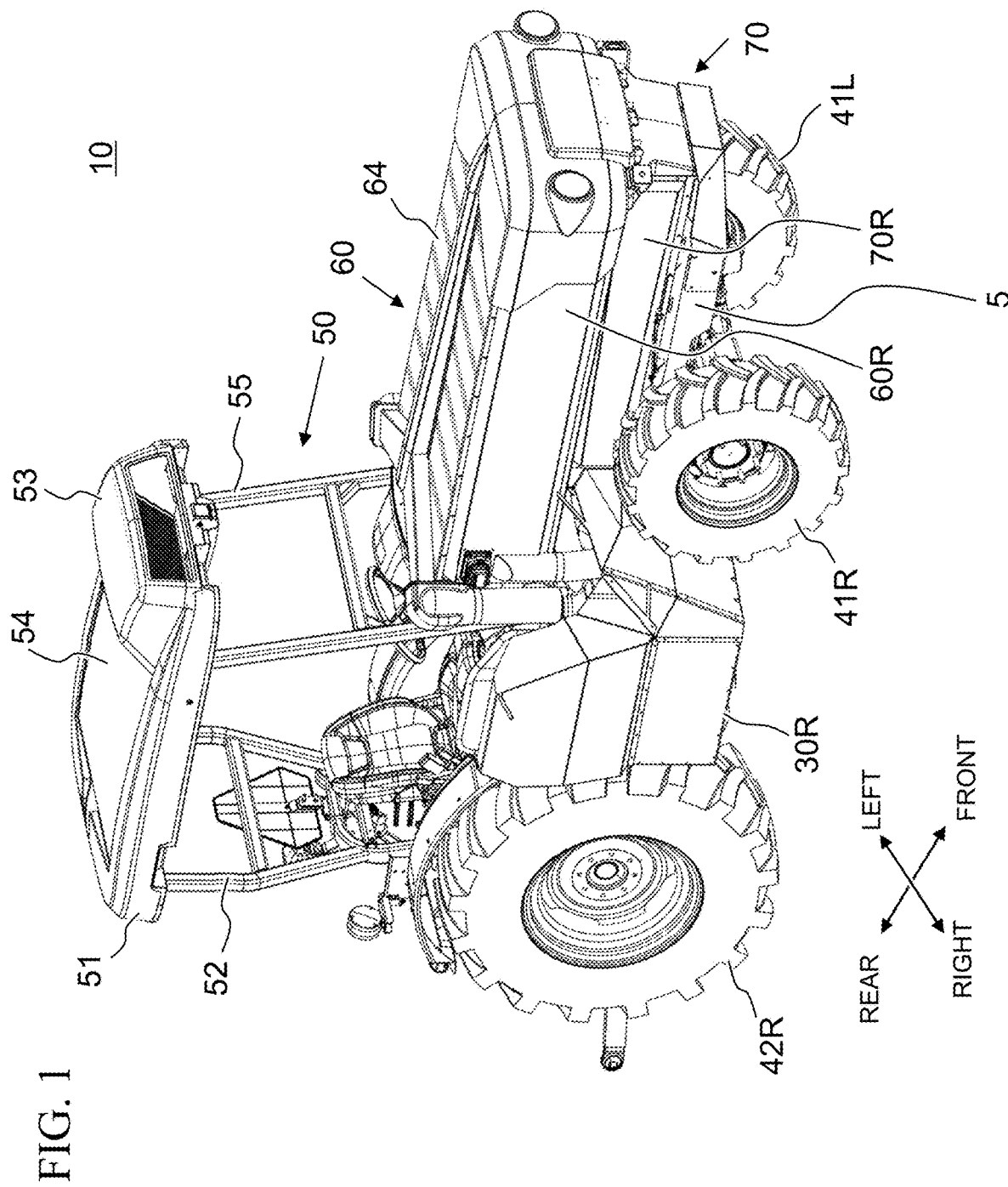
FIG. 1 shows a perspective right-front view of an electric vehicle according to a preferred embodiment of the present invention.
Figure 2:
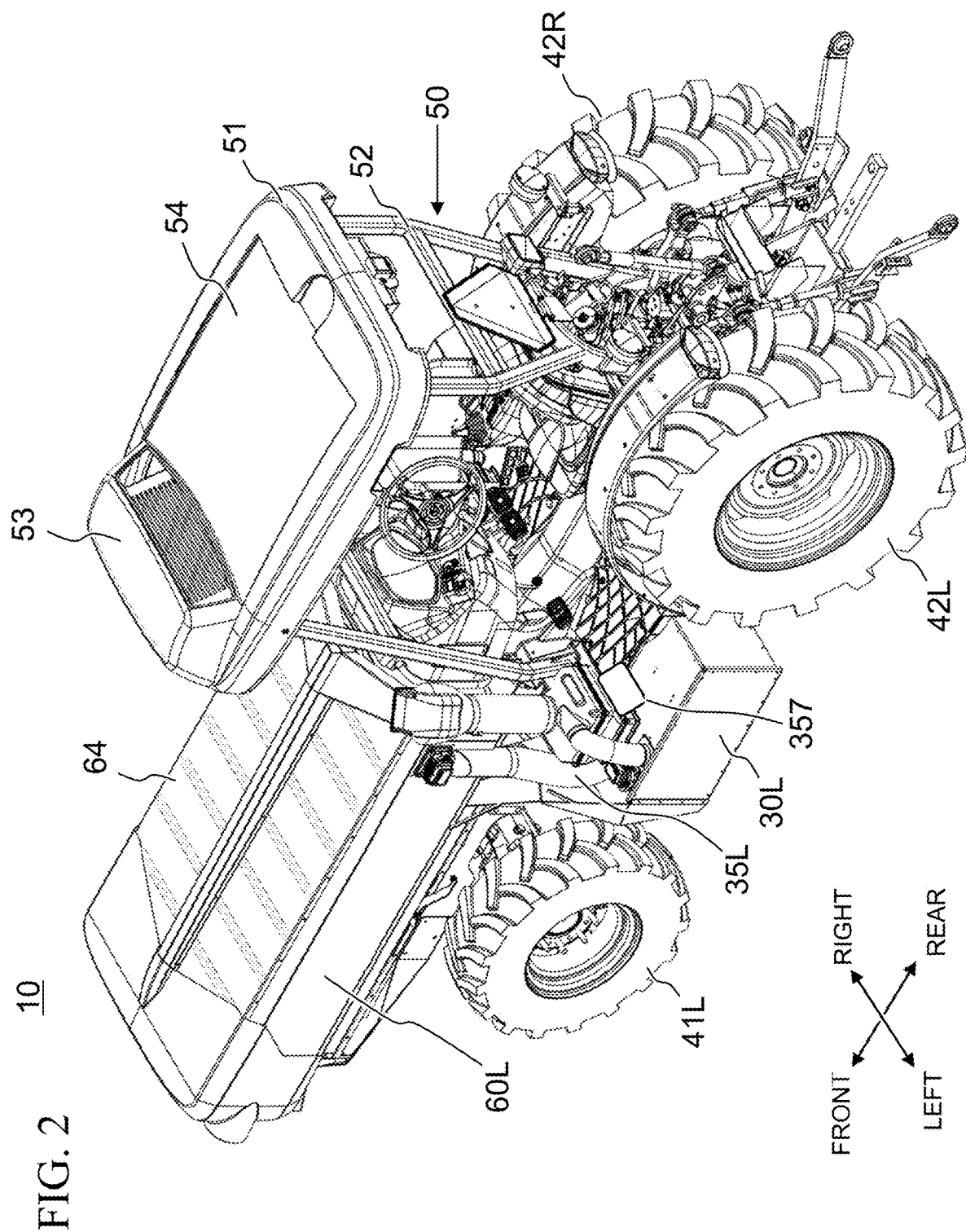
FIG. 2 shows a perspective left-rear view of an electric vehicle according to a preferred embodiment of the present invention.
Figure 3:
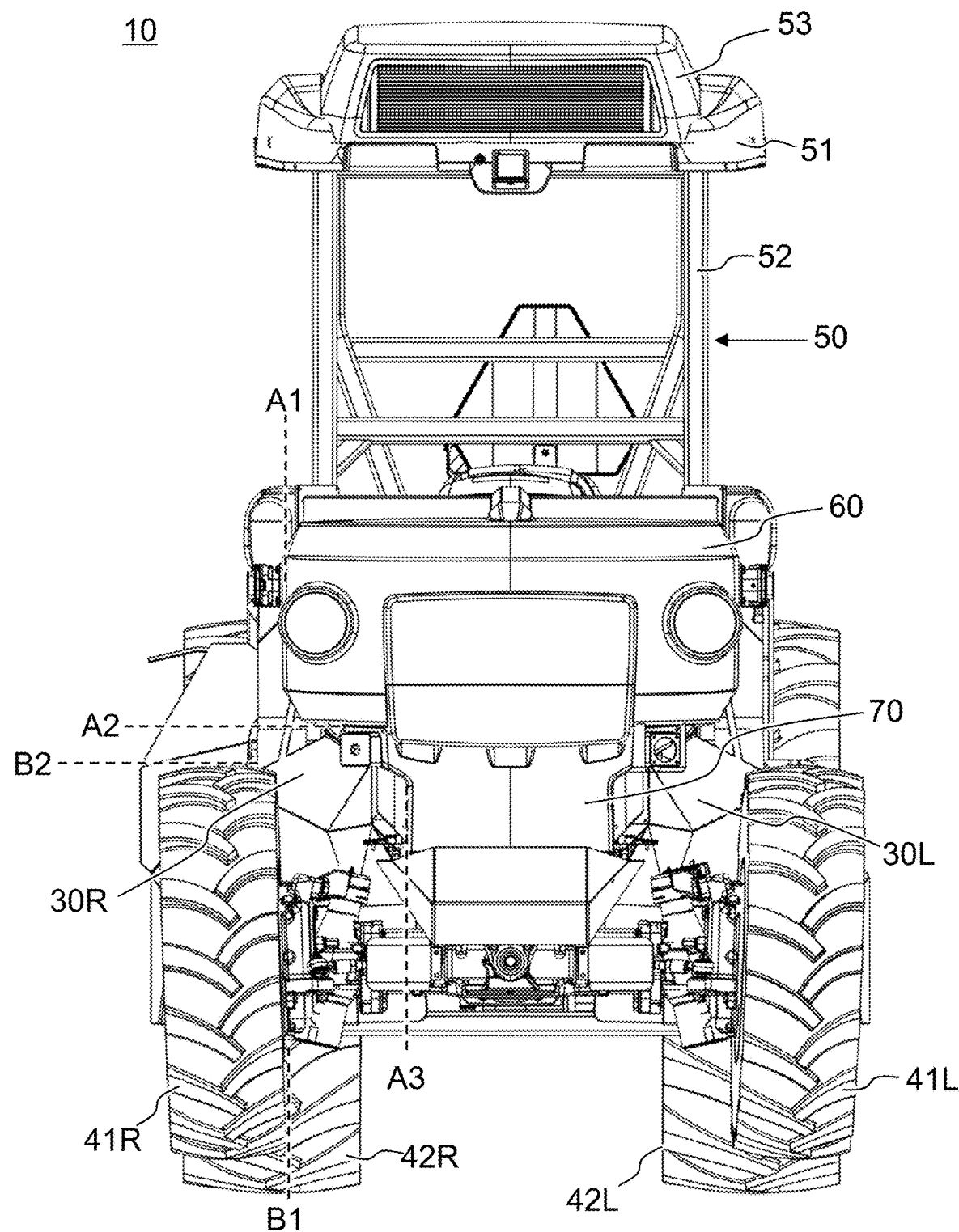
FIG. 3 shows a front view of an electric vehicle according to a preferred embodiment of the present invention.
Figure 4:
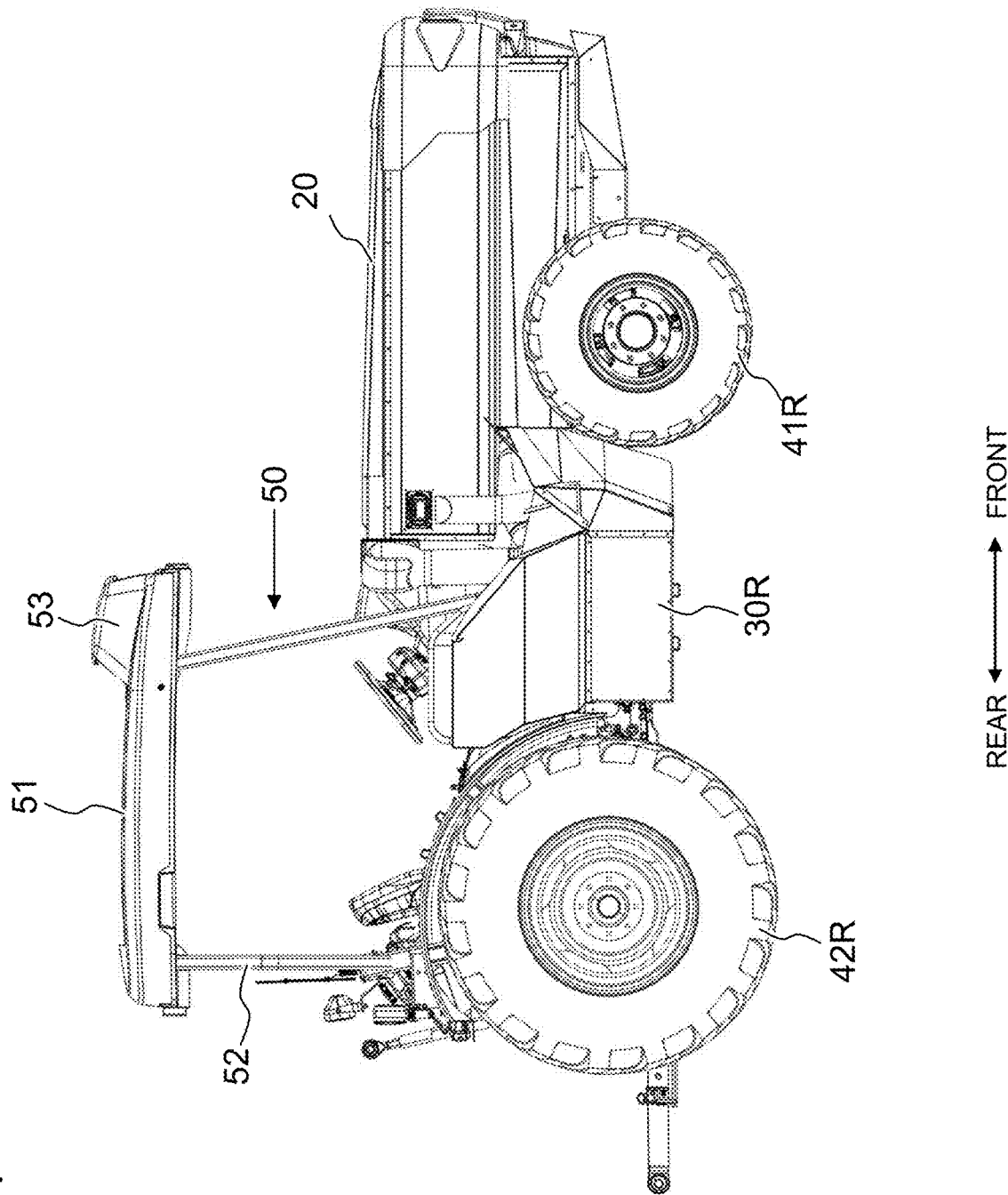
FIG. 4 shows a right side view of an electric vehicle according to a preferred embodiment of the present invention.
Figure 5:
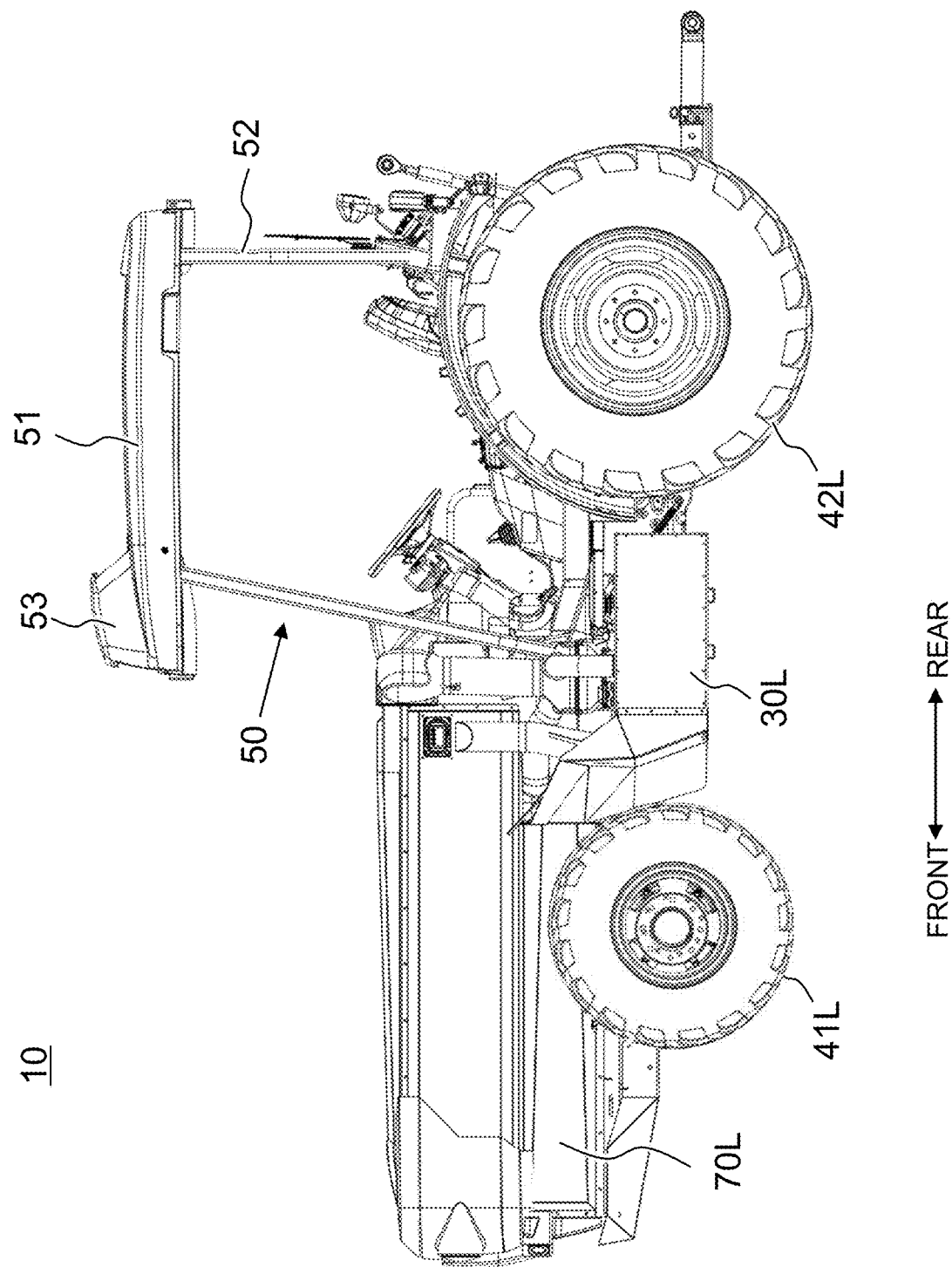
FIG. 5 shows a left side view of an electric vehicle according to a preferred embodiment of the present invention.
Figure 6:
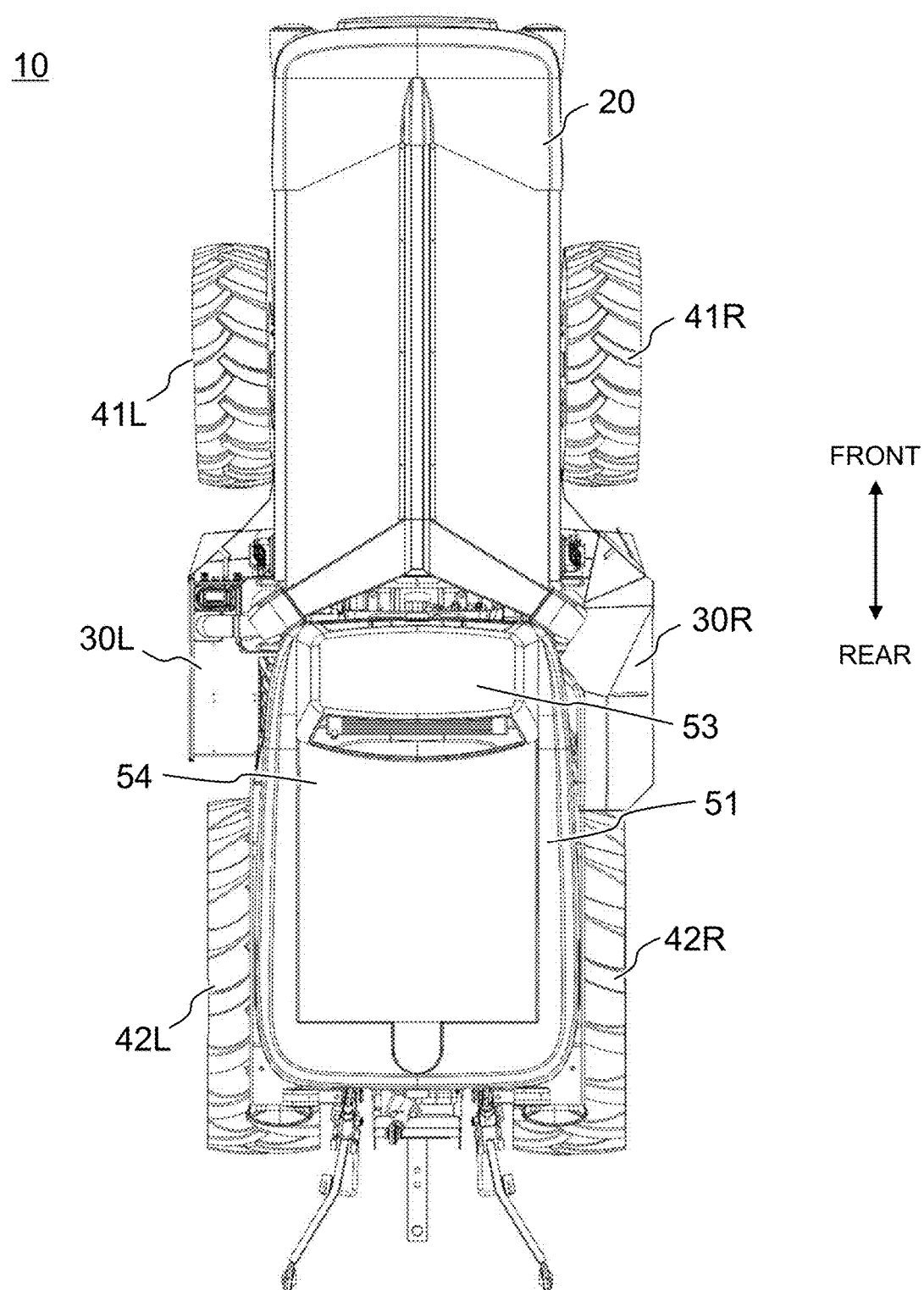
FIG. 6 shows a top view of an electric vehicle according to a preferred embodiment of the present invention.
Figure 7:
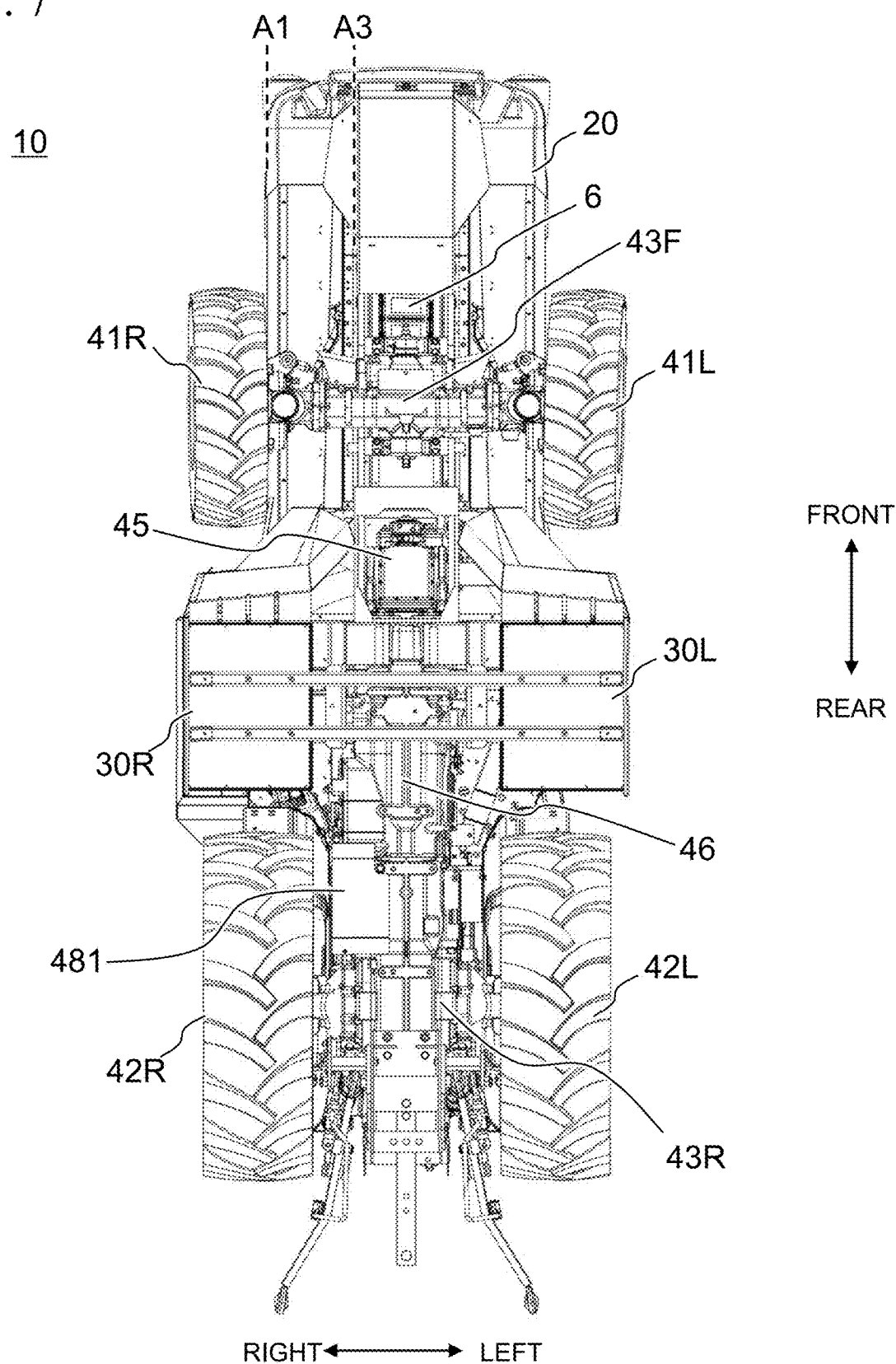
FIG. 7 shows a bottom view of an electric vehicle according to a preferred embodiment of the present invention.

FIGS. 1-7 show a vehicle 10 according to a preferred embodiment of the present invention. FIG. 1 shows an isometric view from a first (front) end of the vehicle 10, and FIG. 2 shows an isometric view from a second (rear) end of the vehicle 10. FIG. 3 shows a front view of the vehicle 10, and FIGS. 4 and 5 show side views of the vehicle 10. FIGS. 6 and 7 show top and bottom views of the vehicle 10, respectively.

In a preferred embodiment, the vehicle 10 includes a chassis 5, a left front wheel 41L and a right front wheel 41R connected by a front axle 43F, and a left rear wheel 42L and a right rear wheel 42R connected by a rear axle 43R. However, vehicles according to the preferred embodiments of the present invention are not specifically limited to four wheels and may include any appropriate number of wheels. For example, vehicles according to preferred embodiments may include only three wheels by removing one of the aforementioned four wheels, a fifth wheel (e.g., an additional wheel provided in line with a pair of one of the aforementioned four wheels, a wheel provided at a front or rear of the vehicle, etc.), six total wheels by including a pair of center wheels, and the like. According to other preferred embodiments of the present invention, vehicles can include one or more tracks or treads in place of one or more of the wheels.

In a preferred embodiment, the vehicle 10 can include a cabin 50 or the like with a roof 51 supported by a cabin frame that is supported by the chassis 5 and includes a rear cabin frame 52 and a forward cabin frame 55. The cabin 50 or the like can include various components, for example, a seat for an operator of the vehicle 10 and vehicle controls such as a steering wheel. However, the vehicle 10 is not limited to including a cabin 50, and can alternatively include a canopy or a Rollover Protection Structure (ROPS).

Figure 8:
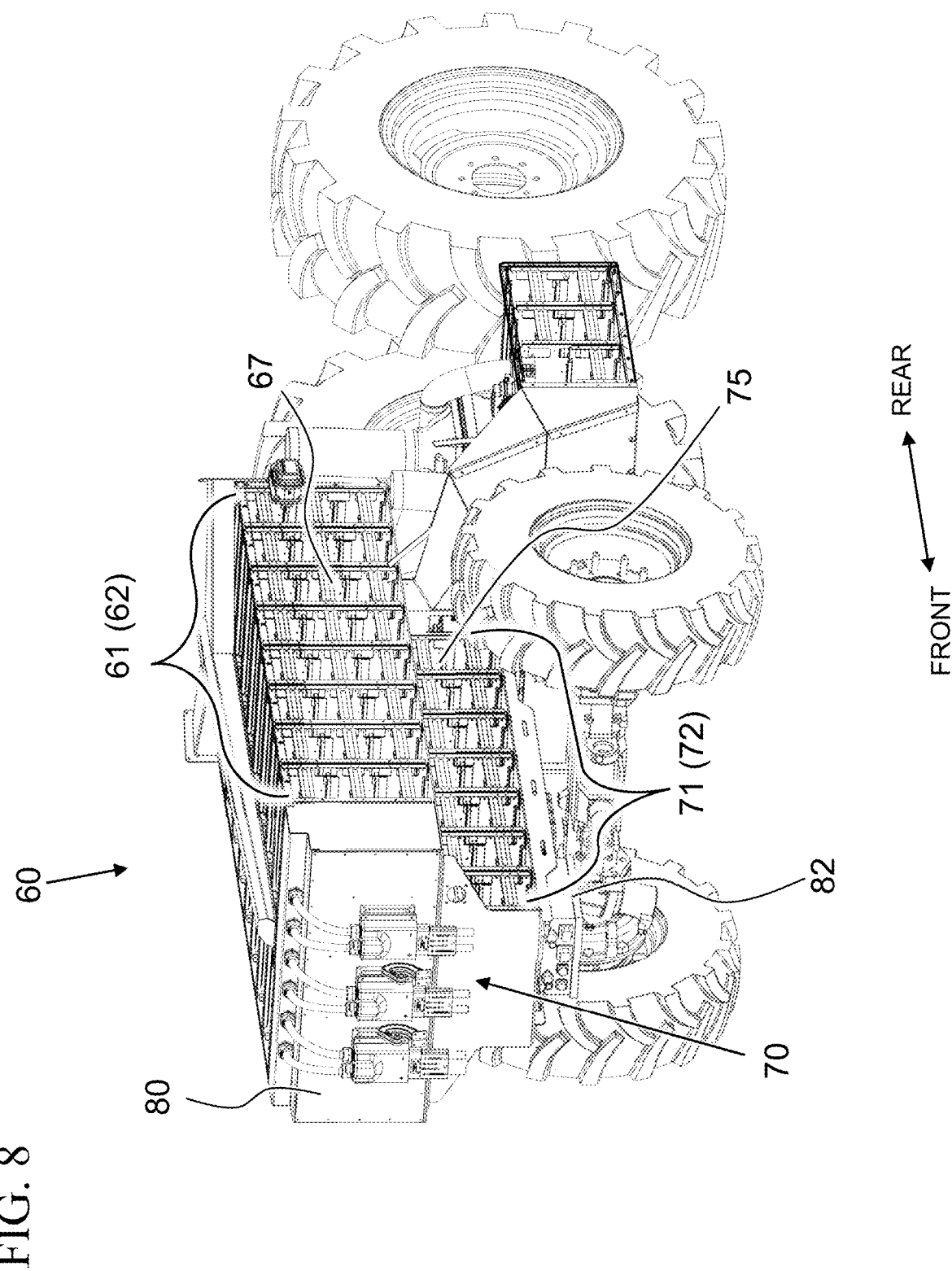
FIG. 8 shows a partially assembled left-front perspective view of an electric vehicle according to a preferred embodiment of the present invention.
Figure 9:
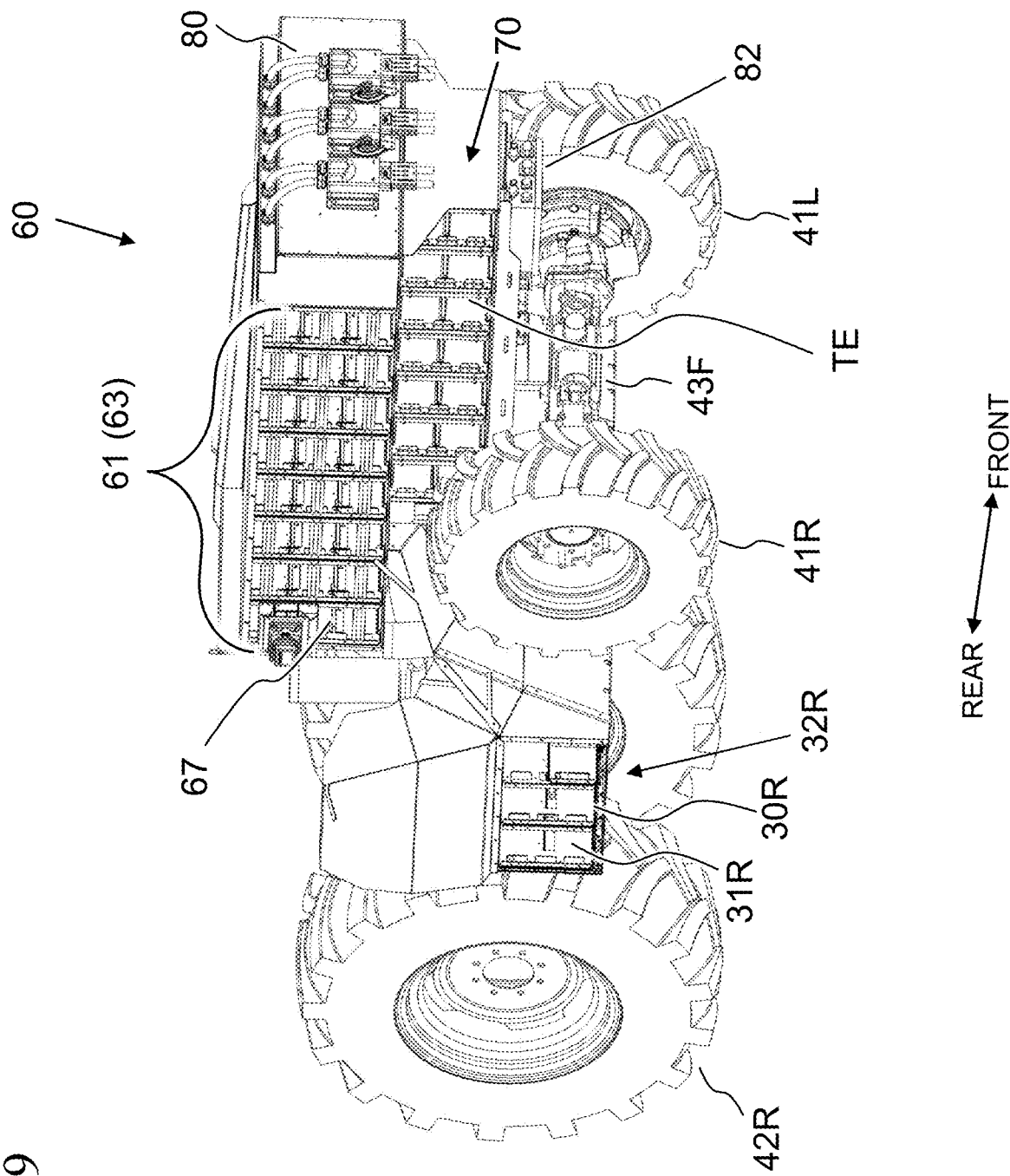
FIG. 9 shows a partially assembled right-front perspective view of an electric vehicle according to a preferred embodiment of the present invention.

In a preferred embodiment of the present invention, the vehicle 10 includes a first battery housing 60 to house a plurality of first battery modules 61, and a second battery housing 70 to house a plurality of second battery modules 71. In a preferred embodiment, the first battery housing 60 and the second battery housing 70 can be supported by the chassis 5. As shown in FIGS. 8 and 9 in which certain structural features have been removed for illustrative purposes, the first battery housing 60 can include a plurality of openings 67 connected to a plurality of sub-housings that each receive a separate one of the plurality of first battery modules 61. Similarly, the second battery housing 70 can include a plurality of openings 75 connected to a plurality of sub-housings that each receive a separate one of the plurality of second battery modules 71.

Figure 13:
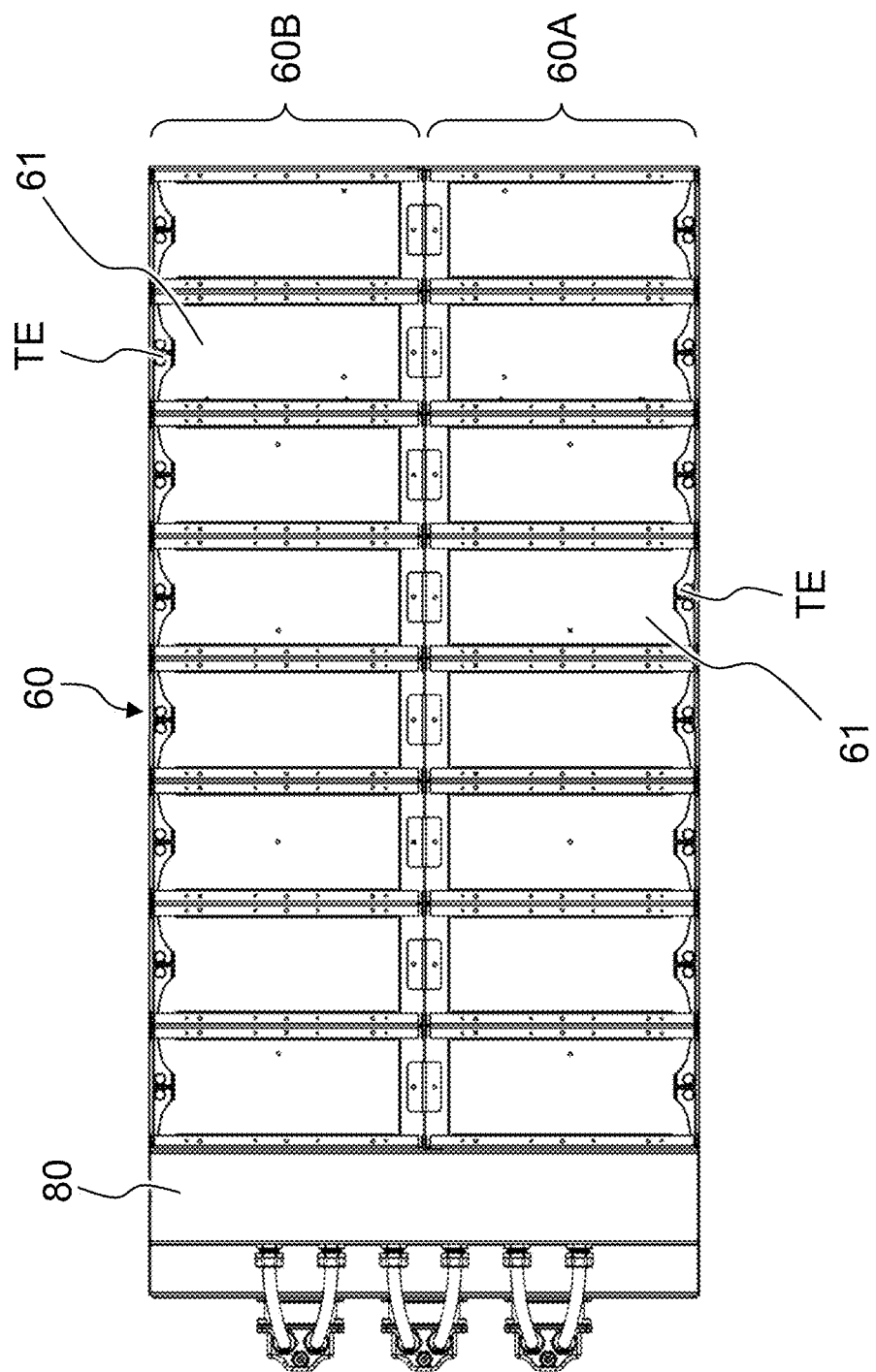
FIG. 13 shows a top view of a first battery housing according to a preferred embodiment of the present invention.
Figure 14:
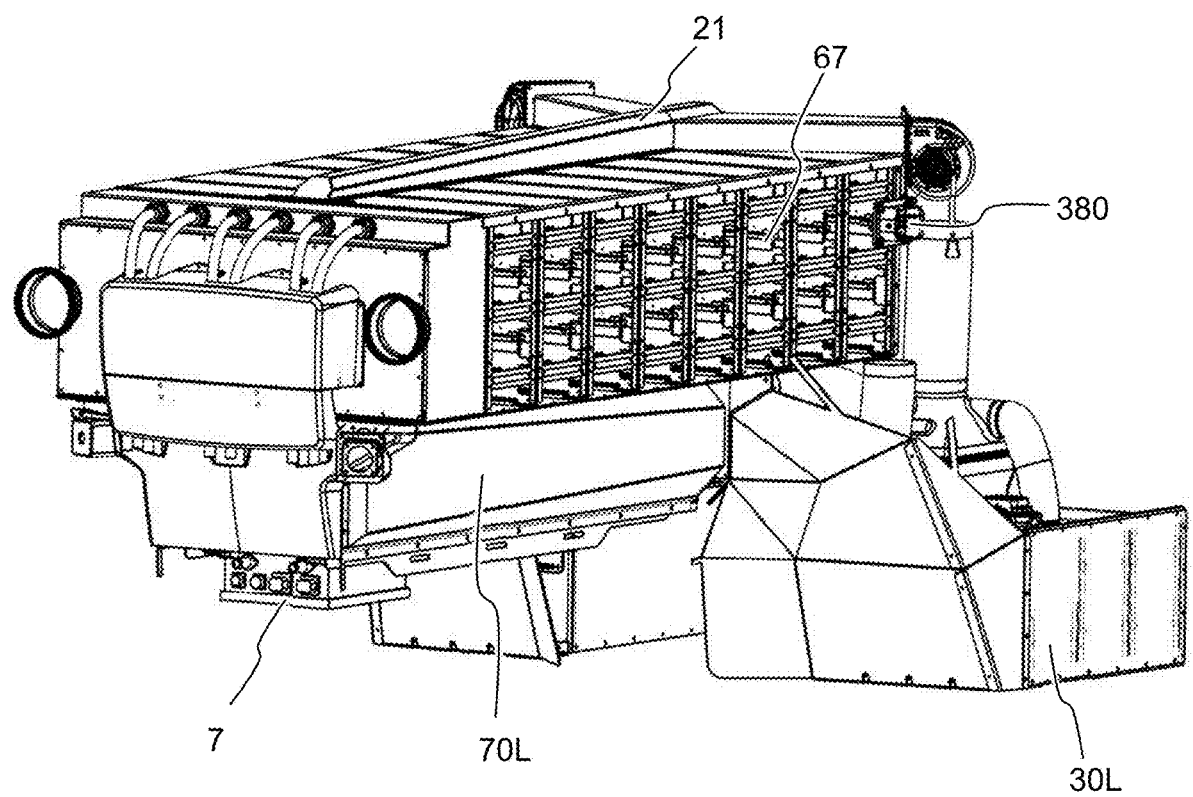
FIG. 14 shows a partially assembled left-front perspective view of an electric vehicle according to a preferred embodiment of the present invention.

In a preferred embodiment, the plurality of openings 67 of the first battery housing 60 and the plurality of openings 75 of the second battery housing 70 face a width/side (left-right) direction of the vehicle 10. The plurality of first battery modules 61 can be aligned, or substantially aligned, in rows and columns in both a vertical direction of the vehicle and the front-rear direction of the vehicle to provide compact storage of the plurality of first battery modules 61 and reduce a space required by the first battery housing 60. Similarly, the plurality of second battery modules 71 can be aligned, or substantially aligned, in rows and columns in both a vertical direction of the vehicle and the front-rear direction of the vehicle to provide compact storage of the plurality of second battery modules 71 and reduce a space required by the second battery housing 70. In a preferred embodiment, the terminal ends of each of the plurality of first battery modules 61 and the plurality of second battery modules 71 can face a width/side (left-right) direction of the vehicle 10 when housed in the respective first battery housing 60 and second battery housing 70, as shown in FIGS. 9 and 13, for example.

Figure 11:
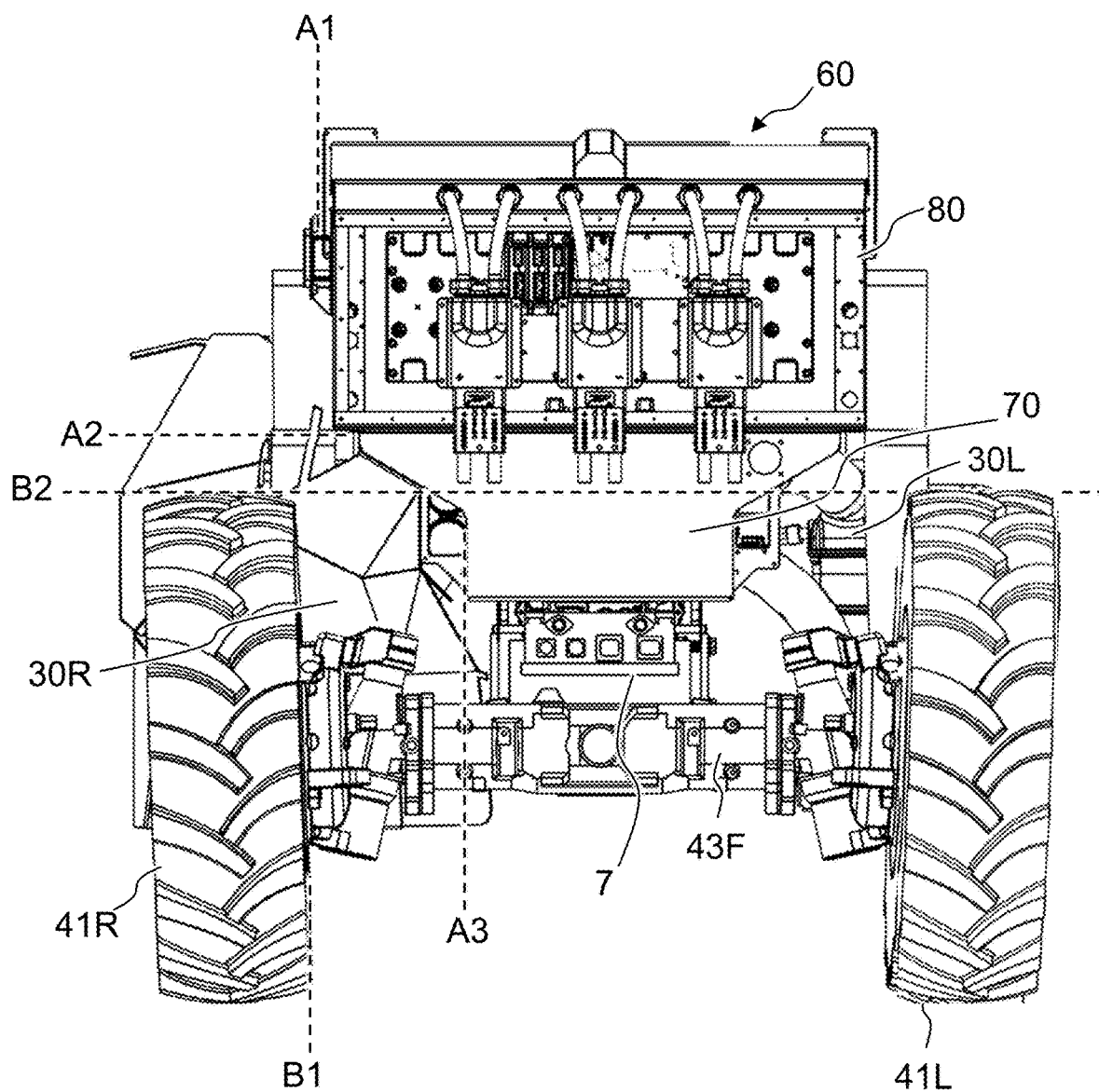
FIG. 11 shows a partially assembled front view of an electric vehicle according to a preferred embodiment of the present invention.

In a preferred embodiment, the second battery housing 70 is attached to a bottom surface of the first battery housing 60, and the first battery housing 60 and the second battery housing 70 can be arranged in a "T" shape, as shown in FIG. 11, for example. In other words, the first battery housing 60 can have a width that is greater than a width of the second battery housing 70 in a width/side (left-right) direction of the vehicle, such that the first battery housing 60 extends beyond the second battery housing 70 in the width/side (left-right) direction of the vehicle. The structure of the first battery housing 60 overhanging/extending farther than the second battery housing 70 in the width direction of the vehicle can provide a space for the left front wheel 41L and the right front wheel 41R to operate and turn.

As shown in FIGS. 3 and 11, an outer edge A1 of the first battery housing 60 can be located inside of an inner edge B1 of each of the front wheels 41R and 41L in the width direction of the vehicle. Furthermore, a lower edge A2 of the first battery housing 60 can be spaced away by a predetermined distance from an upper edge B2 of each of the front wheels 41R and 41L. A line connecting the upper edge B2 of the left front wheel 41L and the upper edge B2 of the right front wheel 41R can pass through a center portion of the second battery housing 70. In other words, in a vertical direction of the vehicle 10, the line connecting the upper edge B2 of each of the front wheels 41R and 41L may be located between an upper surface of the second battery housing 70 and a lower surface of the second battery housing 70 in the vertical direction of the vehicle.

Alternatively, the outer edge A1 of the first battery housing 60 can be aligned or substantially aligned with the inner edge B1 of each of the front wheels 41R and 41L, or the outer edge A1 of the first battery housing 60 can be located outside of the inner edge B1 of each of the front wheels 41R and 41L in the width direction of the vehicle.

Figure 10:
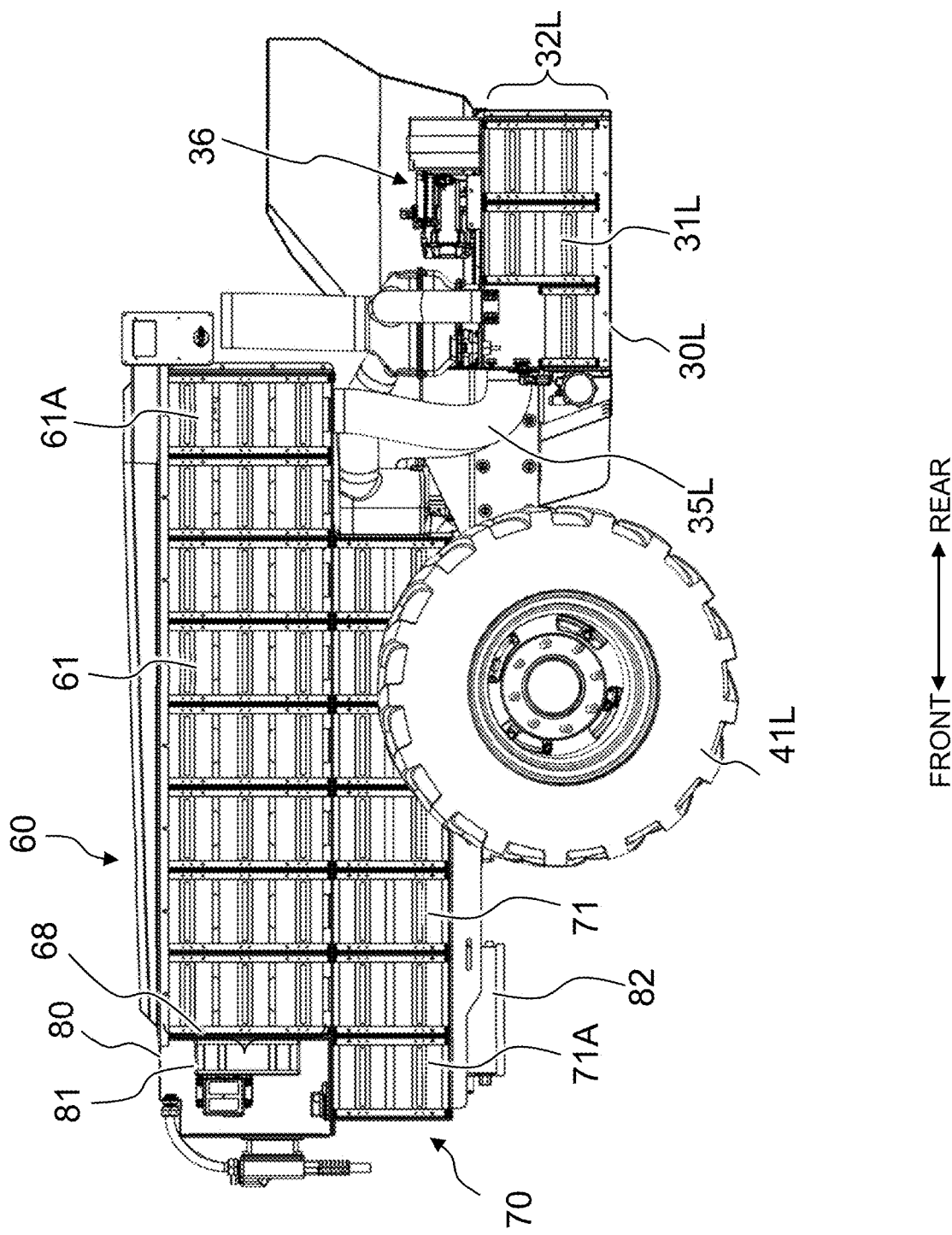
FIG. 10 shows a partially assembled left side view of an electric vehicle according to a preferred embodiment of the present invention.

In a preferred embodiment of the present invention, the first battery housing 60 and the second battery housing 70 can be offset in a direction from the first (front) end of the vehicle to the second (rear) end of the vehicle, as shown in FIG. 10, for example. For example, the second battery housing 70 can extend closer to the first (front) end of the vehicle 10 than the first battery housing 60. As an example, the second battery housing 70 can include at least one battery module 71A that is not overlapped by the first battery housing 60 in a vertical direction. A power distribution unit (PDU) housing 80 (e.g., an additional housing) to house one or more electrical components including a power distribution unit (PDU) 81 can be provided in a space defined by the forward offset of the second battery housing 70 with respect to the first battery housing 60, as shown in FIGS. 8-11, for example. As shown in FIG. 10, for example, the power distribution unit (PDU) 81 is housed on the power distribution unit (PDU) housing 80 and is attached to a front surface 68 of the first battery housing 60.

In a preferred embodiment, the first battery housing 60 can extend closer to the second (rear) end of the vehicle than the second battery housing 70. As an example, the first battery housing 60 can include at least one battery module 61A that is not overlapped by the second battery housing 70 in a vertical direction, as shown in FIG. 10, for example. Portions of an air cooling system discussed in more detail below can be provided in a space defined by the rearward offset of the first battery housing 60 with respect to the second battery housing 70.

Figure 12:
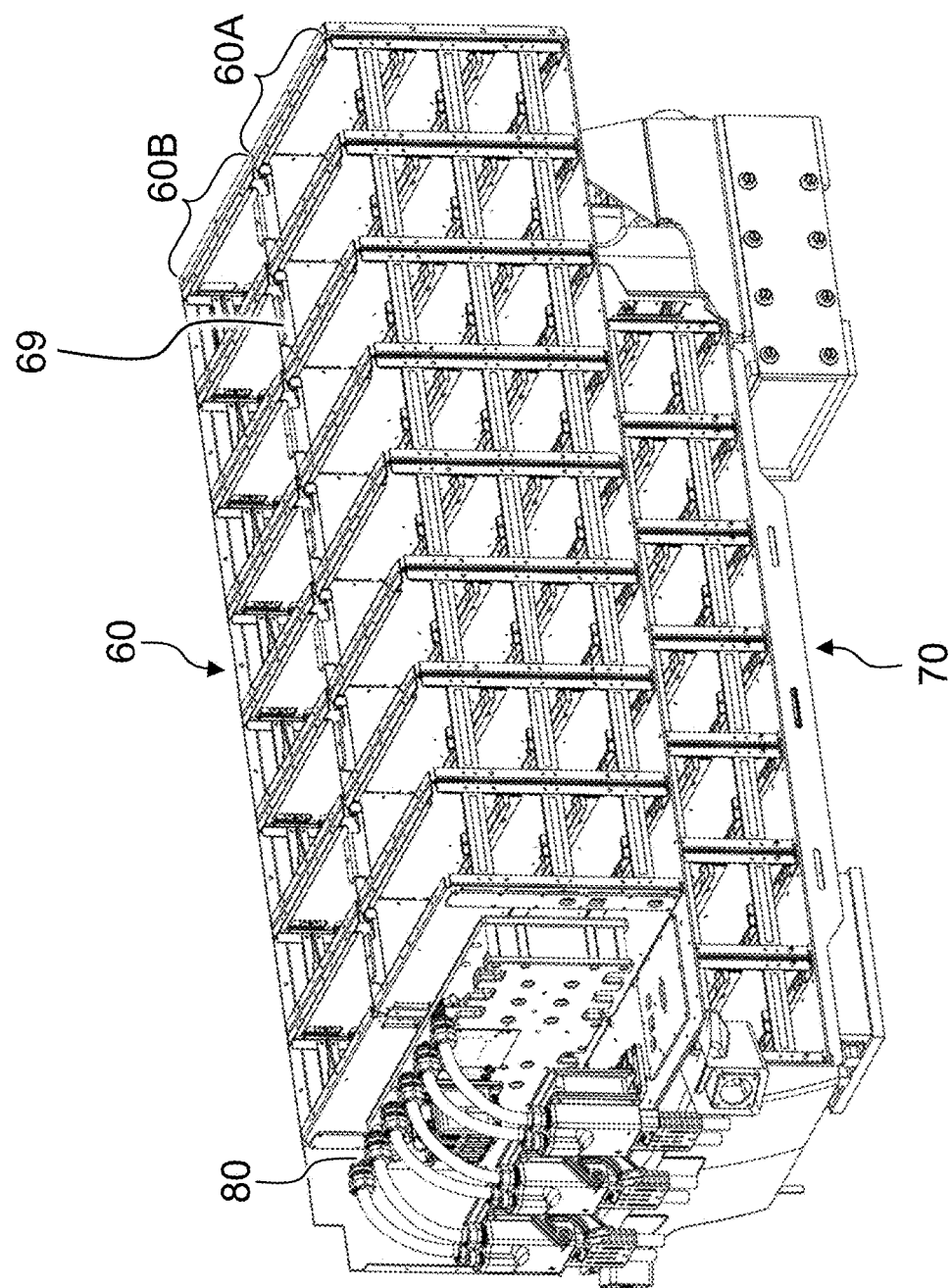
FIG. 12 shows a perspective view of a first battery housing and a second battery housing with their respective battery modules removed for clarity according to a preferred embodiment of the present invention.
Figure 19:
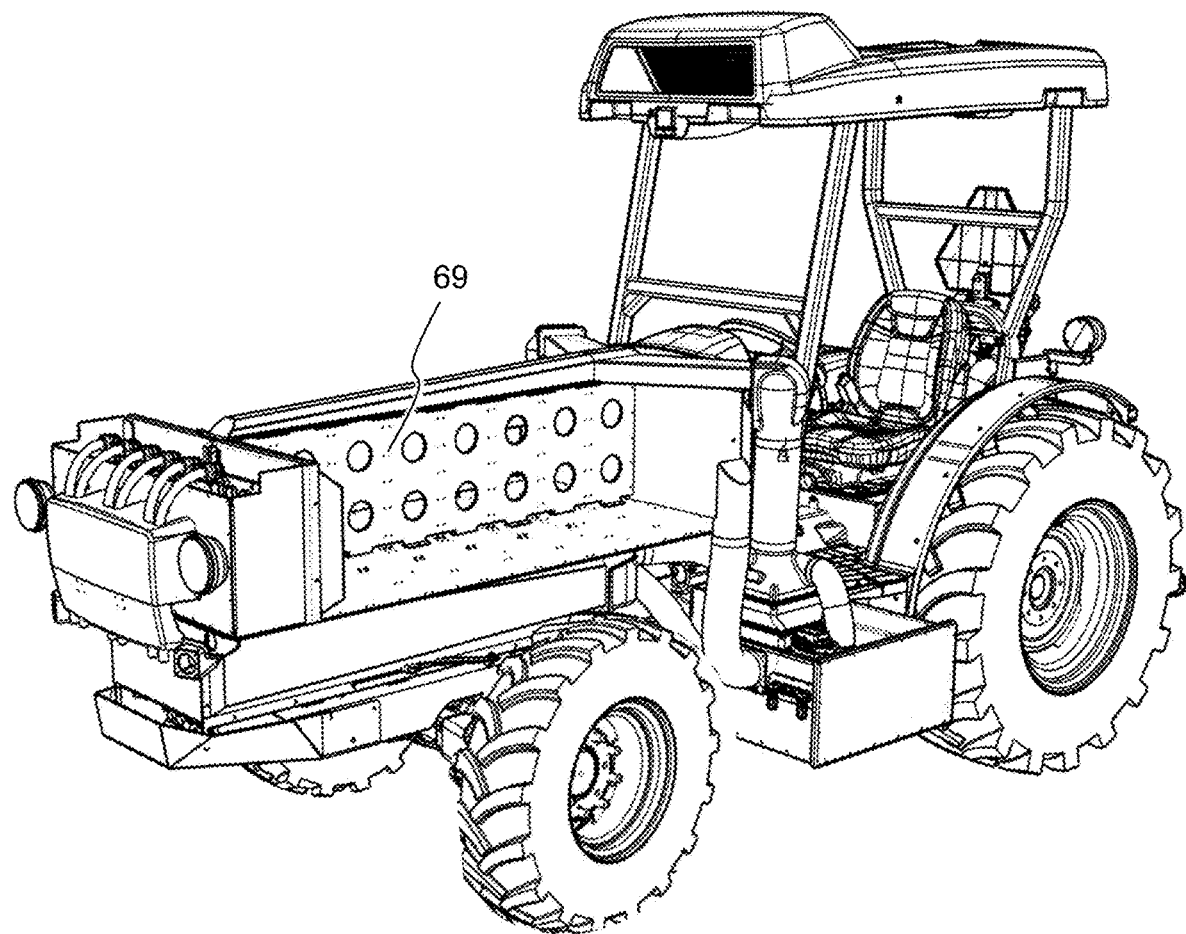
FIG. 19 shows a partially assembled left-front perspective view of an electric vehicle according to a preferred embodiment of the present invention.

FIG. 12 shows a perspective view of the first battery housing 60 and the second battery housing 70 with their respective battery modules 61 and 71 removed for clarity. A portion of the PDU housing 80 is also removed from the view shown in FIG. 12. FIG. 13 shows a top view of the first battery housing 60. As shown in FIGS. 12 and 13, the first battery housing 60 can include a first portion 60A (e.g., a left portion) and a second portion 60B (e.g., a right portion). For example, the first battery housing 60 can be divided into the first portion 60A and the second portion 60B by a vertical partition wall 69. The vertical partition wall 69 is shown, for example, in FIGS. 19-21, in which portions of the first portion 60A and the second portion 60B of the first battery housing 60 have been removed to better illustrate the vertical partition wall 69.

In a preferred embodiment, as shown in FIGS. 8 and 9, the first portion 60A of the first battery housing 60 can house a first battery module bank 62 including a first portion of the plurality of first battery modules 61, and the second portion 60B of the first battery housing 60 can house a second battery module bank 63 including a second portion of the plurality of first battery modules 61. In a preferred embodiment, each of the first battery module bank 62 and the second battery module bank 63 can be provided in rows and columns. As an example, each of the first battery module bank 62 and the second battery module bank 63 can include three rows and eight columns of the plurality of first battery modules 61, for a total of twenty-four of the first battery modules 61 provided in the first battery module bank 62 housed in the first portion 60A, and twenty-four of the first battery modules 61 provided in the second battery module bank 63 housed in the second portion 60B.

Figure 15:
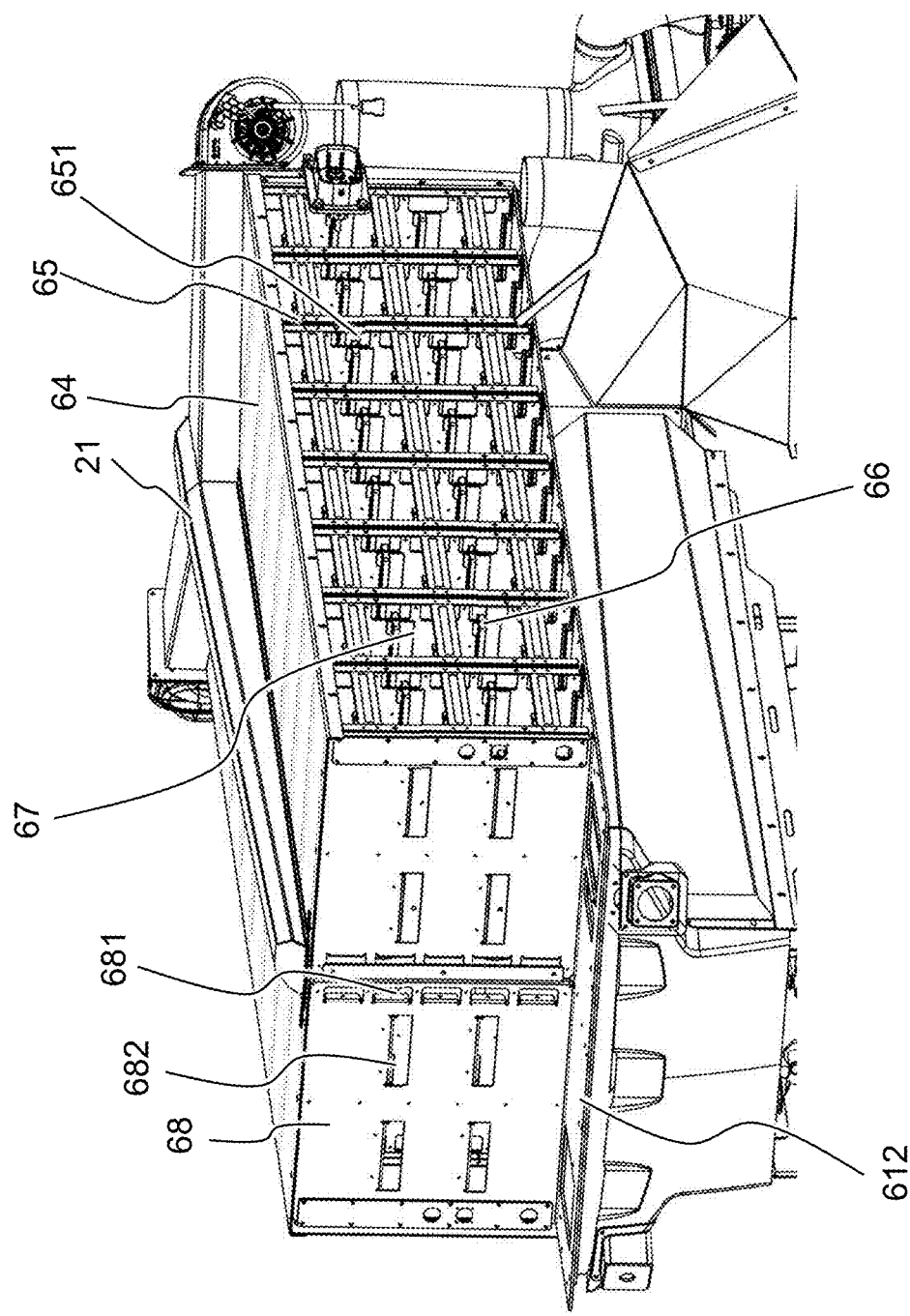
FIG. 15 shows a partially assembled left-front perspective view of an electric vehicle according to a preferred embodiment of the present invention.
Figure 16:
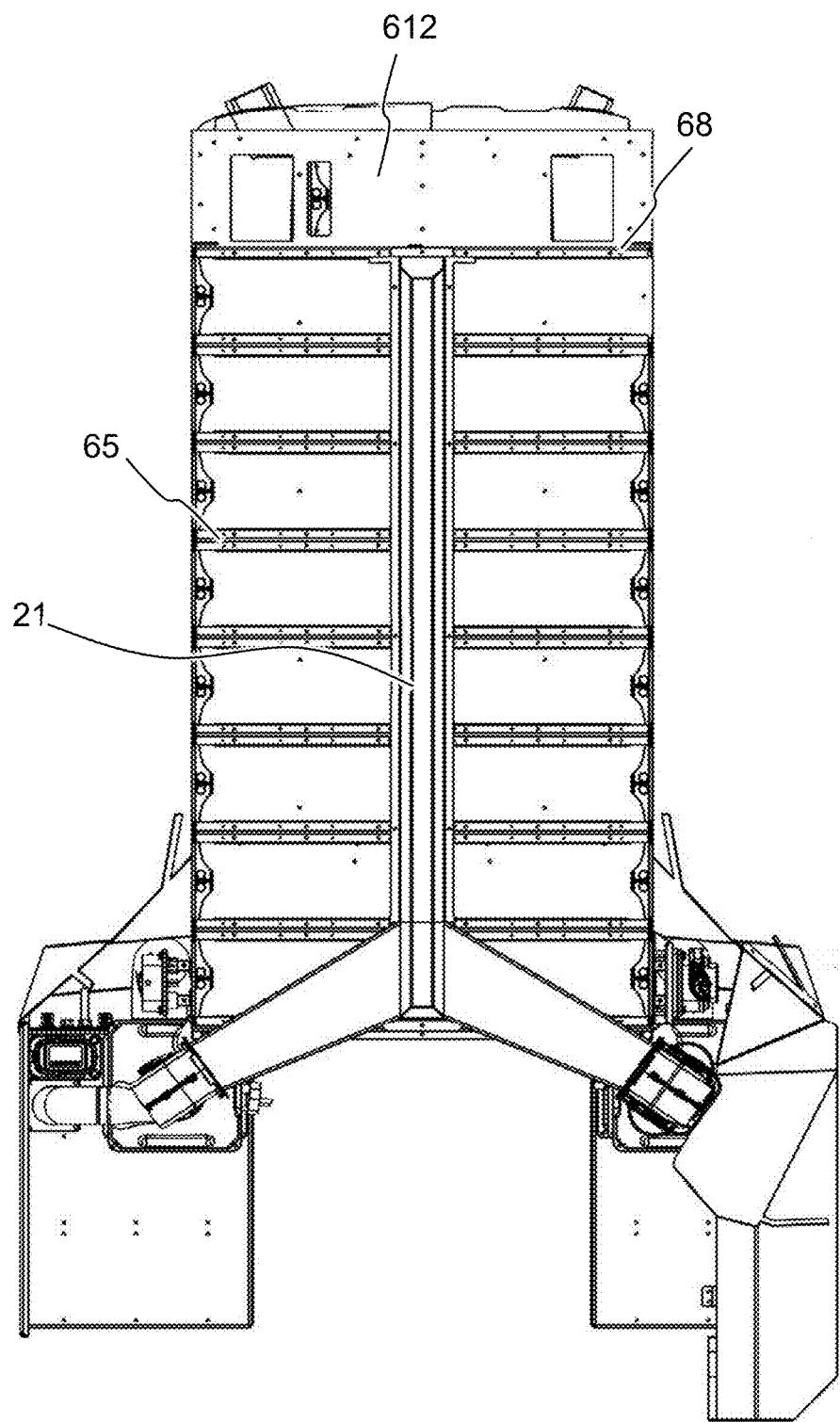
FIG. 16 shows a partially assembled top view of an electric vehicle according to a preferred embodiment of the present invention.
Figure 17:
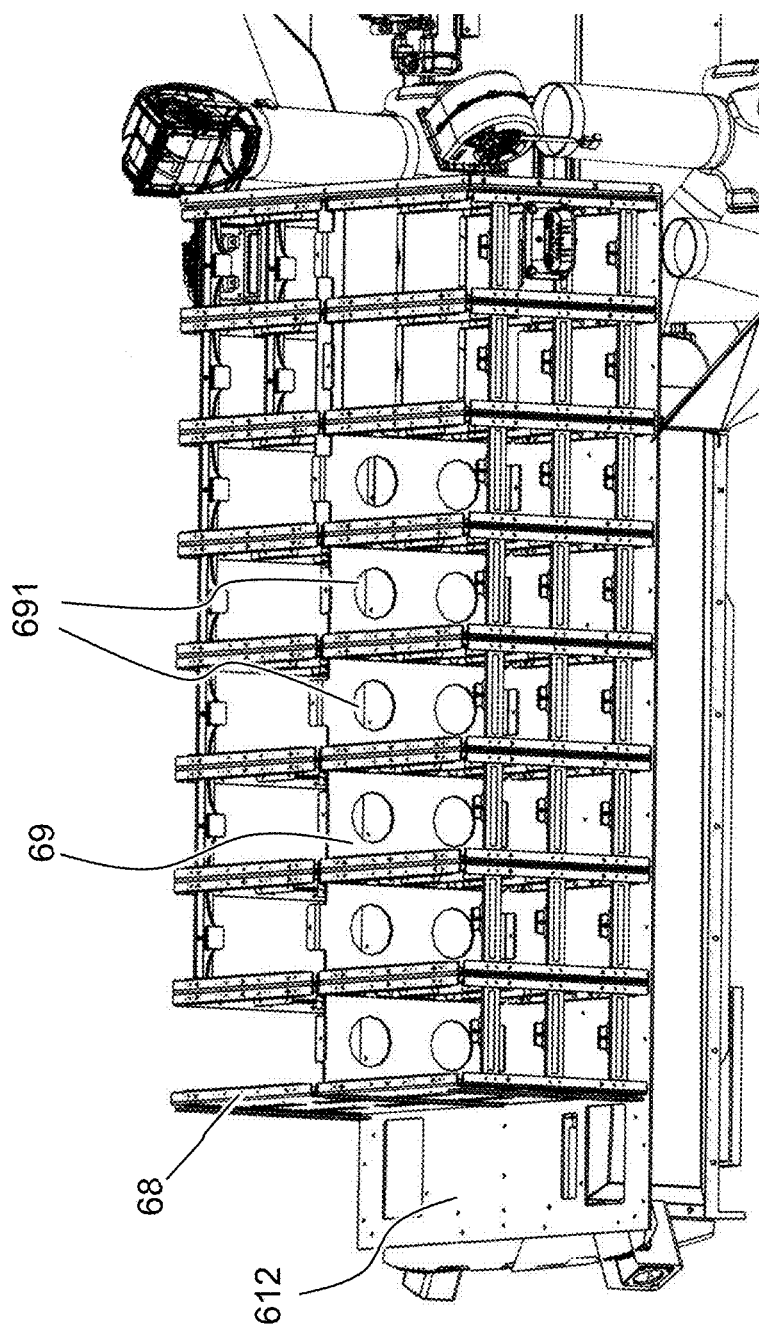
FIG. 17 shows a partially assembled left perspective view of an electric vehicle according to a preferred embodiment of the present invention.
Figure 18:
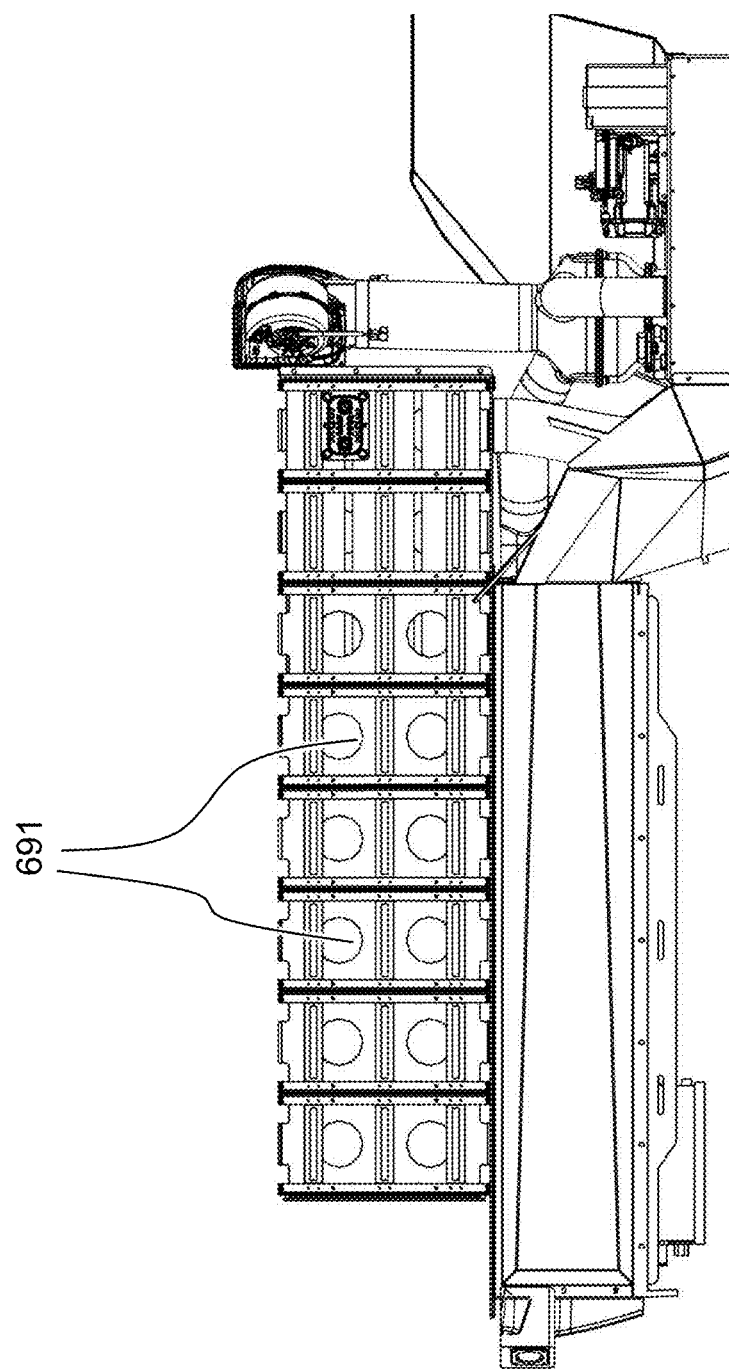
FIG. 18 shows a partially assembled left side view of an electric vehicle according to a preferred embodiment of the present invention.

As shown, for example, in FIGS. 1 and 2, the first battery housing 60 preferably includes a first side cover 60L (a left side cover) which covers a first side of the first battery housing 60, a second side cover 60R (a right side cover) which covers a second side of the first battery housing 60, and an upper cover 64 which covers an upper side of the first battery housing 60. As shown in FIGS. 15 and 16, the first battery housing 60 further includes cross walls 65 that delineate the vertical columns in which the first battery modules 61 are arrayed, mounting bars 66 that support the first battery modules 61, the openings 67 through which the first battery modules 61 are inserted, a front surface 68 that defines a forwardmost portion of the first battery housing 60, and a base plate 612.

Figure 20:
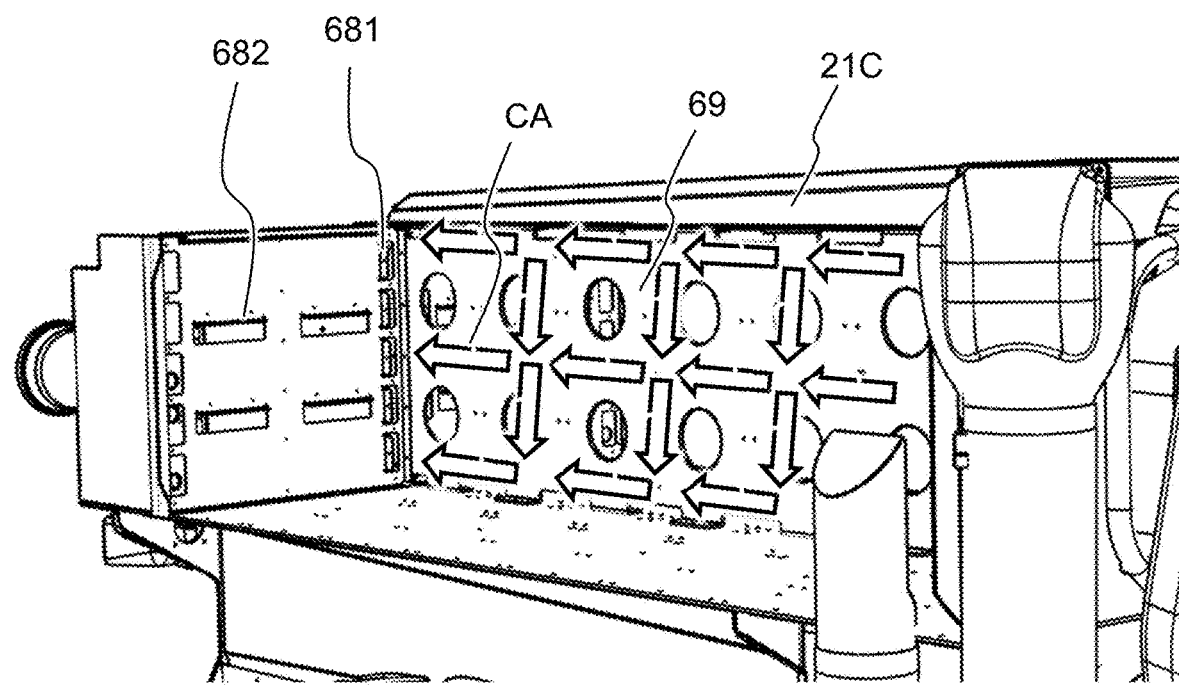
FIG. 20 shows a partially assembled left-rear perspective view of an electric vehicle according to a preferred embodiment of the present invention.
Figure 21:
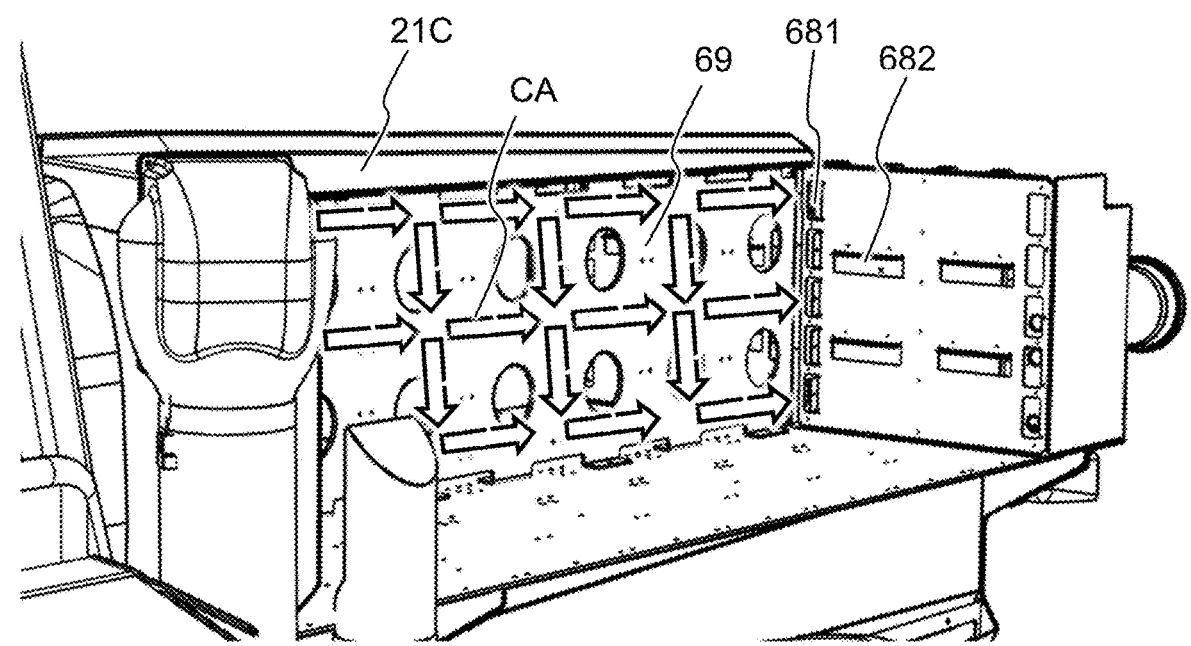
FIG. 21 shows a partially assembled right-rear perspective view of an electric vehicle according to a preferred embodiment of the present invention.

As shown in FIGS. 15, 20, and 21, the front surface 68 preferably includes inner ventilation holes 681 and intermediate ventilation holes 682 that permit a flow of air between the first battery housing 60 and the PDU housing 80, discussed in more detail below. As shown in FIG. 15, the cross walls 65 preferably include side ventilation holes 651 that permit a flow of air between adjacent first battery modules 61 arrayed in a front to rear direction of the vehicle, also discussed in more detail below. As shown in FIGS. 17-21, the vertical partition wall 69 preferably includes center partition holes 691.

In a preferred embodiment, the second battery housing 70 houses a third battery module bank 72 including the plurality of second battery modules 71, as shown in FIG. 8, for example. The third battery module bank 72 can be provided in rows and columns. As an example, the third battery module bank 72 can include two rows and seven columns of the second battery modules 71, for a total of fourteen of the second battery modules 71 provided in the third battery module bank 72 housed in the second battery housing 70.

In a preferred embodiment of the present invention, the second battery housing 70 includes a first side cover 70L (a left side cover), a second side cover 70R (a right side cover), and a base plate 74, as shown in FIGS. 1, 5, and 22-24, for example. In a preferred embodiment, the base plate 612 of the first battery housing 60 defines and functions as an upper cover of the second battery housing 70.

Figure 22:
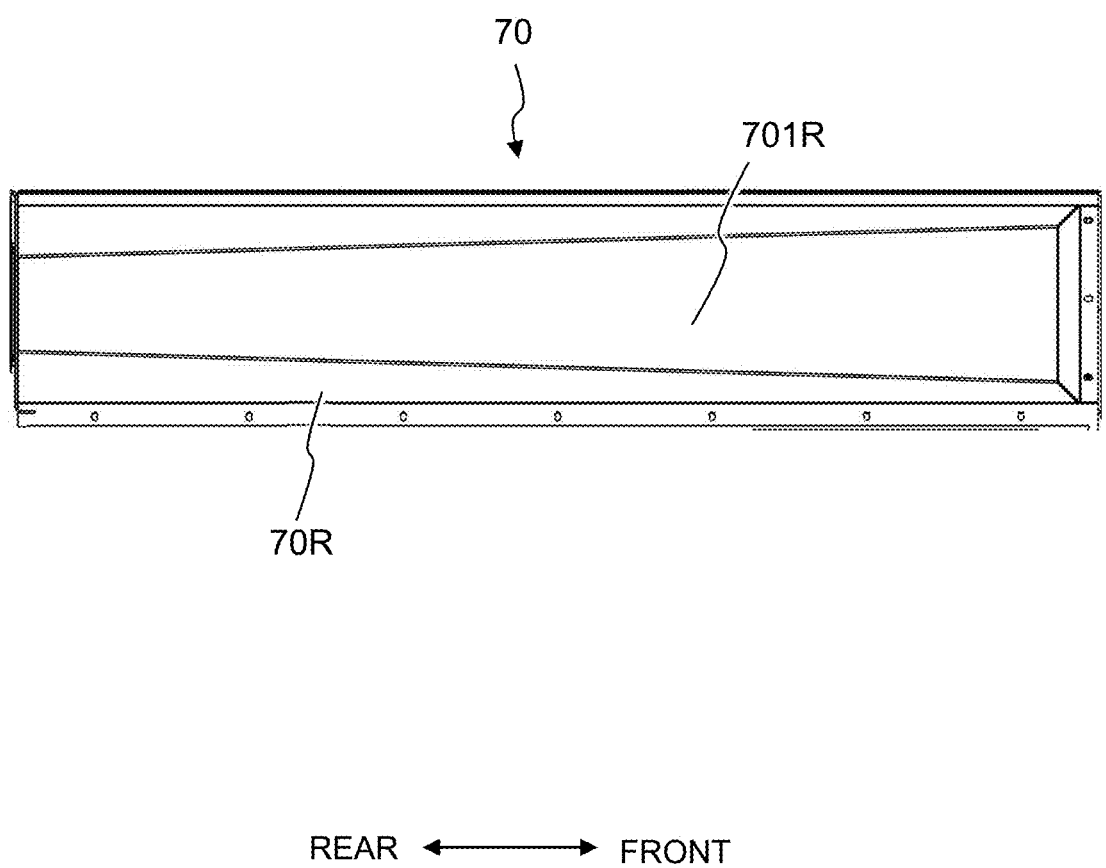
FIG. 22 is a right side view of a second battery housing according to a preferred embodiment of the present invention.
Figure 23:
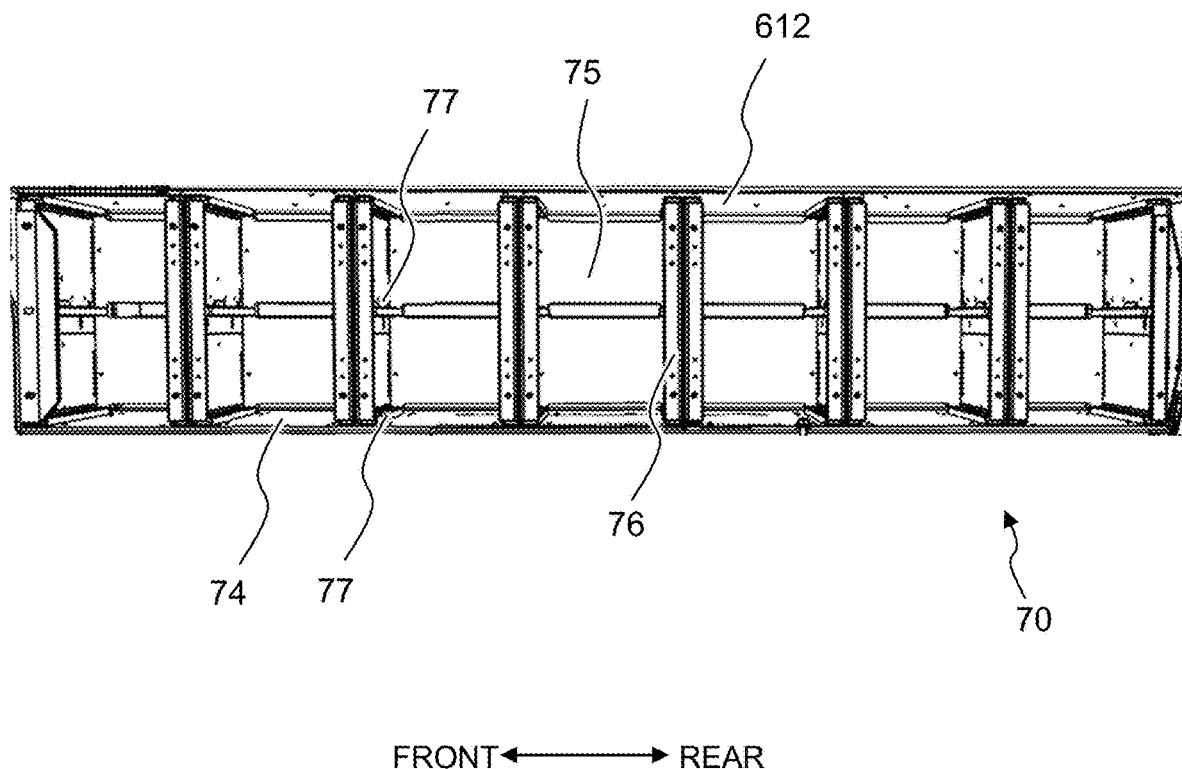
FIG. 23 is a left side view of a second battery housing with a first side cover and the second battery modules removed for clarity according to a preferred embodiment of the present invention.
Figure 24:
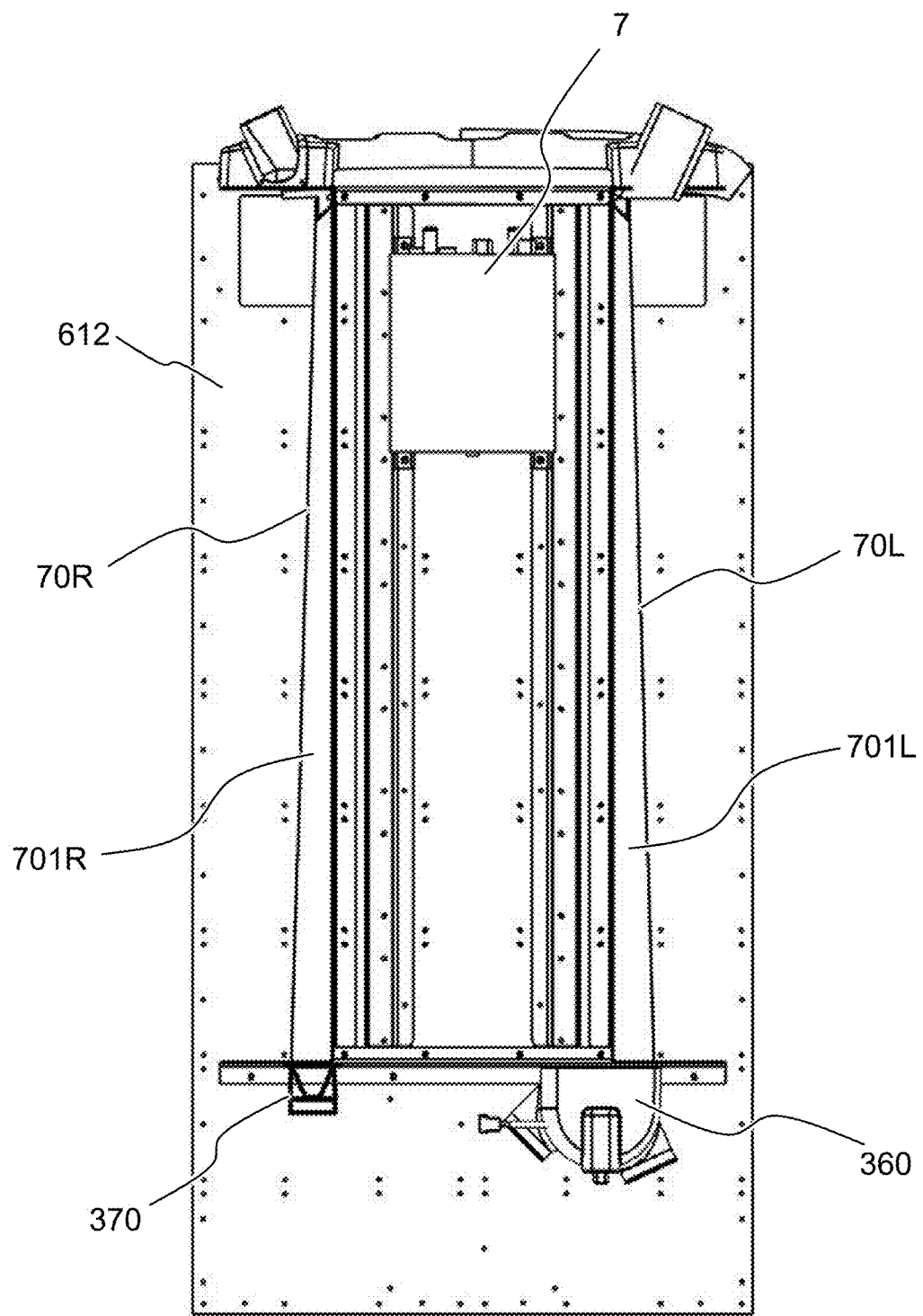
FIG. 24 shows a partially assembled bottom view of an electric vehicle according to a preferred embodiment of the present invention.
Figure 25:
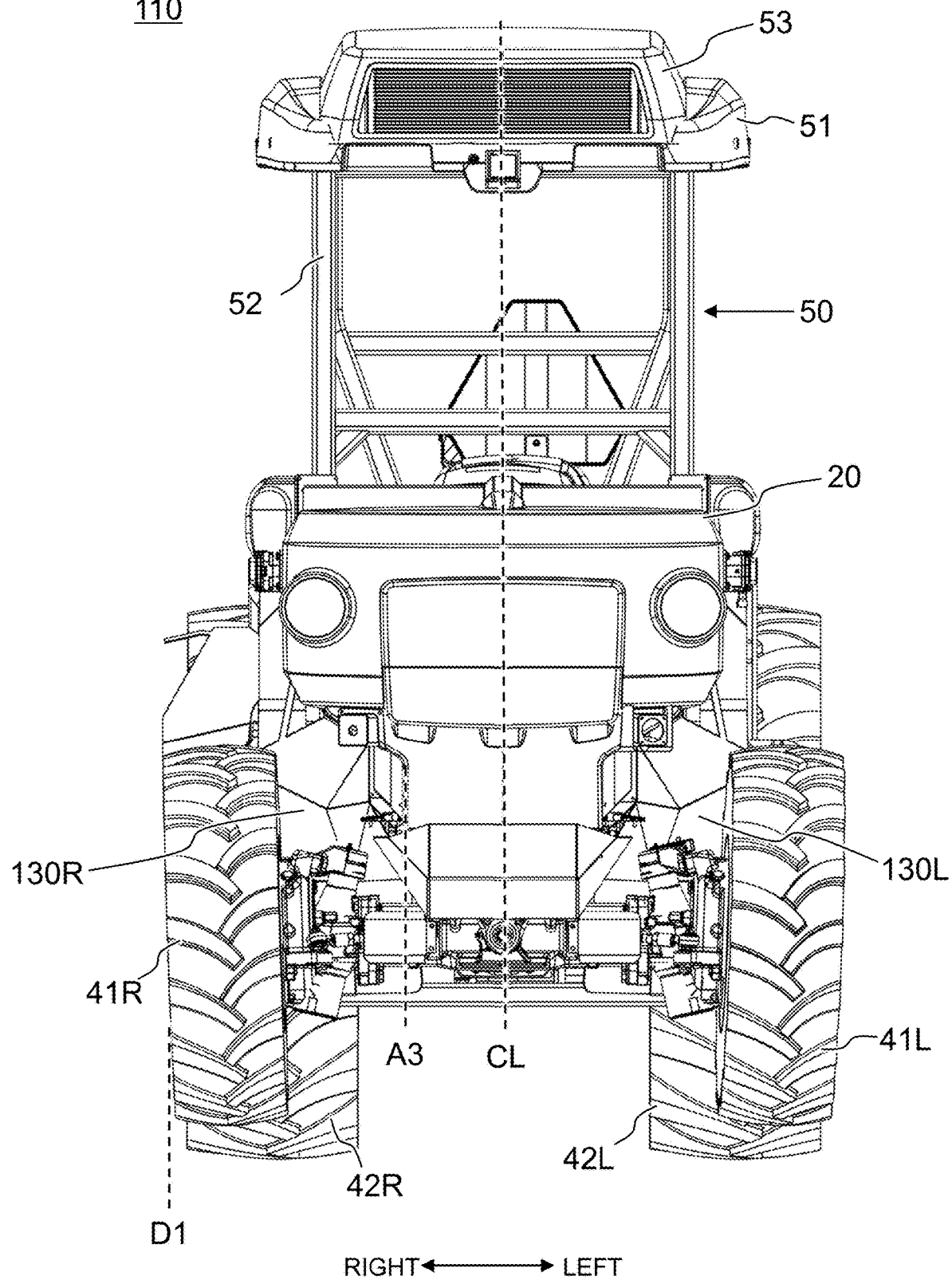
FIG. 25 shows a front view of an electric vehicle according to a preferred embodiment of the present invention.
Figure 26:
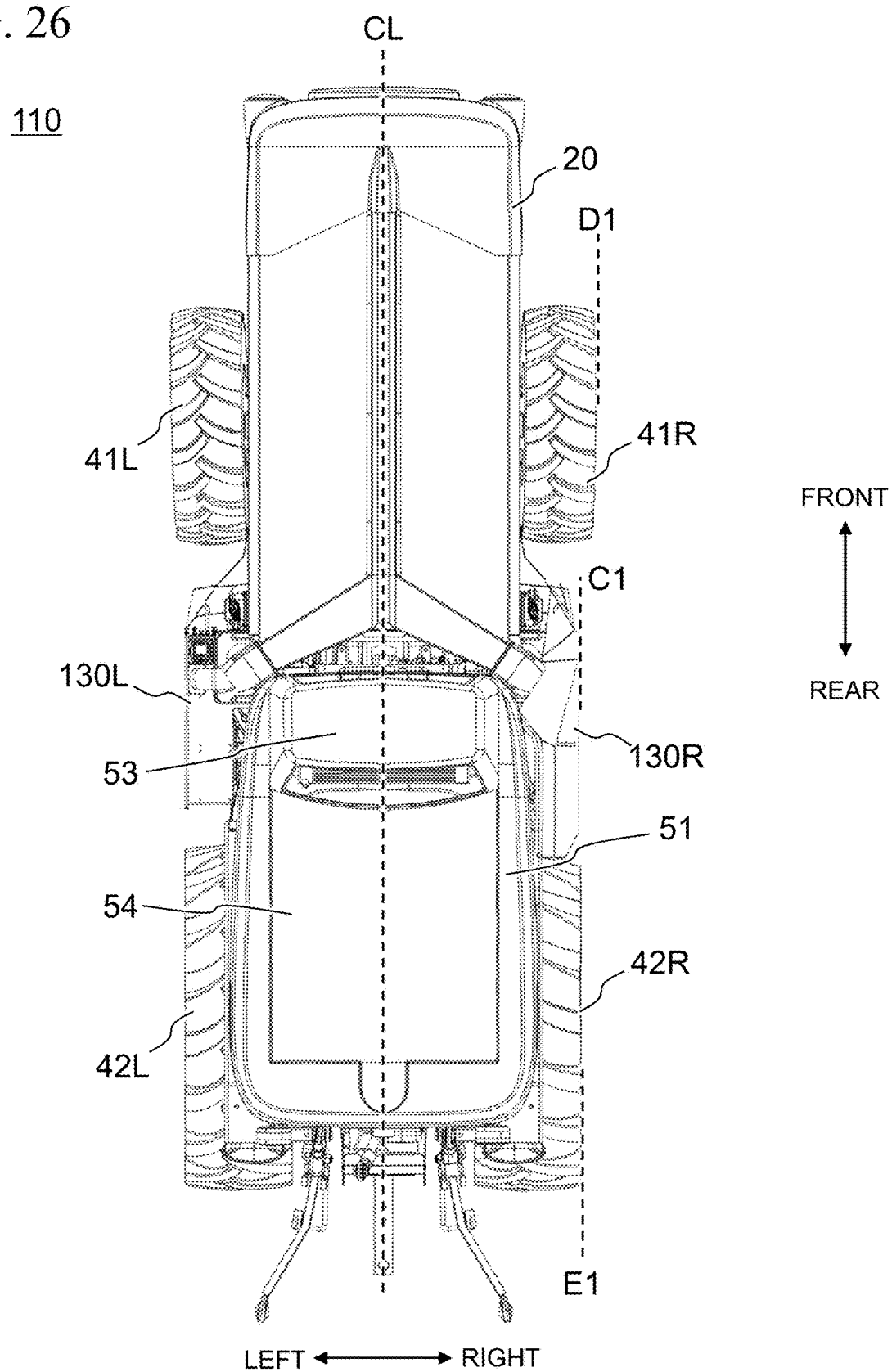
FIG. 26 shows a top view of an electric vehicle according to a preferred embodiment of the present invention.
Figure 27:
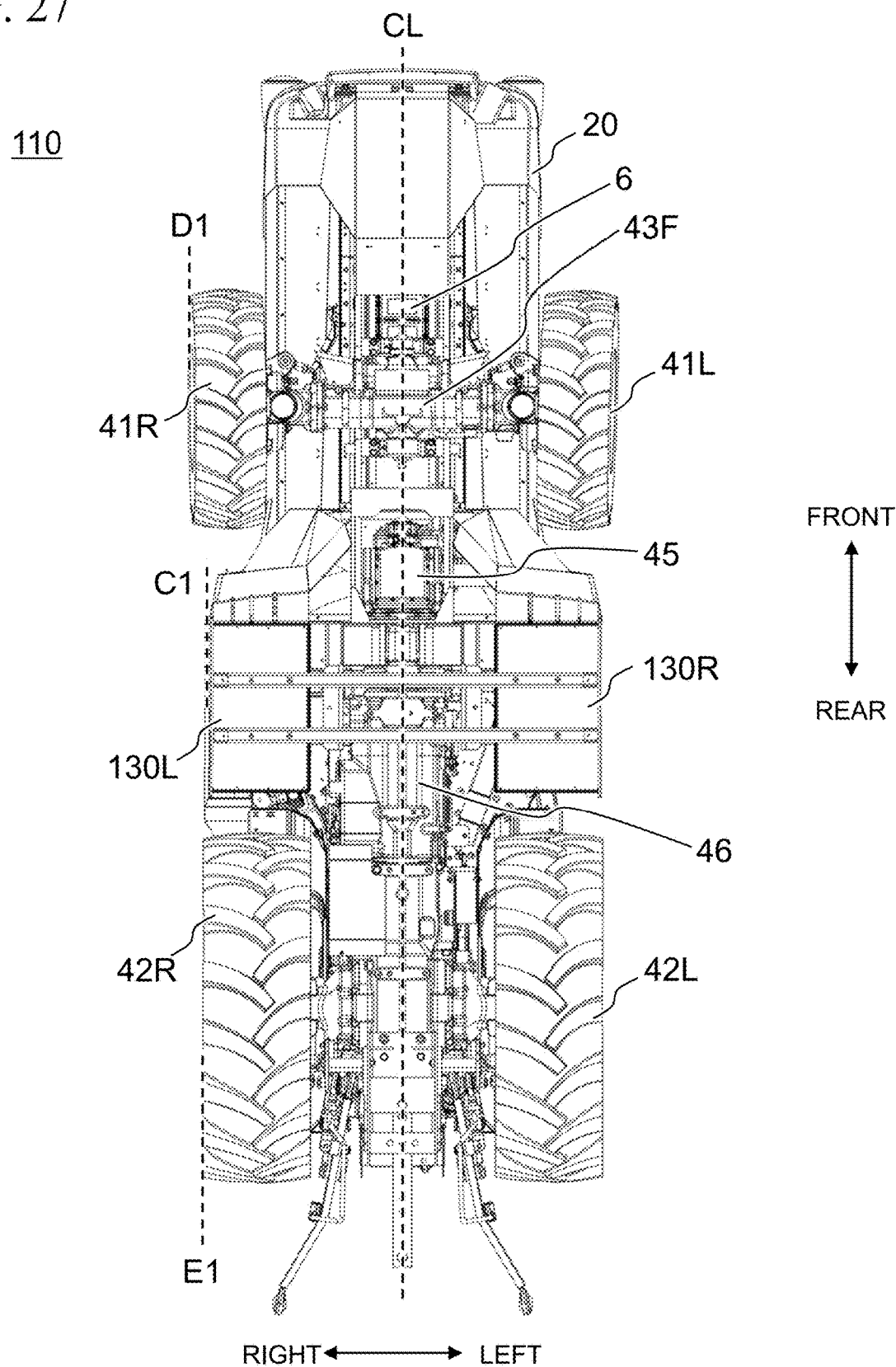
FIG. 27 shows a bottom view of an electric vehicle according to a preferred embodiment of the present invention.
Figure 28:
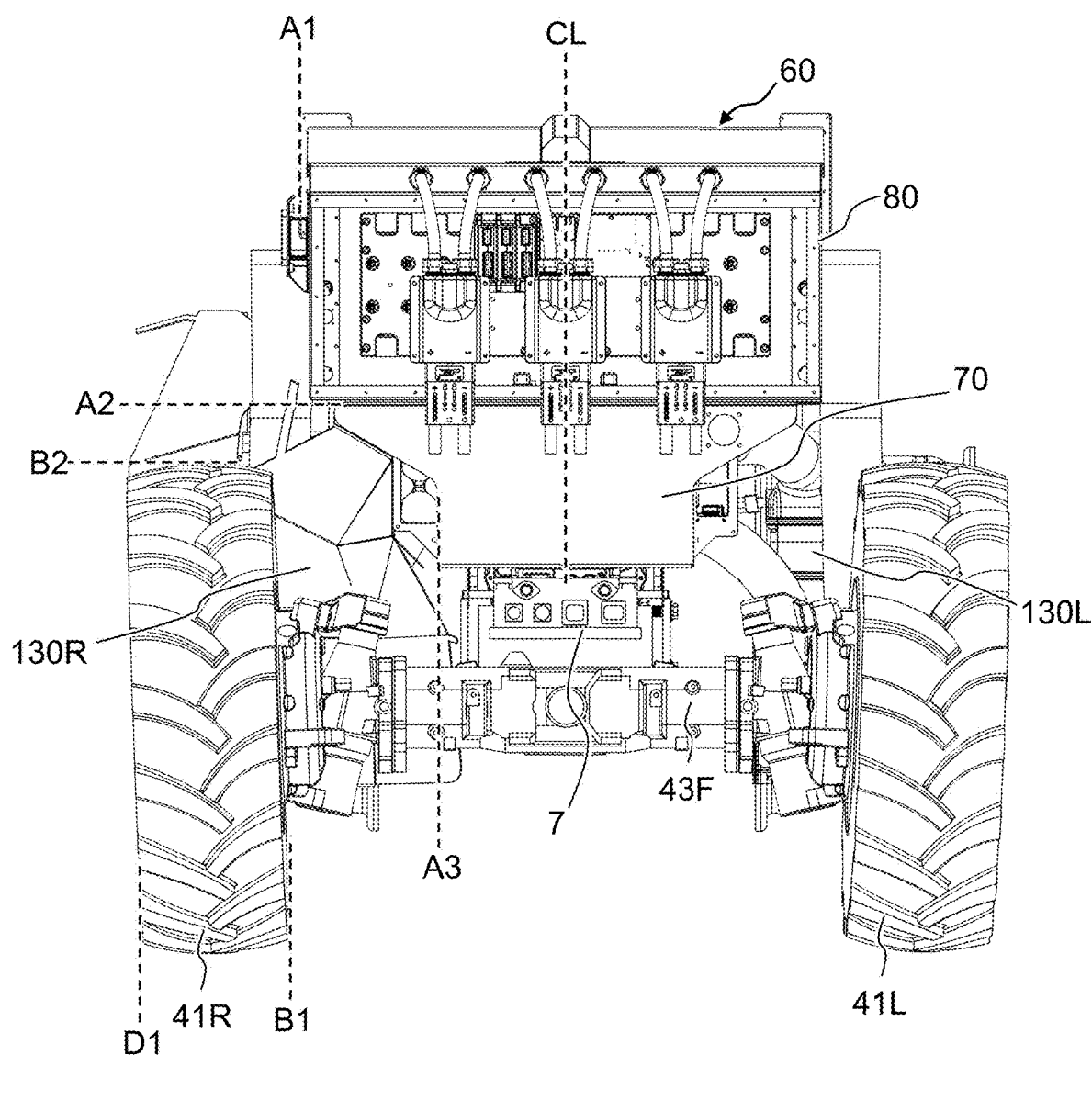
FIG. 28 shows a partially assembled front view of an electric vehicle according to a preferred embodiment of the present invention.

FIG. 22 is a right side view of the second battery housing 70, and FIG. 23 is a left side view of the second battery housing 70 with the first side cover 70L and the second battery modules 71 removed. As shown in FIG. 23, for example, the second battery housing 70 preferably includes cross walls 76 that delineate the vertical columns in which the second battery modules 71 are arrayed, mounting bars 77 that are used to support individual ones of the second battery modules 71, and the openings 75 through which the battery modules 71 are inserted. In a preferred embodiment, the first side cover 70L includes a first sloped channel 701L, and the second side cover 70R includes a second sloped channel 701R, as shown in FIG. 24, for example. As discussed in more detail below, the first sloped channel 701L and the second sloped channel 701R guide a flow of air through the second battery housing 70.

In a preferred embodiment of the present invention, the vehicle 10 can also include one or more side housings 30. The one or more side housings 30 can be spaced away from the first battery housing 60 and the second battery housing 70. For example, as shown in FIGS. 1-7, the vehicle 10 can include a first (left) side housing 30L and a second (right) side housing 30R. The first side housing 30L can be located at least partially between the left front wheel 41L and the left rear wheel 42L, and the second side housing 30R can be located at least partially between the right front wheel 41L and the right rear wheel 42R.

The first side housing 30L can store a plurality of first side battery modules 31L, and the second side housing 30R can store a plurality of second side battery modules 31R. The first side housing 30L can house a fourth battery module bank 32L including the plurality of the first side battery modules 31L provided in rows and columns, and the second side housing 30R can house a fifth battery module bank 32R including the plurality of second side battery modules 32R provided in rows and columns. As examples, the fourth battery module bank 32L can include one row of two battery modules 31L and one row of three battery modules 31L, and the fifth battery module 32R bank can include one row of two battery modules 31R and one row of three battery modules 31R. Accordingly, a total of five of the first side battery modules 31L can be provided in the fourth battery module bank 32L, and a total of five of the second side battery modules 32R can be provided in the fifth battery module bank 32R. In a preferred embodiment, each of the fourth battery module bank 32L and the fifth battery module bank 32R can be provided in series with the third battery module bank 72 housed in the second battery housing 70.

In a preferred embodiment, the first side housing 30L and the second side housing 30R preferably include service plugs 380 which can be used to disconnect the first side battery modules 31L and the second side battery modules 31R from main power chains of the vehicle so that the first side battery modules 31L and the second side battery modules 31R may be serviced. The first side housing 30L and the second side housing 30R also preferably respectively include saddle power interface connections 301L and 301R which are used to respectively connect the first side battery modules 31L and the second side battery modules 31R with the third battery module bank 72 housed in the second battery housing 70.

In a preferred embodiment of the present invention, the first battery modules 61, the second battery modules 71, the first side battery modules 31L, and the second side battery modules 31R can be charged and discharged in groups. For example, one or two group(s) of battery modules can be discharged to provide electrical power to operate the vehicle 10 while other battery group(s) remain idle or are charged. For example, the first battery module bank 62 can define a first battery module group, the second battery module bank 63 can define a second battery module group, and the third battery module bank 72 can define a third battery module group. If the fourth battery module bank 32L and/or the fifth battery module bank 32R are included in the vehicle 10, the fourth battery module bank 32L and the fifth battery module bank 32R can be included in the third battery module group. Accordingly, each of the first battery module group, the second battery module group, and the third battery module group can include a total of twenty-four battery modules. However, other groupings of battery modules can be provided, and are included within the preferred embodiments of the present invention. For example, the first battery module group can include a greater number of battery modules than the third battery module group, and the second battery module group can include a greater number of battery modules than the third battery module group.

In a preferred embodiment of the present invention, the first battery modules 61, the second battery modules 71, the first side battery modules 31L, and the second side battery modules 31R can be lithium titanium oxide (LTO) battery modules. For example, each of the battery modules 61, 71, 31L, and 31R can have a nominal voltage of about 27.6 V, which provides a nominal voltage of about 662.4 V for each of the first battery module group, the second battery module group, and the third battery module group. In addition, each of the first battery module group, the second battery module group, and the third battery module group can have a minimum voltage of about 432 V and a maximum voltage of about 778 V, for example. Each of the battery modules 61, 71, 31L, and 31R can store about 90 kWh of energy, for example. The battery modules 61, 71, 31L, and 31R can be sealed within their corresponding housings (the first battery housing 60, the second battery housing 70, the first side housing 30L, and the second side housing 30R), and each of the battery modules 61, 71, 31L, 31R can be removed and replaced upon failure.

As other examples, the first battery modules 61, the second battery modules 71, the first side battery modules 31L, and the second side battery modules 31R can be lithium ferrophosphate (LFP) battery modules or nickel manganese cobalt (NMC) battery modules, for example. LFP battery modules or NMC battery modules can be provided as smaller and/or lighter battery modules than LTO battery modules.

In a preferred embodiment, each of the first battery modules 61, the second battery modules 71, the first side battery modules 31L, and the second side battery modules 31R can be a removable battery module that can be individually installed and removed from the corresponding first battery housing 60, second battery housing 70, first side housing 30L, and second side housing 30R. However, the battery modules 61, 71, 31L, 31R can instead be sealed and secured within their corresponding housing (first battery housing 60, second battery housing 70, first side housing 30L, or second side housing 30R) to insulate the battery modules and/or prevent corrosion of battery terminals. As an example, terminals of the battery modules 31L, 31R, 61, and 71 can be oriented towards an interior of the vehicle 10. As described above in an example, one or two group(s) of battery modules can be discharged to provide electrical power to operate the vehicle 10 while other battery group(s) remain idle or are charged. Accordingly, for example, battery modules included in the idle battery group(s) can be removed or replaced while the vehicle 10 is supplied with electrical power from the non-idle battery group(s).

In a preferred embodiment, communication among the first battery modules 61, the second battery modules 71, the first side battery modules 31L, and the second side battery modules 31R can be provided by a battery management unit (BMU) or the like over a controller area network (CAN) bus. The BMU, or a plurality of BMUs, can be provided in or on one or more of the first battery housing 60, the second battery housing 70, the first side housing 30L, and the second side housing 30R, or can be provided at other location(s) in or on the vehicle 10. The vehicle 10 can also include a battery management system (BMS) that aggregates information from each of the battery module groups. The BMS can be implemented by a supervisory control unit (SCU) that can be connected to a PDU housed in the PDU housing 80. The BMS can control charging and discharging of the battery modules, and preferably maintain each of the first battery module group, the second battery module group, and the third battery module group in a state of charge between about 20% and about 80%, for example, to reduce battery module degradation. The state of charge can be maintained on a cell level within each battery module, a battery module level, a battery module bank level, or on a battery module group level.

FIGS. 25-28 show a vehicle 110 according to another preferred embodiment of the present invention. As shown in the plan views of FIGS. 26 and 27, the vehicle 110 includes a first (left) side housing 130L and a second (right) side housing 130R that are located closer to a center line CL of the vehicle 110 in a left-right direction of the vehicle 110 than the first side housing 30L and the second side housing 30R of the vehicle 10. For example, an outer edge C1 of the second side housing 130R can be located closer to the center line CL of the vehicle 110 in the left-right direction than each of an outer edge D1 of the right front wheel 41R and an outer edge E1 of the right rear wheel 42R. Similarly, an outer edge of the first side housing 130L can be located closer to the center line CL of the vehicle 110 in the left-right direction of the vehicle 110 than each of an outer edge of the left front wheel 41L and an outer edge of the left rear wheel 42L. Furthermore, a line extending from the outer edge C1 of the second side housing 130R can pass through one or both of the right front wheel 41R and the right rear wheel 42R in a width direction of the right wheels 41R and 42R. Similarly, a line extending from the outer edge of the first side housing 130L can pass through one or both of the left front wheel 41L and the left rear wheel 42L in a width direction of the right wheels 41L and 42L.

However, the outer edge C1 of the second side housing 130R can instead be located closer to the center line CL of the vehicle 110 in the left-right direction than only one of the outer edge D1 of the right front wheel 41R and the outer edge E1 of the right rear wheel 42R. Similarly, the outer edge of the first side housing 130L can be located closer to the center line CL of the vehicle 110 in the left-right direction than only one of the outer edge of the left front wheel 41L and the outer edge of the left rear wheel 42L. For example, if a size of the rear wheels 42R and 42L is increased to provide improved traction, the outer edge C1 of the second side housing 130R can be located, in the left-right direction, between the outer edge D1 of the right front wheel 41R and the outer edge E1 of the right rear wheel 42R, and the outer edge of the first side housing 130L can also be located, in the left-right direction, between the outer edge of the left front wheel 41L and the outer edge of the left rear wheel 42L.

As another alternative, the outer edges of the first and second side housings 130L and 130R can also be located in line with, or substantially in line with, any of the wheels 41R, 41L, 42R, and 42L. The first and second side housings 130L and 130R can also be individually adjusted with respect to the center line CL of the vehicle 110.

Other elements of the vehicle 110 are the same as, or similar to, the vehicle 10 described above, and repeated description thereof is omitted.

Figure 45:
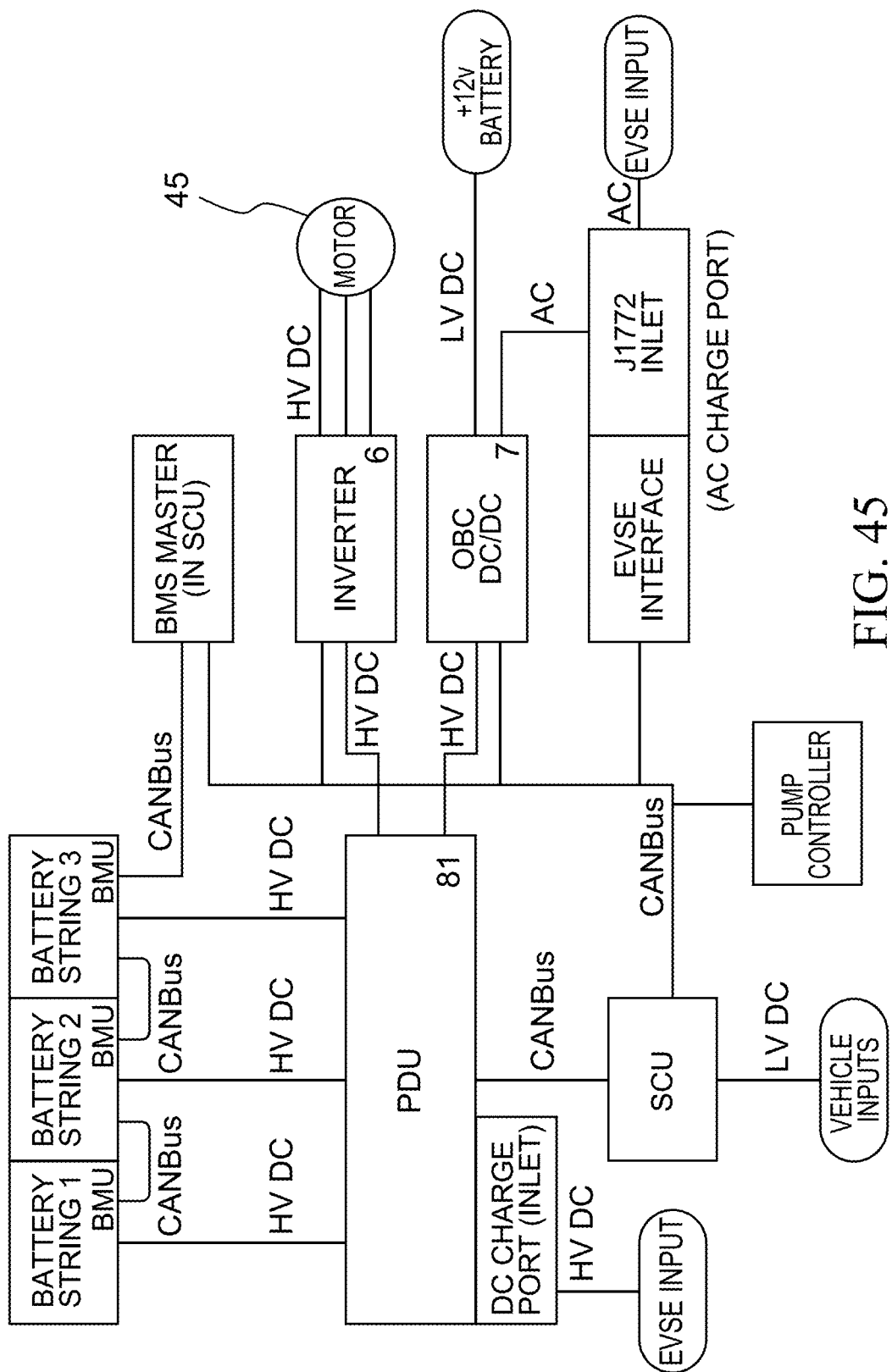
FIG. 45 shows a block diagram of an electrical subsystem include in an electric vehicle according to a preferred embodiment of the present invention.

FIG. 45 shows a block diagram of an electrical sub-system of the electric vehicle 10. As shown in FIG. 45, the electrical sub-system includes a power distribution unit (PDU) that connects to three battery strings (e.g., the first battery module group, the second battery module group, and the third battery module group) via high-voltage (HV) DC lines. Each battery string is controlled by a battery management unit (BMU) that communicates with other BMUs and a battery management system (BMS) Master via RJ45 CANBus lines, for example. A BMS is responsible to aggregate the information from all the battery strings and respond to the appropriate BMU if the situation requires. In a preferred embodiment, the function of the BMS may be implemented in a Supervisory Control Unit (SCU). The power distribution unit (PDU) is further connected to an inverter 6 via HV DC lines to drive the electric motor 45 of the vehicle, and an onboard charge controller (OBC) 7 which may include a DC/DC converter in the present preferred embodiment as shown. The OBC 7 is connected to a 12v battery via low-voltage (LV) DC line, and to the AC Charge port, which may be a J1772 inlet. As shown in FIG. 45, in a preferred embodiment of the present invention, two Electric Vehicle Supply Equipment (EVSE) systems are provided. One is a standard SAE J1772 system for Level 2 charging at 240 VAC via an on-board charger (OBC DC/DC). The second EVSE is a custom implementation for DC fast charging. Both EVSEs supply power to the PDU where it is distributed to charge each battery string. The DC Fast Charger connects to the Battery Strings 1-3 of the battery pack through the PDU. A Supervisory Control Unit (SCU) is connected to the PDU via CANBus. The SCU connects to vehicle inputs or sensors via low-voltage (LV) DC lines. A pump controller, which controls one or more of a radiator 532, a blower fan 533, a first coolant pump 356L, a second coolant pump 356R discussed in more detail below, is connected to the SCU via a CANBus.

In a preferred embodiment of the present invention, electrical power can be supplied to the electric motor 45 via the inverter 6. As shown in FIG. 7, for example, the electric motor 45 can be located between the first side housing 30L and the second side housing 30R in a width/side (left-right) direction of the vehicle 10, and the electric motor 45 can be located forward of the first side housing 30L and the second side housing 30R in a front-rear direction of the vehicle 10. In a preferred embodiment, the inverter 6 is located forward of the electric motor 45 in a front-rear direction of the vehicle 10. The vehicle 10 can include a transmission 46 to drive each of the left front wheel 41L, the right front wheel 41L, the left rear wheel 42L, and the right rear wheel 42R in a four-wheel drive arrangement. However, the electric motor 45 and the transmission 46 can also be implemented in two-wheel drive arrangements.

In a preferred embodiment, the Onboard Battery Charger with DCDC converter (OBC/DCDC) 7 can be attached to a bottom surface of the second battery housing 70, as shown in FIGS. 8-11, for example.

In a preferred embodiment of the present invention, the vehicle 10 can include a liquid cooling system that is able to sufficiently cool heat generating elements of the vehicle 10 while also being efficiently arranged at different locations around the vehicle 10, as discussed in detail below.

Figure 29:
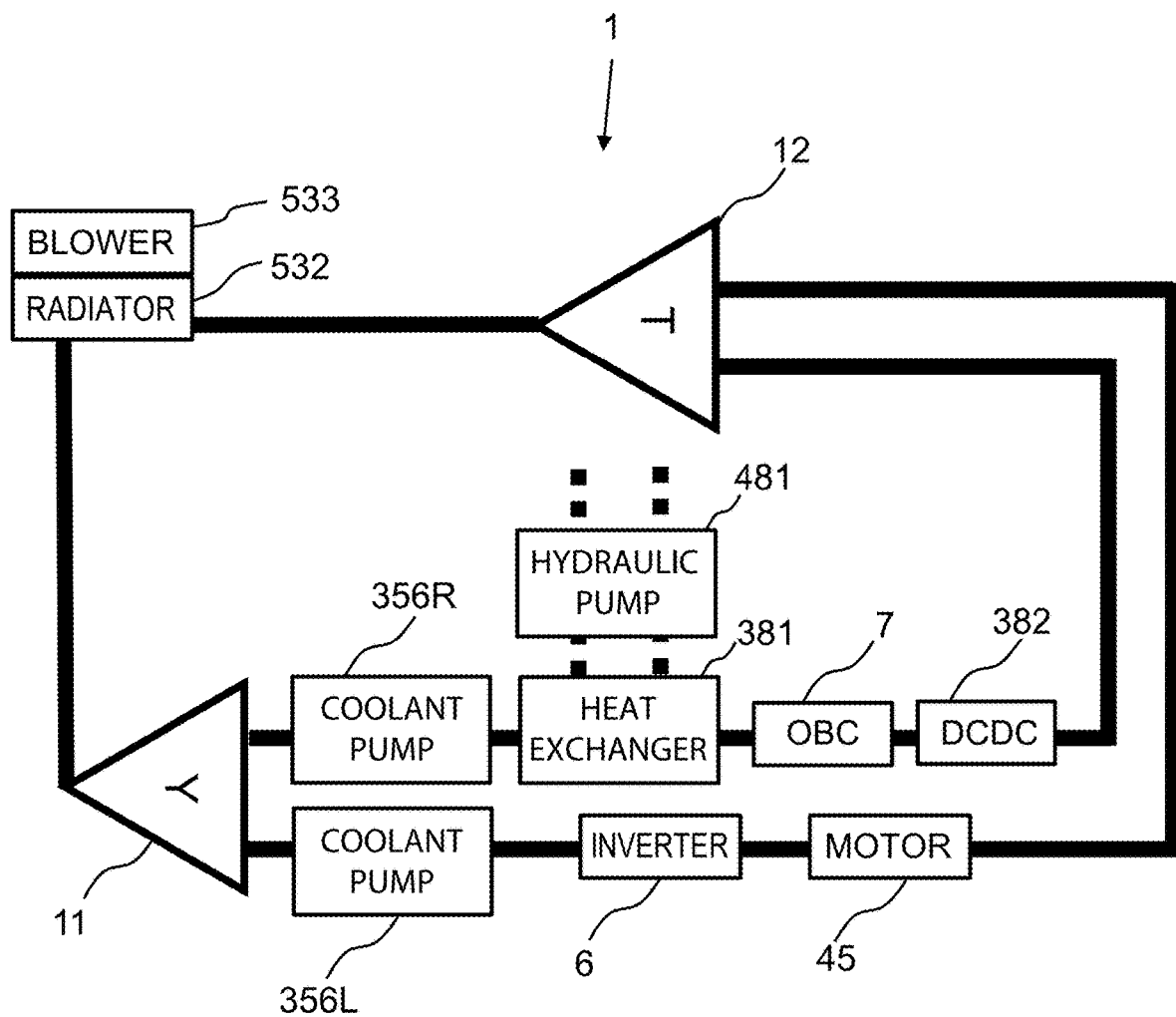
FIG. 29 shows a schematic of an example of a liquid cooling system included in an electric vehicle according to a preferred embodiment of the present invention.

FIG. 29 shows a schematic of an example of a liquid cooling system 1 for a vehicle according to a preferred embodiment of the present invention. The liquid cooling system 1 preferably includes a radiator 532, a blower fan 533, a first coolant pump 356L, a second coolant pump 356R, a heat exchanger 381, the inverter 6, the electric motor 45, the Onboard Battery Charger with DCDC converter (OBC/DCDC) 7, and a secondary DC to DC Converter (DCDC) 382. Preferably, the liquid cooling system 1 includes a pair of parallel cooling path circuits (e.g., a first cooling path circuit and a second cooling path circuit) which are provided between a first cooling path coupling 11 and a second cooling path coupling 12. The first cooling path coupling 11 preferably includes a Y connector, and the second cooling path coupling 12 preferably includes a T connector, for example. As shown in FIG. 29, the first cooling path circuit preferably includes the first coolant pump 356L, the inverter 6, and the electric motor 45. The second cooling path circuit preferably includes the second coolant pump 356R, the heat exchanger 381, the OBC/DCDC 7, and the secondary DC to DC Converter (DCDC) 382. The first cooling path circuit and the second cooling path circuit are preferably parallel portions of a cooling loop defined by the liquid cooling system 1. In a preferred embodiment, the first coolant pump 356L and the second coolant pump 356R are preferably Coolant Water Aggregate (CWA) type pumps and have a flow rate of 25 l/min @ 0.53 bar and 35 l/min @ 0.25 bar at an operating voltage of 8 to 16V, for example.

In a preferred embodiment, the first cooling path circuit receives cold coolant (e.g., water, a water/glycol mixture, or a water/ethylene glycol mixture) from the radiator 532, and the first coolant pump 356L is used to circulate the coolant through the inverter 6 and the motor 45, before the coolant returns to the radiator 532. The coolant absorbs heat from the inverter 6, thereby cooling the inverter 6, and then continues into a cooling channel defined within the motor 45. The coolant absorbs heat from the motor 45 while the coolant is within the cooling channel defined within the motor 45, and then continues to the radiator 532. In the radiator 532, the coolant which has been heated by passing through the inverter 6 and the motor 45, is collected and cooled.

In a preferred embodiment, the second cooling path circuit receives cold coolant from the radiator 532, and the second coolant pump 356R is used to circulate the coolant through the heat exchanger 381, the OBC/DCDC 7, and the secondary DC to DC Converter (DCDC) 382, before the coolant returns to the radiator 532. The coolant absorbs heat from the heat exchanger 381, thereby cooling the heat exchanger 381, and then continues into a cooling circuit within the OBC/DCDC 7 to absorb heat from the OBC/DCDC 7. Once the coolant has passed through the cooling circuit within the OBC/DCDC 7, the coolant continues to a cooling circuit within the secondary DC to DC Converter (DCDC) 382 to absorb heat from the secondary DC to DC Converter (DCDC) 382, and then continues to the radiator 532. In the radiator 532, the coolant which has been heated by passing through the heat exchanger 381, the OBC/DCDC 7, and the secondary DC to DC Converter (DCDC) 382, is collected and cooled.

In a preferred embodiment of the present invention, the heat exchanger 381 is connected to a hydraulic pump 481 such that oil (e.g., hydraulic fluid), which is used by the hydraulic pump 481 to operate hydraulic components of the vehicle (e.g., a three point lift for accessories of the vehicle, a braking system, a power steering, etc.), can be cooled. For example, the oil and the coolant are each circulated through the heat exchanger 381 such that heat from the oil can be transferred to the coolant, thereby cooling the heat exchanger 381 and the oil that is circulated through the heat exchanger 381. The heat exchanger is preferably rated at 125,000 BTU/Hr, but any other desirable type of heat exchanger could be used. In a preferred embodiment, the hydraulic pump 481 is attached to a rear frame of the vehicle adjacent to the rear right wheel 42R, as shown in FIG. 7, for example. In a preferred embodiment, the hydraulic pump 481 is located rearward of the heat exchanger 381 in a front-rear direction of the vehicle 10.

Figure 30:
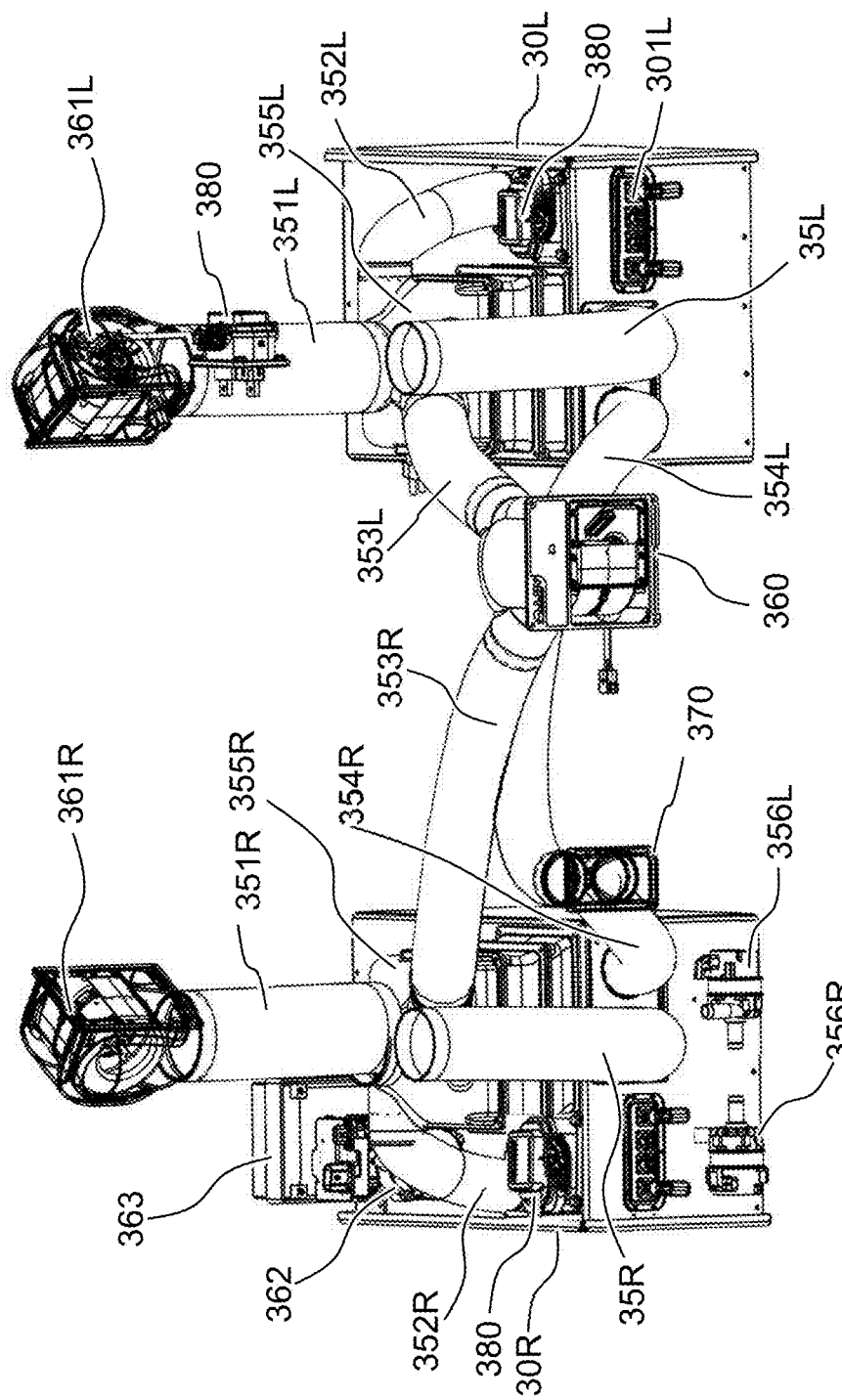
FIG. 30 shows components included in an air cooling system according to a preferred embodiment of the present invention.
Figure 31:
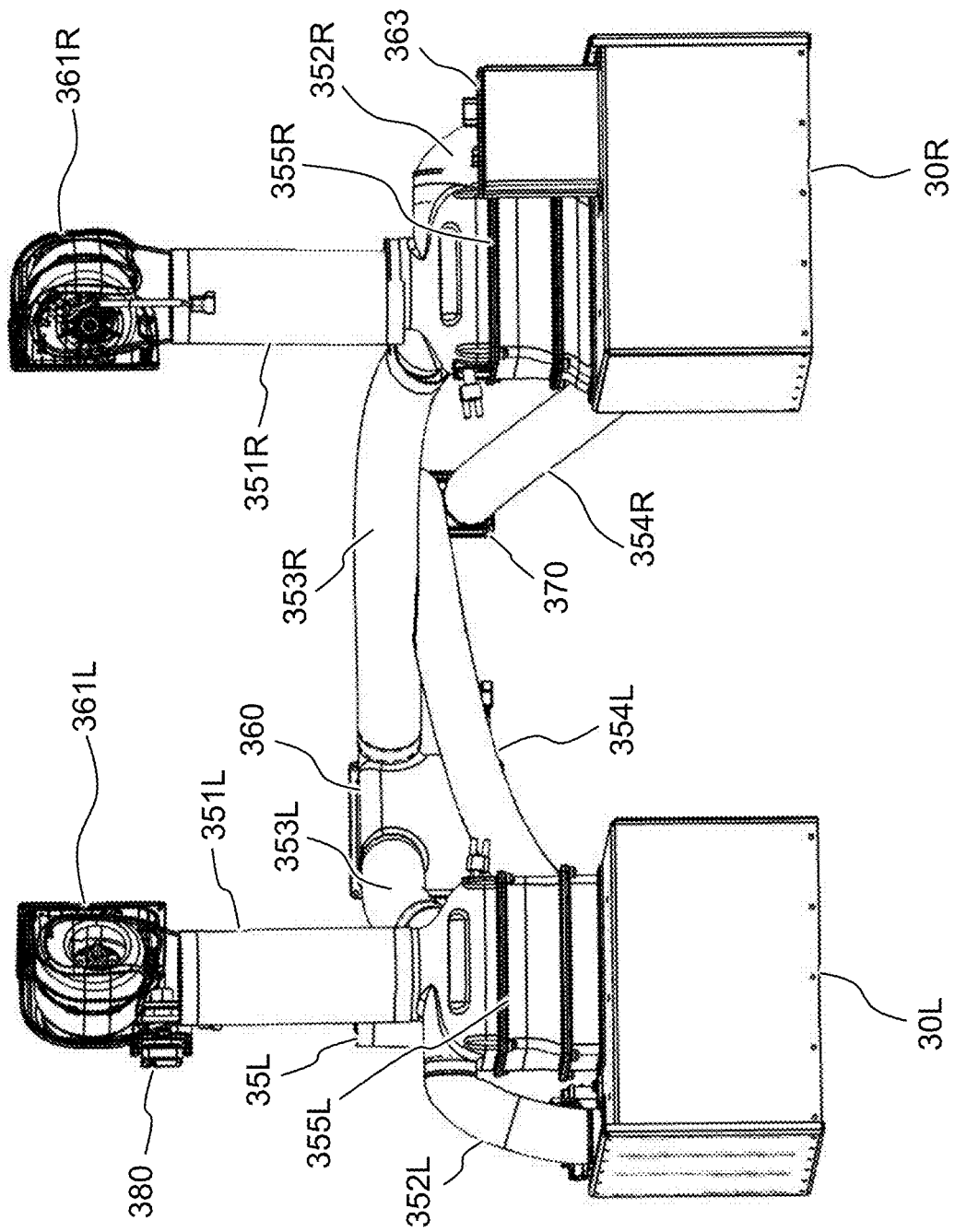
FIG. 31 shows components included in an air cooling system according to a preferred embodiment of the present invention.

As shown, in FIG. 30 the first coolant pump 356L and the second coolant pump 356R are preferably mounted on a lower front surface of the second side housing 30R. The radiator 532 is preferably housed in a radiator and condenser module 53 affixed to a roof 51 of a cabin 50 of the vehicle 10, as shown in FIG. 1, for example. In a preferred embodiment, a fluid connection between the radiator 532 and the first coolant pump 356L and a fluid connection (e.g., tubing or piping) between the radiator 532 and the second coolant pump 356R extend through internal portions of the cabin frame or along an outside of the cabin frame.

Figure 34:
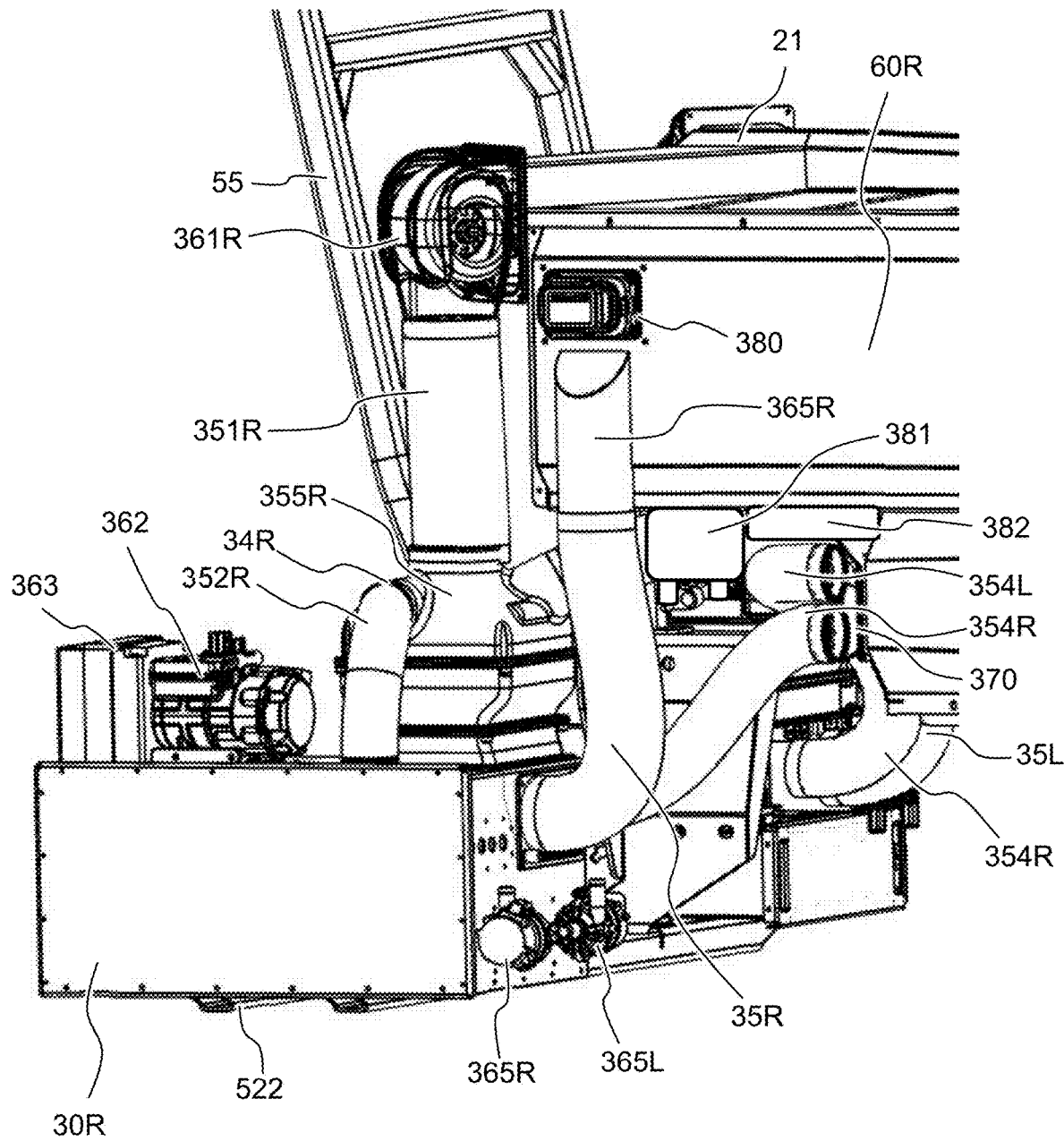
FIG. 34 shows components included in an air cooling system according to a preferred embodiment of the present invention.
Figure 35:
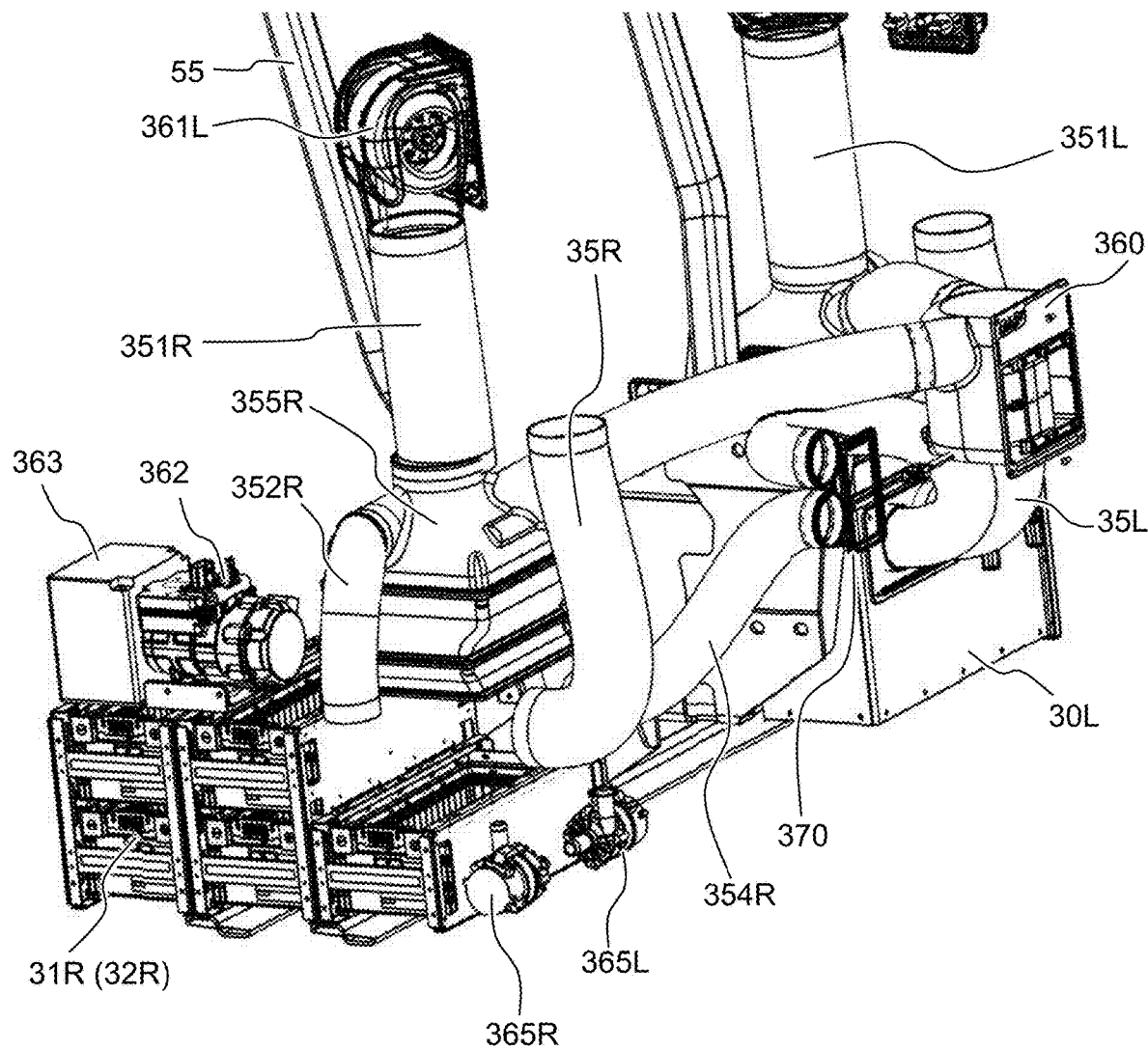
FIG. 35 shows components included in an air cooling system according to a preferred embodiment of the present invention.
Figure 36:
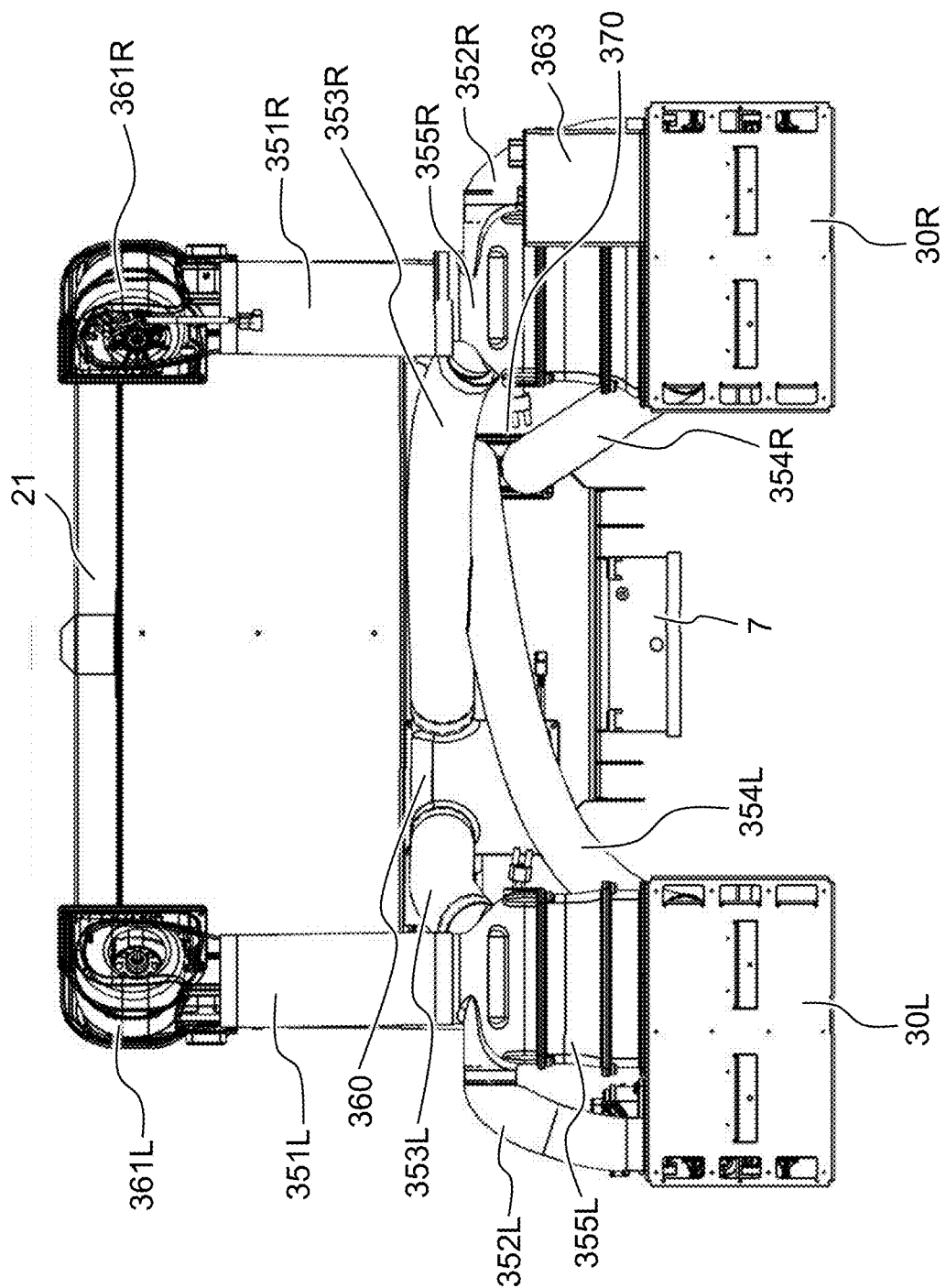
FIG. 36 shows components included in an air cooling system according to a preferred embodiment of the present invention.
Figure 41:
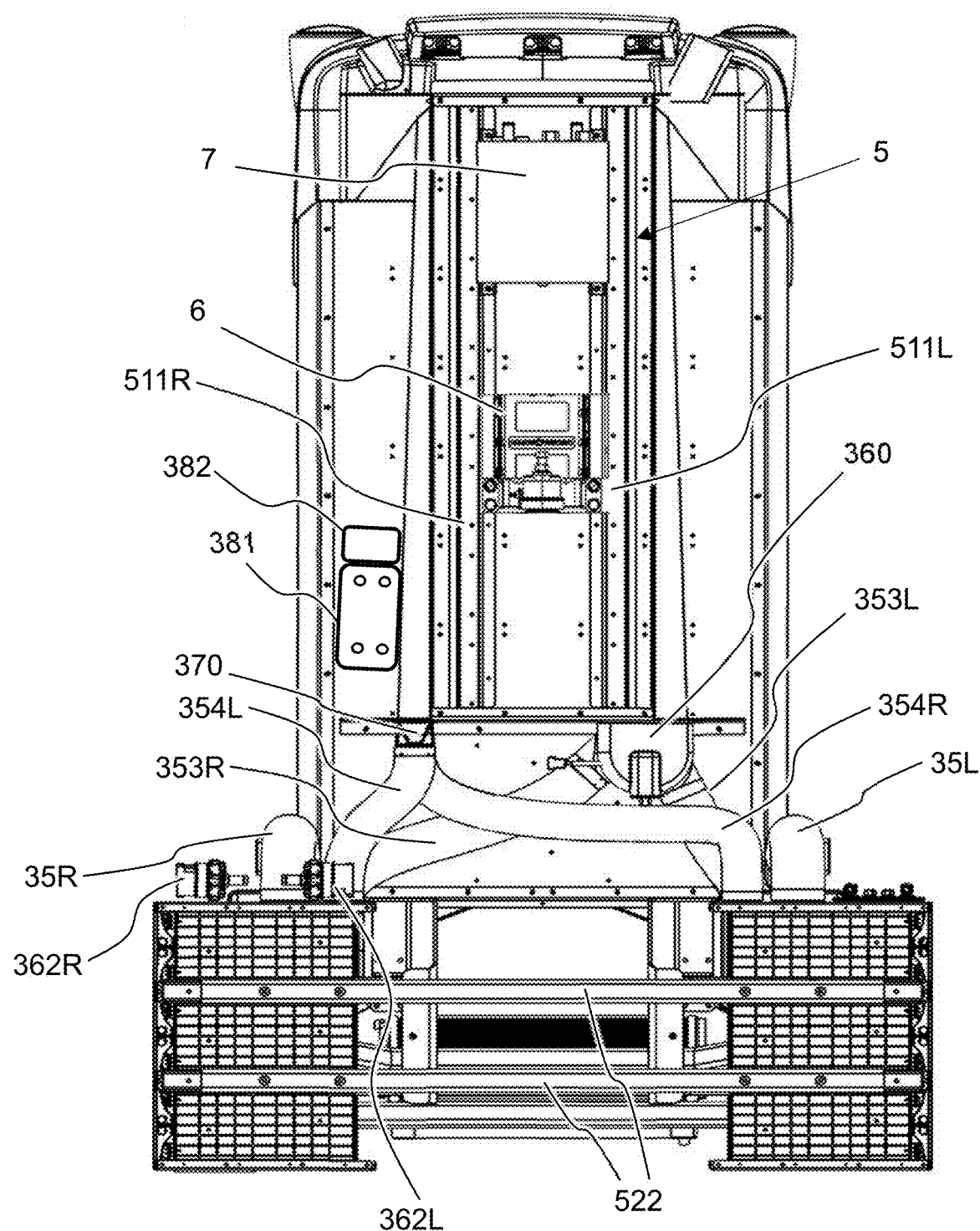
FIG. 41 shows a partially assembled bottom view of an electric vehicle according to a preferred embodiment of the present invention.

In a preferred embodiment, the heat exchanger 381 is preferably fixed to a portion of the vehicle adjacent to the second side housing 30R. For example, in a preferred embodiment of the present invention, the heat exchanger 381 is attached to a right side of the second battery housing 70, as shown in FIGS. 34 and 41, for example. The location of the heat exchanger 381 makes it possible for a connection between the second coolant pump 356R and the heat exchanger 381 to be as short as possible while also permitting an easy connection to the hydraulic system, the hydraulic system preferably being located at a right side of the vehicle.

As discussed above, the radiator 532 is attached to the roof 51 of the cabin 50 of the vehicle 10. Thus, a connection (e.g., tubing or piping) between the radiator 532 and the first coolant pump 356L and the second coolant pump 356R extends up to the roof 51. The connection between the radiator 532 and the first coolant pump 356L and the second coolant pump 356R can include tubing or piping that extends along an outside or inside of the rear cabin frame 52 or the forward cabin frame 55. Providing tubing alongside or inside of the rear cabin frame 52 or the forward cabin frame 55 provides an efficient way of routing the connection between the first and second coolant pumps 356L and 356R and the radiator 532. Further, by providing the radiator 532 on the roof 51, it is possible to space the radiator 532 far away from other heat generating components of the vehicle to thereby increase its thermal cooling capacity. Additionally, by providing the radiator 532 on the roof 51, it is possible to reduce the front-rear length of the vehicle 10 compared to if the radiator 532 was attached to a front of the vehicle 10.

FIG. 41 shows a partially assembled bottom view of a vehicle including components of the liquid cooling system according to a preferred embodiment of the present invention. The vehicle preferably includes a chassis 5 which supports a lower surface of the second battery housing 70. The chassis 5 preferably further includes a pair of frame rails 511L and 511R which support the inverter 6 and the OBC/DCDC 7 below the second battery housing 70. In a preferred embodiment, the inverter 6 and the OBC/DCDC 7 are also mounted under the first battery housing 60 in an up-down direction of the vehicle. The OBC/DCDC 7 is preferably arranged forward of the inverter 6 in a front-rear direction of the vehicle. The chassis 5 also preferably includes a pair of saddle support beams 522 which are affixed to bottom portions of the first side housing 30L and the second side housing 30R to firmly support the first side housing 30L and the second side housing 30R with respect to the chassis 5 either indirectly or through a direct connection.

Figure 42:
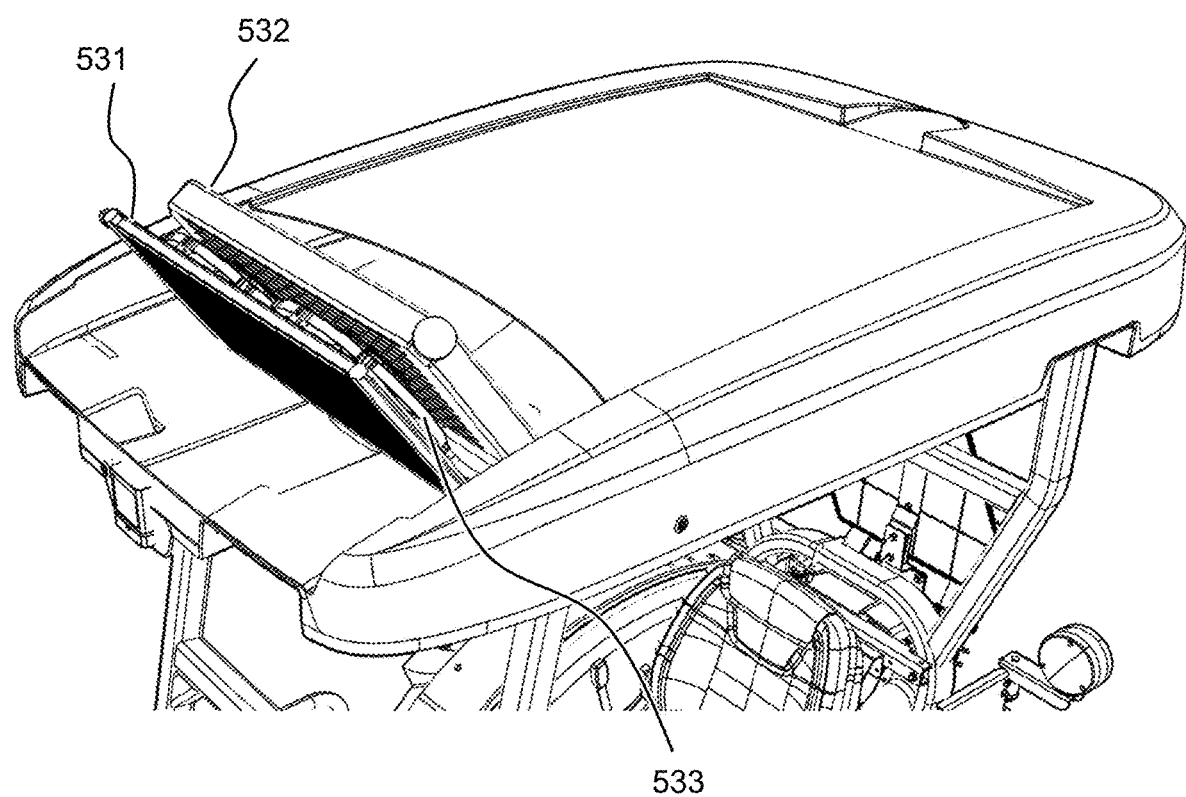
FIG. 42 shows a partially assembled view of a roof according to a preferred embodiment of the present invention.
Figure 43:
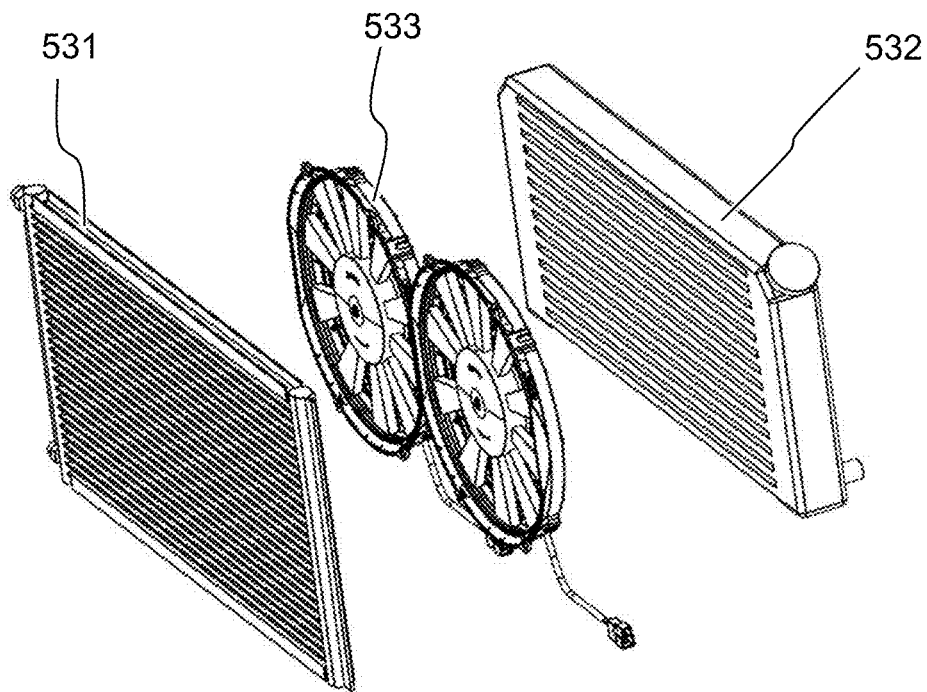
FIG. 43 shows an exploded view of cooling components according to according to a preferred embodiment of the present invention.
Figure 44:
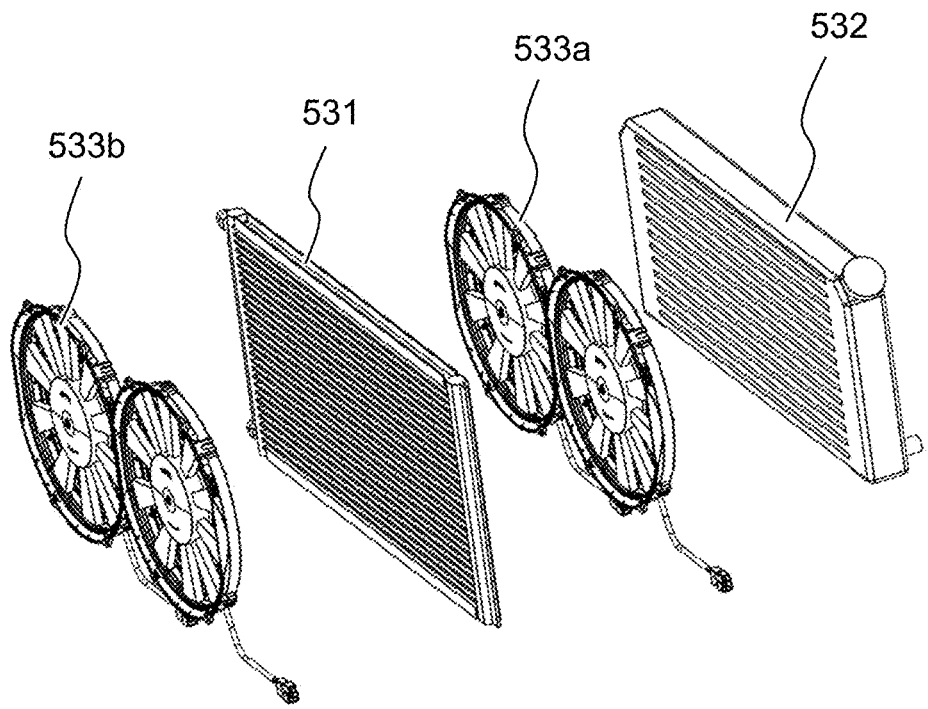
FIG. 44 shows an exploded view of cooling components according to according to a preferred embodiment of the present invention.

FIG. 42 shows a partially assembled view of the roof 51 with a cover of the radiator and condenser module 53 removed for illustrative purposes. FIGS. 43 and 44 exploded views of a vehicle and cooling components according to preferred embodiments of the present invention. In a preferred embodiment shown in FIGS. 42 and 43, the blower fan 533 is located between the radiator 532 and a condenser 531 (discussed in more detail below) and to provide cooling airflow to both the radiator 532 and the condenser 531 at the same time. In an alternative preferred embodiment shown in FIG. 44, the vehicle 10 includes a first blower fan 533a located between the condenser 531 and the radiator 532 and a second blower fan 533b located in front of the condenser 531.

Figure 46:
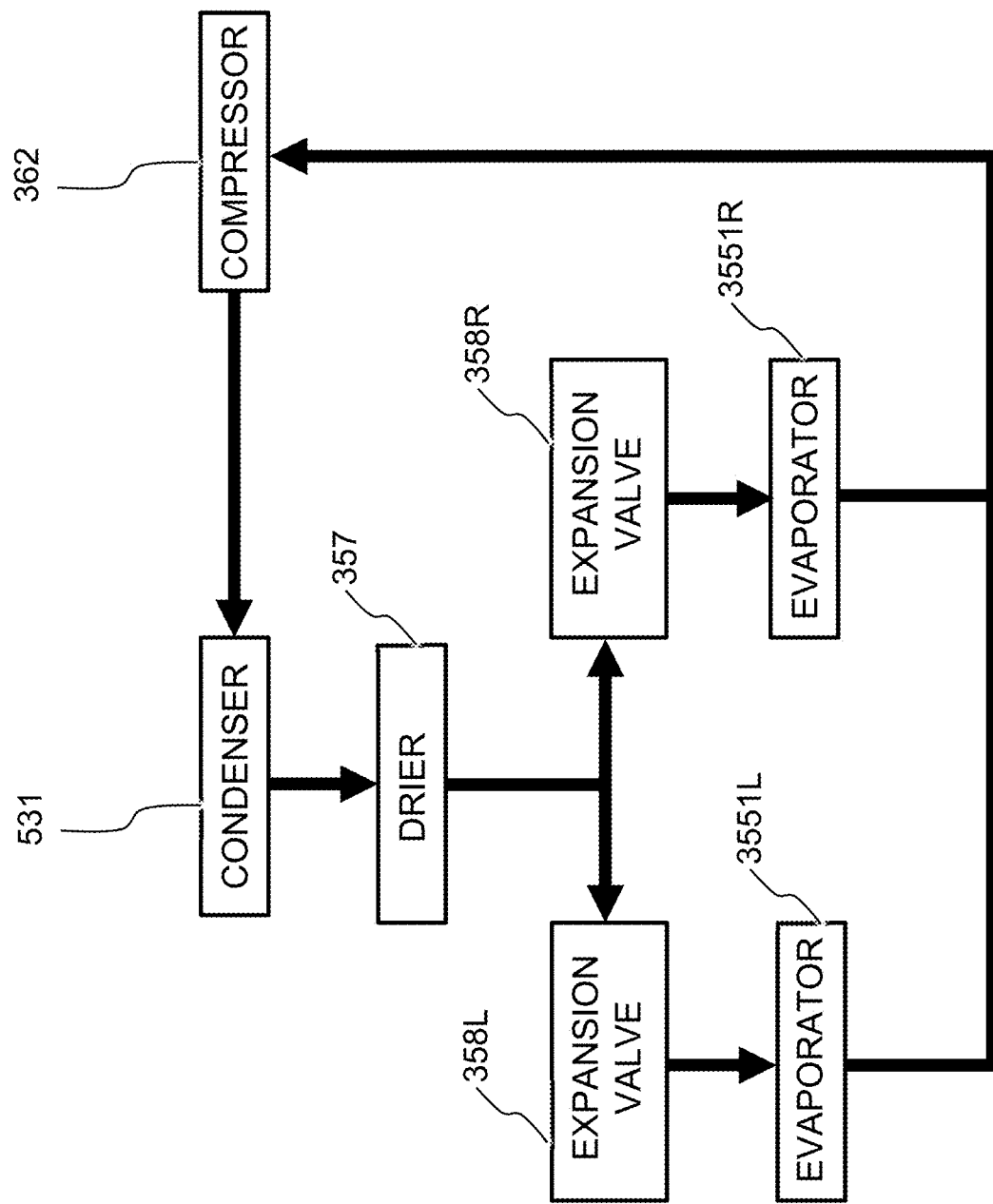
FIG. 46 is a schematic that shows a flow of refrigerant through portions of an air cooling system according to a preferred embodiment of the present invention.

In a preferred embodiment of the present invention, the vehicle 10 preferably further includes an air cooling system that is structured to cool the first battery modules 61, the second battery modules 71, the first side battery modules 31L, and the second side battery modules 31R. FIG. 46 is a schematic that shows a flow of refrigerant R through portions of the air cooling system. For example, FIG. 46 shows a flow of refrigerant through an AC compressor 362, a condenser 531, a drier 357, a first expansion valve 358L, a second expansion valve 358L, a first evaporator coil 3551L, and a second evaporator coil 3551R. In a preferred embodiment, the AC compressor 362 can include an integrated motor and compressor which is powered by one or more of the first battery modules 61, the second battery modules 71, the first side battery modules 31L, and the second side battery modules 31R. The AC compressor 362 is operable to increase the pressure of the refrigerant R and sends hot, high pressure refrigerant R (gas) to the condenser 531. The condenser 521 reduces the temperature of the refrigerant R but maintains the refrigerant R at high pressure. The reduced-temperature, high pressure refrigerant R (liquid) is sent from the condenser 521 to the drier 357, in which water/moisture is removed from the refrigerant R, before the refrigerant R (liquid) is sent to the first expansion valve 358L and the second expansion valve 358L. The first expansion valve 358L and the second expansion valve 358L reduce the pressure of the refrigerant R, which reduces the temperature of the refrigerant R. The cold refrigerant R (liquid) from the first expansion valve 358L is sent to the first evaporator coil 3551L to cool the first evaporator coil 3551L, and the cold refrigerant R (liquid) from the second expansion valve 358R is sent to the second evaporator coil 3551R to cool the second evaporator coil 3551R. After the refrigerant R passes through the first evaporator coil 3551L and the second evaporator coil 3551R, the low temperature, low pressure refrigerant R (gas) is sent back to the compressor 362.

In a preferred embodiment, the condenser 531 is mounted on the roof 51 and a fluid connection between the compressor 362 and the condenser 531 extends along or through the rear cabin frame 52 or the forward cabin frame 55. As discussed above and as shown in FIG. 12, for example, the condenser 531 is preferably located adjacent to the radiator 532 on the roof 51 with the blower fan 533 located between the condenser 531 and the radiator 532 such that both of the condenser 531 and the radiator 532 are located far away from other heat generating components of the vehicle to thereby increase thermal cooling capacity.

In a preferred embodiment, the air cooling system includes, attached to the first side housing 30L, a first side return duct 35L, a first side outer duct 352L, a first lower return duct 354L, and a first evaporator air box 355L, as shown in FIGS. 30-36, for example. In a preferred embodiment, the drier 357 is also attached to the first side housing 30L, as shown in FIG. 1, for example. The first evaporator air box 355L is connected to the first side outer duct 352L, a first side chimney duct 351L, and a first lower duct 353L. The air cooling system also preferably includes, attached to the second side housing 30R, a second side return duct 35R, a second side outer duct 352R, a second lower return duct 354R, the compressor 362, a battery 363, and a second evaporator air box 355R. The second evaporator air box 355R is connected to the second side outer duct 352R, a second side chimney duct 351R, and a second lower duct 353R. In a preferred embodiment, the first expansion valve 358L is housed in the first evaporator air box 355L and the second expansion valve 358L is housed in the second evaporator air box 355R.

Figure 32:
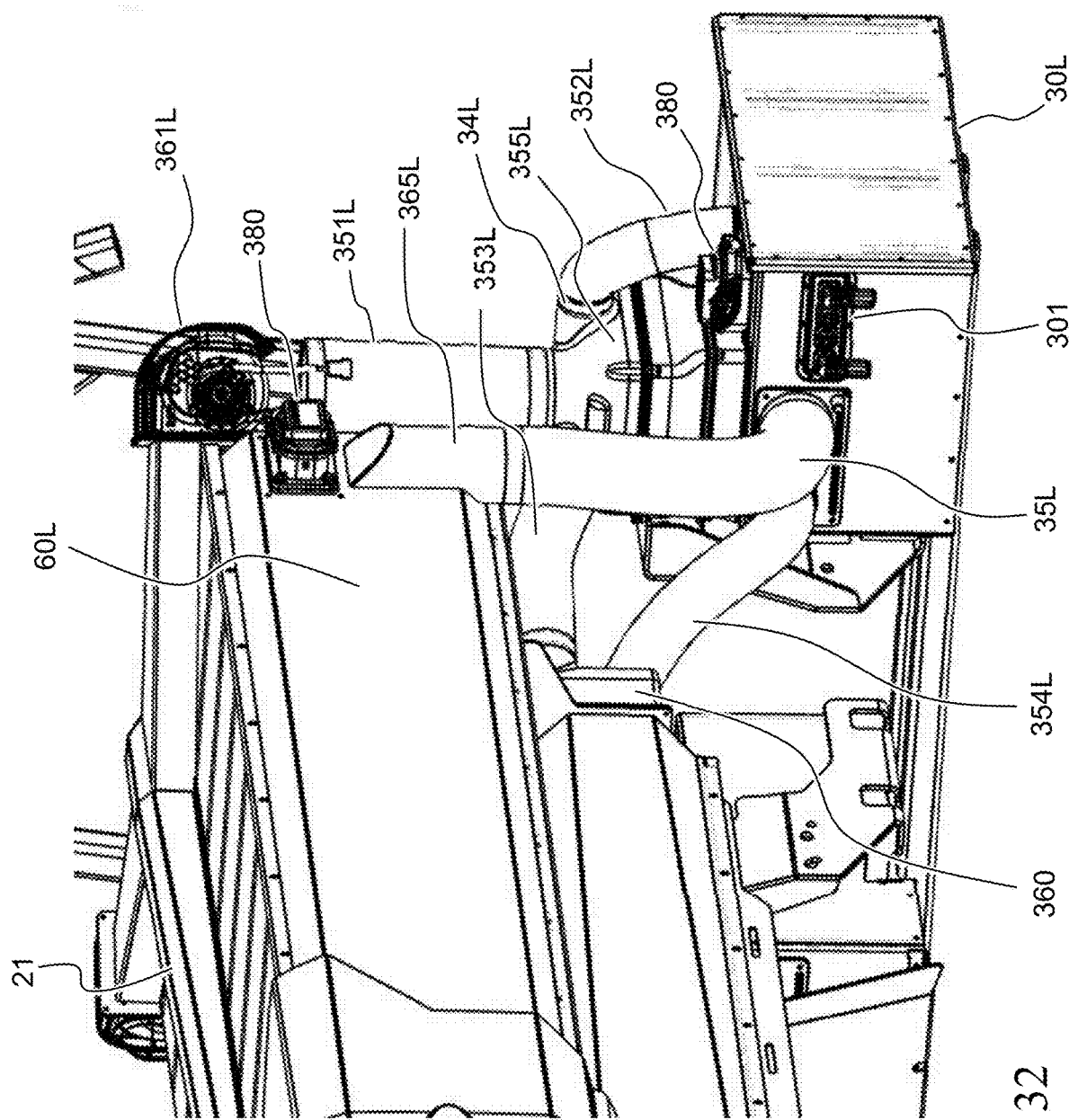
FIG. 32 shows components included in an air cooling system according to a preferred embodiment of the present invention.
Figure 33:
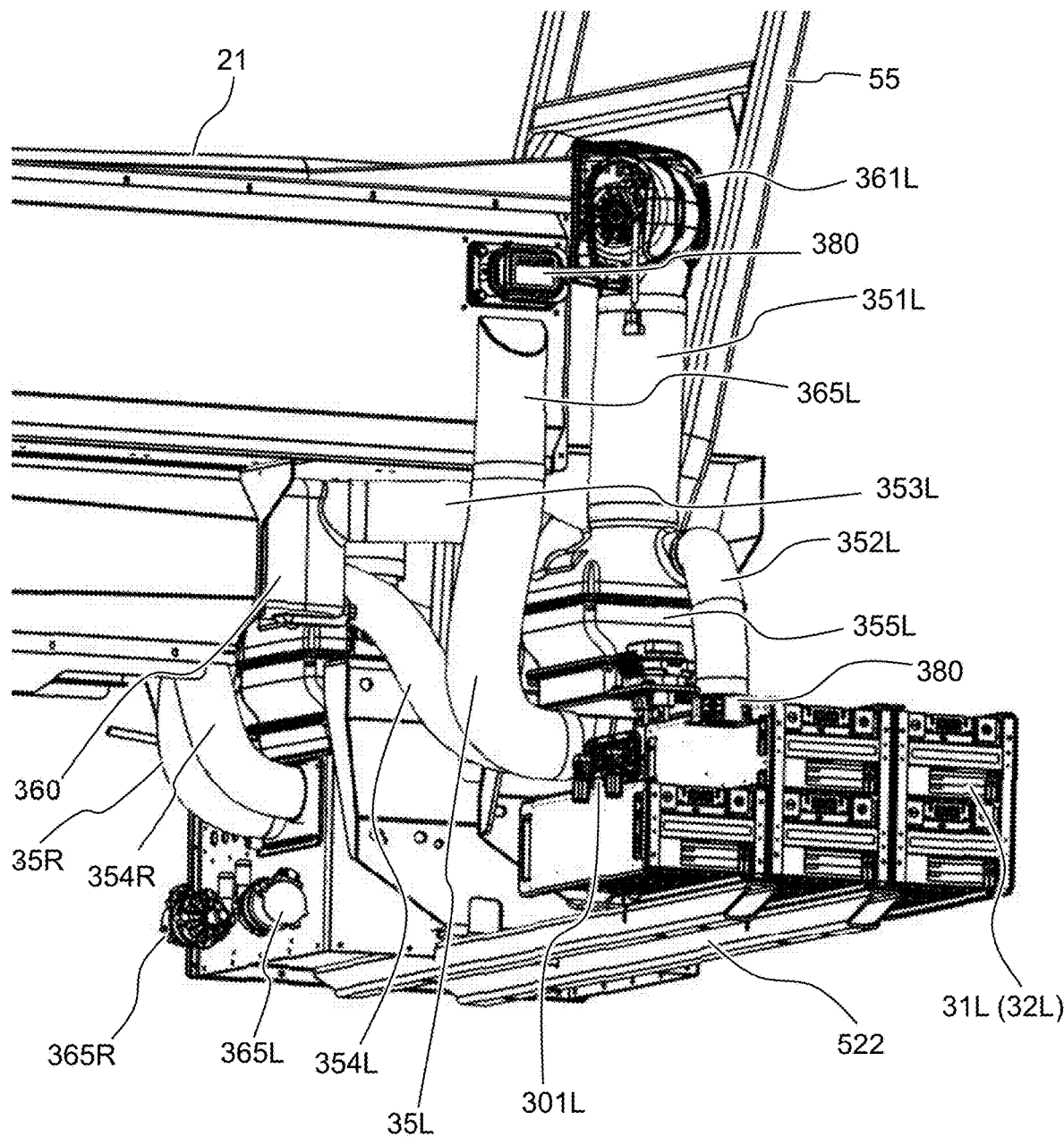
FIG. 33 shows components included in an air cooling system according to a preferred embodiment of the present invention.

In a preferred embodiment, the first side chimney duct 351L is connected between the first evaporator air box 355L and a first chimney duct blower 361L, and the second side chimney duct 351R is connected between the second evaporator air box 355R and a second chimney duct blower 361R. The first lower duct 353L is connected between the first evaporator air box 355L and a lower blower 360, and the second lower duct 353R is connected between the second evaporator air box 355R and the lower blower 360. The first side outer duct 352L is connected between the first evaporator air box 355L and the first side housing 30L, and the second side outer duct 352R is connected between the second evaporator air box 355R and the second side housing 30R. As shown in FIGS. 32 and 34, for example, the first side return duct 35L is connected between the first side housing 30L and a first return housing 365L attached to the left side cover 60L of the first battery housing 60, and the second side return duct 35R is connected between the second side housing 30R and a second return housing 365R attached to the right side cover 60R of the first battery housing 60. The first lower return duct 354L is connected between the first side housing 30L and a return duct opening 370 attached to a right rear of the second battery housing 70, and the second lower return duct 354R is connected between the second side housing 30R and the return duct opening 370.

Next, a flow of air through the air cooling system according to a preferred embodiment of the present disclosure will be described. The first evaporator air box 355L and the second evaporator air box 355R each cool air circulating through the air cooling system. For example, the first evaporator air box 355L includes first evaporator coil 3551L that cool air circulating through the air cooling system, and the second evaporator air box 355R includes second evaporator coil 3551R that cool air circulating through the air cooling system. Each of the first evaporator air box 355L and the second evaporator air box 355R includes a first side (e.g., a bottom side) at which warmed air enters the evaporator air box and a second side (e.g., a top side) at which cool air exits the evaporator air box after passing through the evaporator coil included in the respective evaporator air box.

In a preferred embodiment, the cool air that exits the second side of the first evaporator air box 355L flows to the first chimney duct 351L, the first side outer duct 352L, and the first lower duct 353L. As discussed above, the first chimney duct 351L is connected to a first chimney duct blower 361L that is provided at an upper end of the first chimney duct 351L. The first chimney duct blower 361L preferably includes a blower motor and fan which directs cooled air from the first evaporator air box 355L through the first chimney duct 351L and into a first portion 21L (a left side portion) of an upper cooling duct 21, discussed in more detail below. In a preferred embodiment, the first side outer duct 352L is connected to a first side blower 34L that directs cool air from the first evaporator air box 355L into the first side housing 30L to cool the first side battery modules 31L, as shown in FIG. 32, for example. The first lower duct 353L is connected to a lower blower 360 that directs cool air from the first evaporator air box 355L into the second battery housing 70, also discussed in more detail below.

Warmed air returns to the first evaporator air box 355L (i.e., to the first side of the first evaporator air box 355L) through an inside of the first side housing 30L, which receives cool air through the first side outer duct 352L, as discussed above. The inside of the first side housing 30L also receives air from the first side return ducting 35L and the first lower return duct 354L, which can also cool the first side battery modules 31L.

In a preferred embodiment, the cool air that exits the second side of the second evaporator air box 355R flows to the second chimney duct 351R, the second side outer duct 352R, and the second lower duct 353R. As discussed above, the second chimney duct 351R is connected to a second chimney duct blower 361R that is provided at an upper end of the second chimney duct 351R. The second chimney duct blower 361R preferably includes a blower motor and fan that directs cooled air from the second evaporator air box 355R through the second chimney duct 351R into a second portion 21R (a right side portion) of the upper cooling duct 21, discussed in more detail below. The second side outer duct 352R is connected to a second side blower 34R that directs cool air from the second evaporator air box 355R into the second side housing 30R to cool the second side battery modules 31R, as shown in FIG. 34, for example. The second lower duct 353R is connected to the lower blower 360 which directs cool air from the second evaporator air box 355R into the second battery housing 70, also discussed in more detail below.

Warmed air returns to the second evaporator air box 355R (i.e., to the first side of the second evaporator air box 355R) through an inside of the second side housing 30R, which receives cool air through the second side outer duct 352R, as discussed above. The inside of the second side housing 30R also receives air from a second side return duct 35R and a second lower return duct 354R, which can also cool the second side battery modules 31R.

As discussed above, the first chimney duct blower 361L directs cooled air from the first evaporator air box 355L through the first chimney duct 351L and into the first portion/duct 21L (a left side portion) of the upper cooling duct 21, and the second chimney duct blower 361R directs cooled air from the second evaporator air box 355R through the second chimney duct 351R into the second portion/duct 21R (a right side portion) of the upper cooling duct 21. The cooled air from the first portion 21L and the second portion 21R flows into a center portion 21C of the upper cooling duct 21, from which the cooled air flows into a central portion of the first battery housing 60 along the vertical partition wall 69 in a front-rear direction and an up-down direction. For example, the solid arrows in FIGS. 20 and 21 show a flow of cool air CA along the vertical partition wall 69 in the front-rear direction and the up-down direction.

Figure 37:
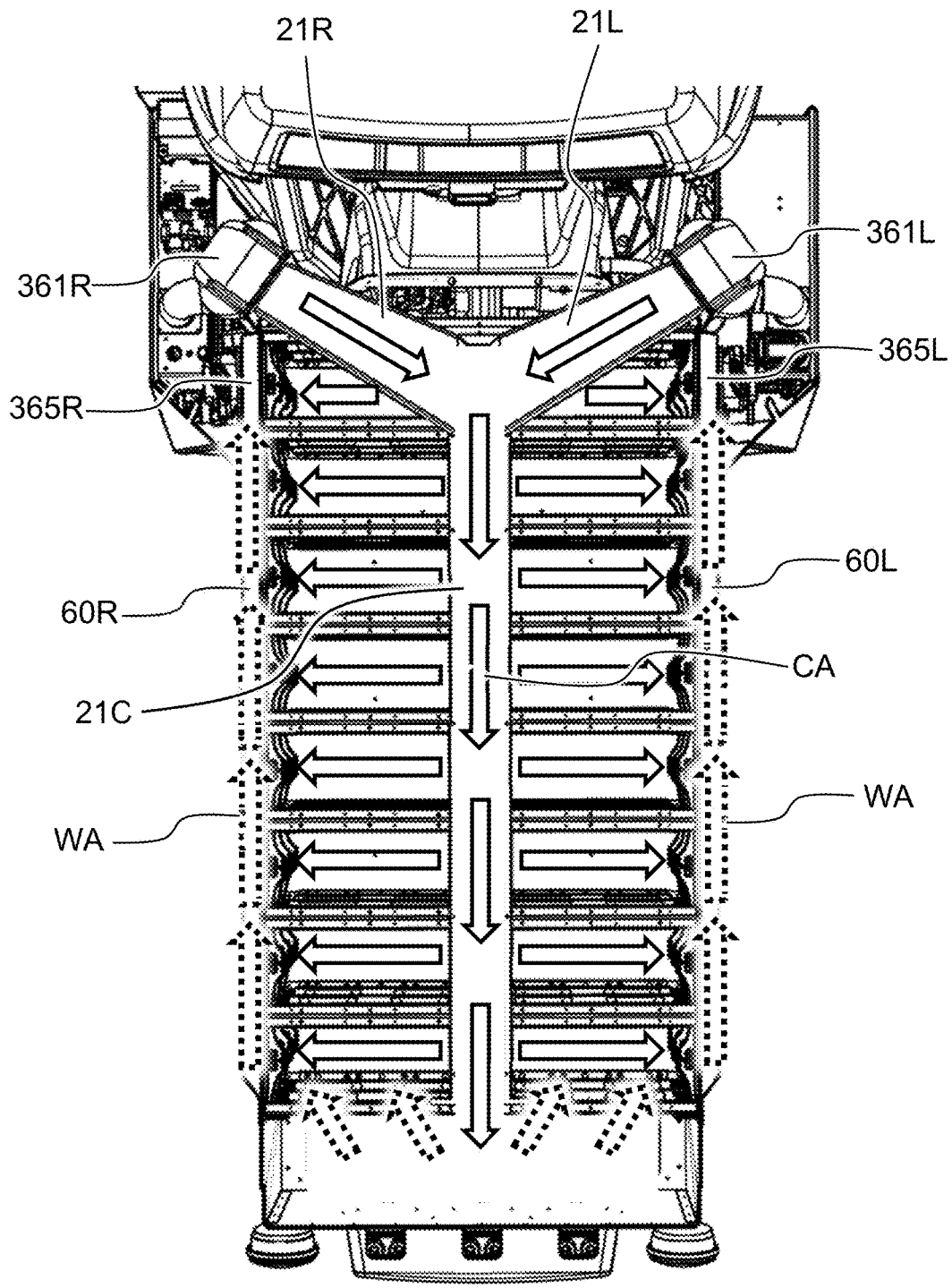
FIG. 37 shows a plan view of an example of an air flow through a first battery housing according to a preferred embodiment of the present invention.
Figure 38A:
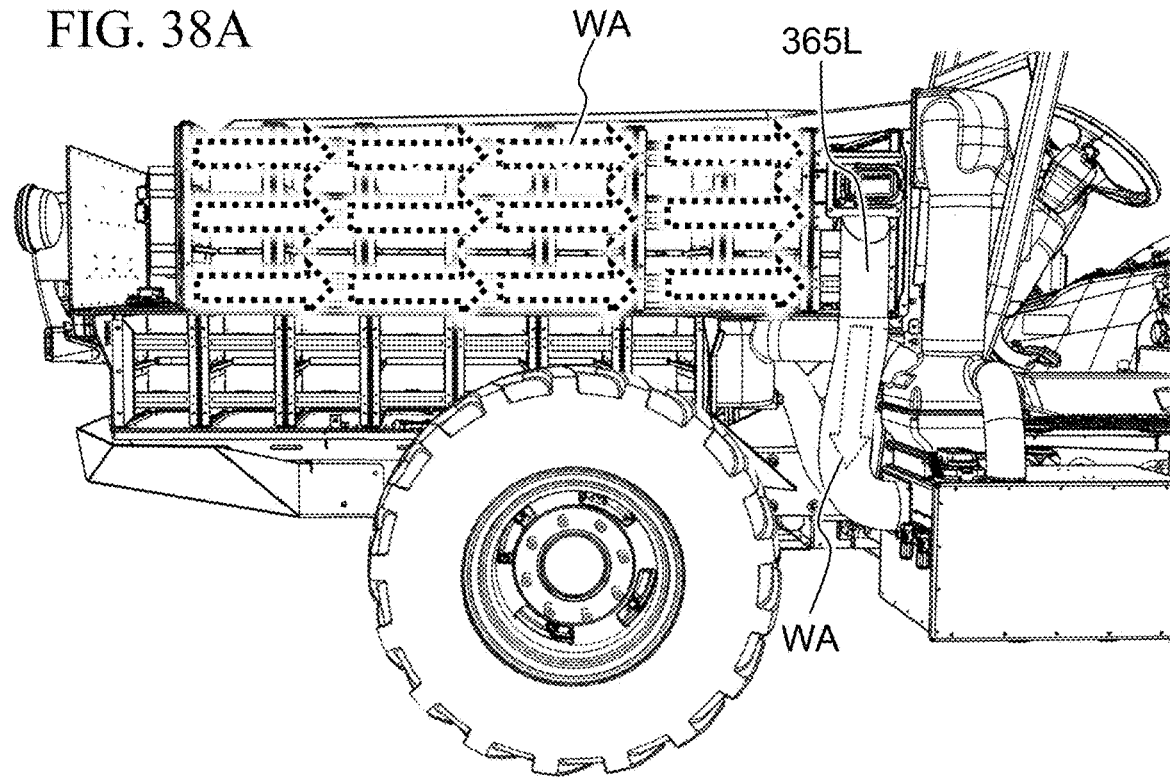
FIG. 38A shows a left side view of an example of an air flow through a first battery housing according to a preferred embodiment of the present invention.
Figure 38B:
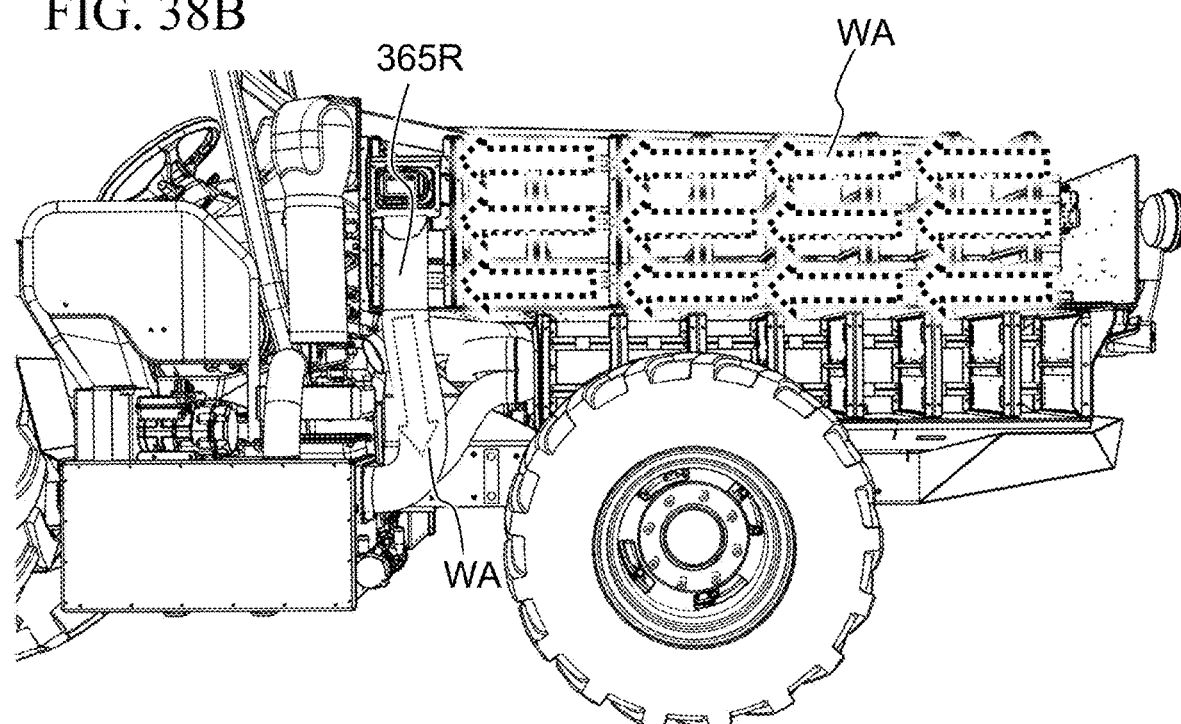
FIG. 38B shows a right side view of an example an of air flow through a first battery housing according to a preferred embodiment of the present invention.

In a preferred embodiment of the present invention, the cool air CA that flows along the vertical partition wall 69 then flows in lateral directions (width directions of the vehicle) across the first battery modules 61 included in the first battery module bank 62 housed in the first portion 60A of the first battery housing 60 and across the first battery modules 61 included in the second battery module bank 63 housed in the second portion 60B of the first battery housing 60. For example, FIG. 37 shows a plan view of an example of the air flow through the first battery housing 60 in which the solid arrows show a flow of cool air CA and the dashed arrows show a flow of warm air WA. FIG. 38A shows a left side view of an example of the air flow through the first battery housing 60, and FIG. 38B shows a right side view of an example of the air flow through the first battery housing 60.

As shown in FIG. 37, the cool air CA flows from the center portion 21C of the upper cooling duct 21/the vertical partition wall 69 in a first lateral direction (a leftward direction) across the first battery modules 61 included in the first battery module bank 62 housed in the first portion 60A of the first battery housing 60 before reaching the first side cover 60L as warm air (warm air that has been used to cool the first battery modules 61 included in the first battery module bank 62). In a preferred embodiment, the cool air CA that flows in the first lateral direction flows across top and/or bottom surfaces of the first battery modules 61 housed in the first portion 60A of the first battery housing 60. The warm air that reaches the first side cover 60L then flows rearwardly along the first side cover 60L before flowing into the first return housing 365L. When the warm air flows rearwardly along the first side cover 60L, the warm air flows across terminal ends of the first battery modules 61 included in the first battery module bank 62.

In a preferred embodiment, the first return housing 365L is connected to an upper end of the first side return duct 35L and guides the warm air flowing along the first side cover 60L into the first side return duct 35L. The warm air that flows into the first side return duct 35L then flows into the first side housing 30L to which the first side return duct 35L is connected.

As shown in FIG. 37, the cool air CA also flows from the center portion 21C of the upper cooling duct 21/the vertical partition wall 69 in a second lateral direction (a right direction) across the first battery modules 61 included in the second battery module bank 63 housed in the second portion 60B of the first battery housing 60 before reaching the second side cover 60R as warm air (warm air that has been used to cool the first battery modules 61 included in the second battery module bank 63). In a preferred embodiment, the cool air CA that flows in the second lateral direction flows across top and/or bottom surfaces of the first battery modules 61 housed in the second portion 60B of the first battery housing 60. The warm air that reaches the second side cover 60R then travels rearwardly along the second side cover 60R before flowing into the second return housing 365R. When the warm air flows rearwardly along the second side cover 60R, the warm air flows across terminal ends of the first battery modules 61 included in the second battery module bank 63.

In a preferred embodiment, the second return housing 365R is connected to an upper end of the second side return duct 35R and guides the warm air flowing along the second side cover 60R into the second side return duct 35R. The warm air that flows into the second side return duct 35R then flows into the second side housing 30R to which the second side return duct 35R is connected.

In a preferred embodiment of the present invention, the cool air that flows along the vertical partition wall 69 in a front-rear direction can also flow through the inner ventilation holes 681 and into the PDU housing 80, as shown in FIGS. 15 and 37, for example. The cool air that flows into the PDU housing 80 can cool the components housed in the PDU housing 80 before exiting the PDU housing 80 as warm air through the intermediate ventilation holes 682. The warm air that leaves the PDU housing 80 through the intermediate ventilation holes 682 can flow rearwardly along the first side cover 60L toward the first return housing 365L and rearwardly along the second side cover 60R toward the second return housing 365R.

As discussed above, the lower blower 360 directs cool air from the first evaporator air box 355L through the first lower ducts 353L and into the second battery housing 70, and the lower blower 360 directs cool air from the second evaporator air box 355R through the second lower duct 353R and into the second battery housing 70. In a preferred embodiment, the cool air from the first evaporator air box 355L and the cool air from the second evaporator air box 355R flows into the second battery housing 70 at a first side (e.g., a left side) of the second battery housing 70 in a left-right direction of the vehicle. In a preferred embodiment, the lower blower 360 is attached to a rear surface of the second battery housing 70 and on the first side of the second battery housing 70 in the left-right direction of the vehicle.

Figure 39:
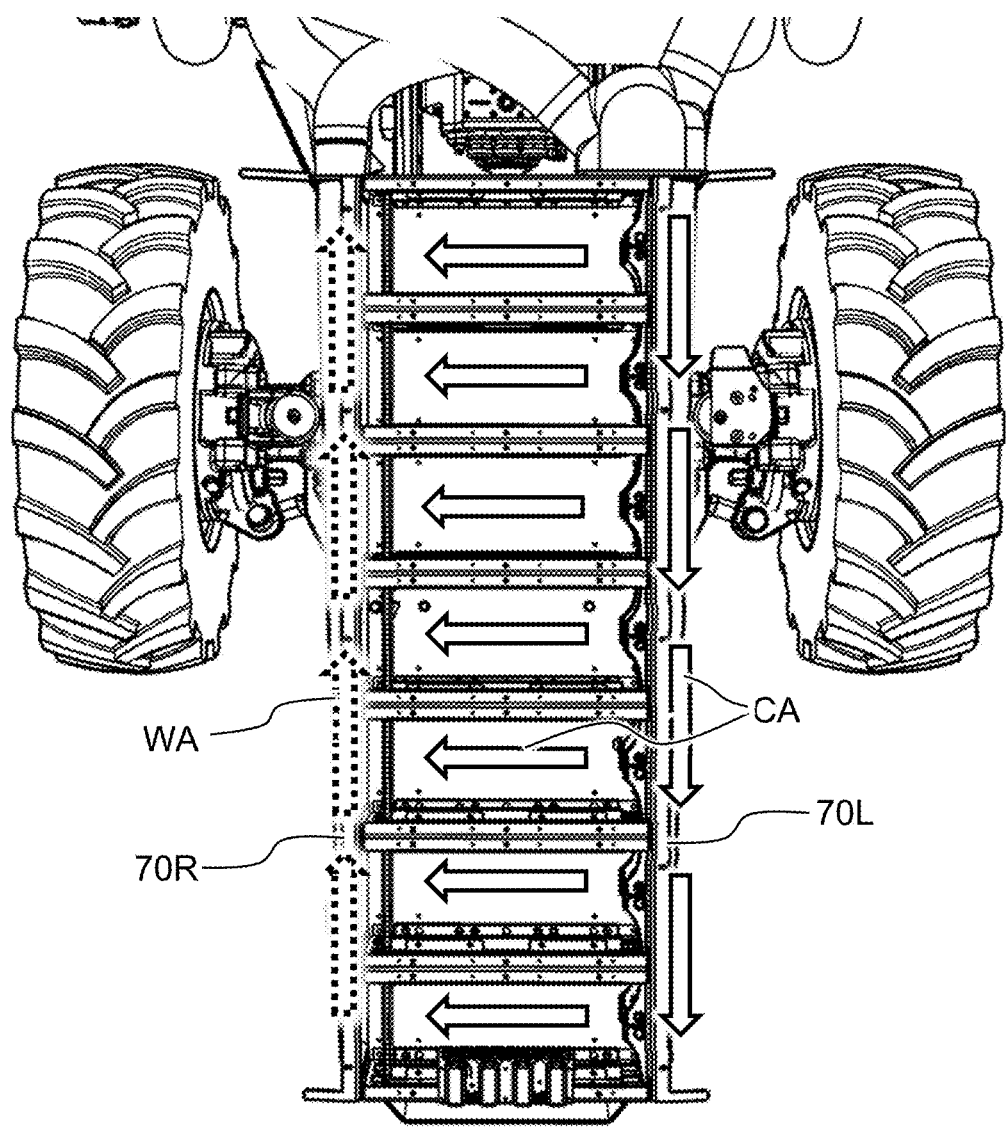
FIG. 39 shows a plan view of an example of an air flow through a second battery housing according to a preferred embodiment of the present invention.
Figure 40A:
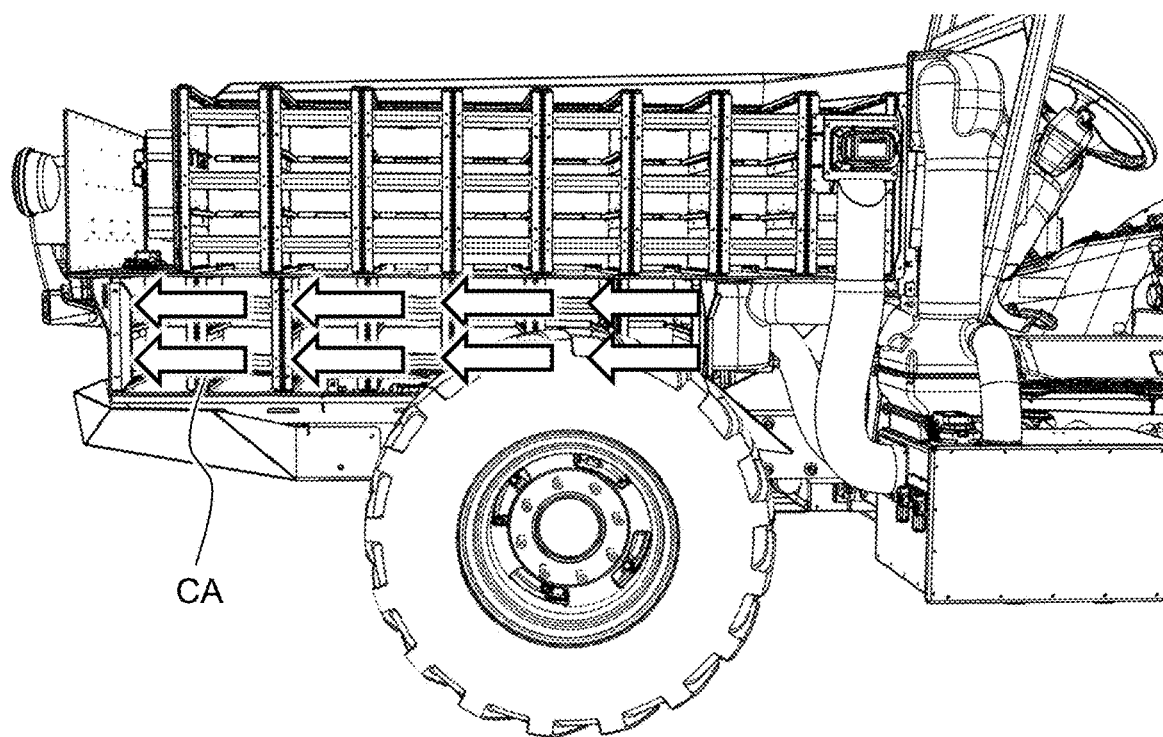
FIG. 40A shows a left side view of an example of an air flow through a second battery housing according to a preferred embodiment of the present invention.
Figure 40B:
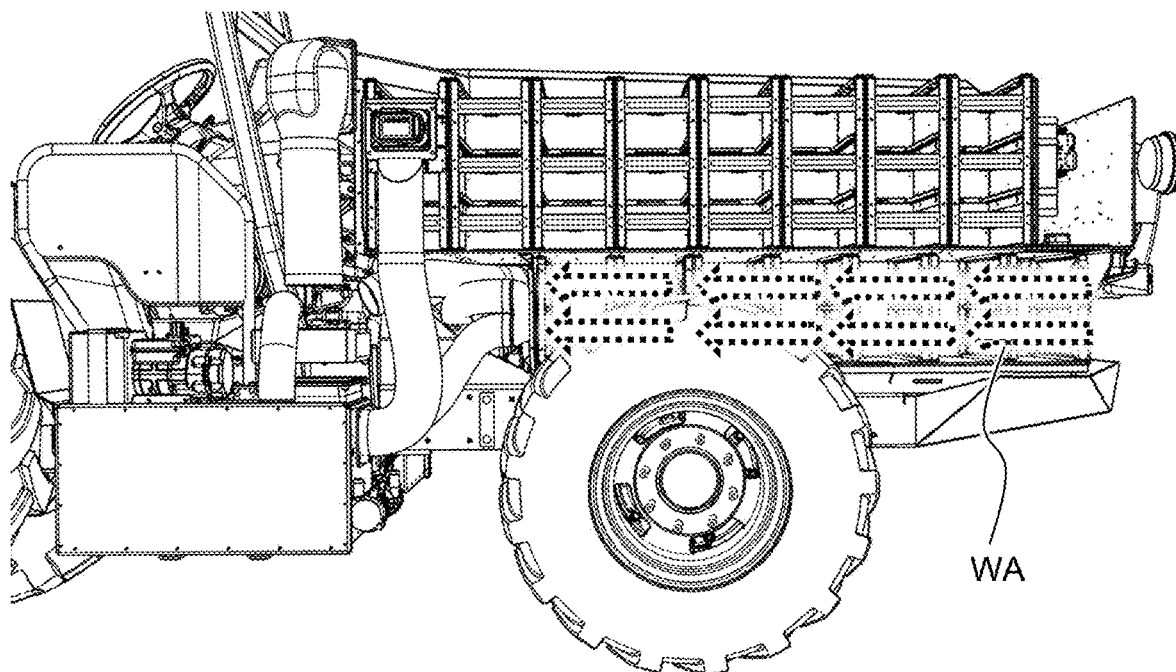
FIG. 40B shows a right side view of an example of the air flow through the second battery housing 70.

In a preferred embodiment of the present invention, the cool air CA directed by the lower blower 360 flows along the first side cover 70L in a front-rear direction and also flows in a lateral direction (a width directions of the vehicle) across the second battery modules 71 included in the third battery module bank 72 housed in the second battery housing 70. For example, FIG. 39 shows a plan view of an example of the air flow through the second battery housing 70 in which the solid arrows show a flow of cool air CA and the dashed arrows show a flow of warm air WA. FIG. 40A shows a left side view of an example of the air flow through the second battery housing 70, and FIG. 40B shows a right side view of an example of the air flow through the second battery housing 70.

As shown in FIG. 39, the cool air CA flows from the first side cover 70L in a first lateral direction (a rightward direction) across the second battery modules 71 included in the third battery module bank 72 housed in the second battery housing 70 before reaching the second side cover 70R as warm air (warm air that has been used to cool the second battery modules 71 included in the third battery module bank 72). In a preferred embodiment, the cool air CA that flows in the first lateral direction flows across top and/or bottom surfaces of the second battery modules 71 housed in the second battery housing 70. The warm air that reaches the second side cover 70R then travels rearwardly along the second side cover 70R before flowing into the return duct opening 370. In a preferred embodiment, when the warm air flows rearwardly along the second side cover 70R, the warm air flows across terminal ends of the second battery modules 71 included in the third battery module bank 72.

In a preferred embodiment, the return duct opening 370 is connected to a forward end of the first lower return duct 354L and a forward end of the second lower return duct 354R and guides the warm air flowing along the second side cover 70R into the first lower return duct 354L and the second lower return duct 354R. In a preferred embodiment, a first portion of the warm air that flows into the return duct opening 370 flows through the first lower return duct 354L into the first side housing 30L, and a second portion of the warm air that flows into the return duct opening 370 flows through the second lower return duct 354R into the second side housing 30R.

In a preferred embodiment of the present invention, a volume of the first battery housing 60 is larger than a volume of the second battery housing 70. Therefore, in a preferred embodiment, a combined volume of the cool air from the second side of the first evaporator coil 3551L directed by the first chimney duct blower 361L (e.g., a first portion of the cool air from the second side of the first evaporator coil 3551L) and the cool air from the second side of the second evaporator coil 3551R directed by the second chimney duct blower 361R (e.g., a first portion of the cool air from the second side of the second evaporator coil 3551R) is greater than a combined volume of the cool air from the second side of the first evaporator coil 3551L (e.g., a second portion of the cool air from the second side of the first evaporator coil 3551L) and the cool air from the second side of the second evaporator coil 3551R (e.g., a second portion of the cool air from the second side of the second evaporator coil 3551R) directed by the lower blower 360. In this way, the first battery housing 60, which has a volume larger than a volume of the second battery housing 70, receives a larger volume of cool air from the second side of the first evaporator coil 3551L and the second side of the second evaporator coil 3551R than does the second battery housing 70.

In a preferred embodiment of the present invention, a volume of the first side housing 30L is less than the volume of the second battery housing 70, and a volume of the second side housing 30R is less than the volume of the second battery housing 70. Therefore, in a preferred embodiment, a volume of the cool air from the second side of the first evaporator coil 3551L directed by the first side blower 34L (e.g., a third portion of the cool air from the second side of the first evaporator coil 3551L) is less than the combined volume of the cool air from the second side of the first evaporator coil 3551L and the cool air from the second side of the second evaporator coil 3551R directed by the lower blower 360, and a volume of the cool air from the second side of the second evaporator coil 3551R directed by the second side blower 34R (e.g., a third portion of the cool air from the second side of the second evaporator coil 3551R) is less than the combined volume of the cool air from the second side of the first evaporator coil 3551L and the cool air from the second side of the second evaporator coil 3551R directed by the lower blower 360. In this way, the second battery housing 70, which has a volume larger than each of the first side housing 30L and the second side housing 30R, receives a larger volume of cool air from the second side of the first evaporator coil 3551L and the second side of the second evaporator coil 3551R than does the first side housing 30L and the second side housing 30R.

In a preferred embodiment of the present invention, one or more temperature sensors are provided to measure a temperature of each of the first battery modules 61, the second battery modules 71, the first side battery modules 31L, and the second side battery modules 31R. For example, in a preferred embodiment, each of the battery modules included in the first battery modules 61, the second battery modules 71, the first side battery modules 31L, and the second side battery modules 31R can include a temperature sensor to measure the temperature of the respective battery module.

In a preferred embodiment, the first chimney duct blower 361L, the second chimney duct blower 361R, the lower blower 360, the first side blower 34L, and the second side blower 34R can be operated in accordance with the temperatures detected by the one or more temperature sensors. For example, when one or more of the temperatures sensors measure a temperature above a predetermined temperature threshold, the first chimney duct blower 361L, the second chimney duct blower 361R, the lower blower 360, the first side blower 34L, and the second side blower 34R can be turned ON (e.g., controlled to direct cool air). For example, in a preferred embodiment of the present invention, the first chimney duct blower 361L, the second chimney duct blower 361R, the lower blower 360, the first side blower 34L, and the second side blower 34R can be turned ON when one or more of (at least one of) the temperature sensors measures a temperature above a first predetermined temperature threshold (e.g., a turn ON target temperature) and then turn back OFF when each of the one or more of the temperatures sensors measures a temperature below a second predetermined temperature threshold (e.g., a turn OFF target temperature), for example. In a preferred embodiment, the first predetermined temperature threshold (e.g., the turn ON target temperature) is greater than the second predetermined temperature threshold (e.g., the turn OFF target temperature).

In another preferred embodiment, it is possible for the cooling system to control certain ones of the first chimney duct blower 361L, the second chimney duct blower 361R, the lower blower 360, the first side blower 34L, and the second side blower 34R based on the temperatures detected by the one or more temperature sensors. For example, in a preferred embodiment, it is possible to turn ON only the first chimney duct blower 361L and the second chimney duct blower 361R based on the temperatures detected by the one or more temperature sensors included in the first battery modules 61. Similarly, in a preferred embodiment, it is possible to turn ON only the lower blower 360 based on the temperatures detected by the one or more temperature sensors included in the second battery modules 71. Similarly, in a preferred embodiment, it is possible to turn ON only the first side blower 34L and the second side blower 34R based on the temperatures detected by the one or more temperature sensors included in the first side battery modules 31L and the second side battery modules 31R.

In a preferred embodiment of the present invention, the secondary DC-to-DC converter provides power to one or more accessories of the vehicle including the first chimney duct blower 361L, the second chimney duct blower 361R, the lower blower 360, the first side blower 34L, the second side blower 34R, the first coolant pump 356L, and the second coolant pump 356R, for example. The secondary DCDC 382 and the OBC/DCDC 7 preferably output power to a common 12V bus. The common 12V bus is preferably buffered by the battery 363 which is supported on an upper surface of the second side housing 30R.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A vehicle comprising:
a chassis;
a housing to house one or more battery modules, the housing being supported by the chassis;
an electric motor to receive electrical power from the one or more battery modules;
a liquid cooling system including:
a radiator to cool a coolant when the coolant flows through the radiator, and
one or more coolant pumps connected to the radiator to circulate the coolant;
an air cooling system to cool the one or more battery modules, the air cooling system including:
a compressor;
a condenser; and
one or more evaporator coils;
a roof supported by the chassis; and
a blower fan to direct air across the radiator; wherein
the radiator and the condenser are located adjacent to each other;
the blower fan is mounted on the roof adjacent to the radiator;
the blower fan includes a first blower fan and a second blower fan;
the first blower fan is located between the condenser and the radiator; and
the second blower fan is located forward of both the condenser and the radiator in a front-rear direction of the vehicle.

2. The vehicle according to claim 1, wherein
the housing includes:
a first housing supported by the chassis, and
a first side housing and a second side housing arranged on opposing lateral sides of the first housing;
each of the first housing, the first side housing, and the second side housing house a portion of the one or more battery modules;
the one or more coolant pumps include a first coolant pump and a second coolant pump; and
the first coolant pump and the second coolant pump are both mounted on the second side housing.

3. The vehicle according to claim 2, further comprising:
a cabin frame that is connected to the chassis and supports the roof of the vehicle; wherein
a fluid connection between the radiator and the first coolant pump and a fluid connection between the radiator and the second coolant pump extend through internal portions of the cabin frame.

4. The vehicle according to claim 2, wherein
the first coolant pump and the second coolant pump are located adjacent to one another on a front surface of the second side housing.

5. The vehicle according to claim 1, wherein
the condenser is located forward of the radiator in the front-rear direction of the vehicle.

6. The vehicle according to claim 1, wherein
the liquid cooling system further includes:
an inverter to be cooled by the coolant; and
an electric motor to be cooled by the coolant and connected to the inverter; and
the inverter is located forward of the electric motor in the front-rear direction of the vehicle.

7. The vehicle according to claim 6, wherein
the housing includes:
a first housing supported by the chassis; and
a first side housing and a second side housing arranged on opposing lateral sides of the first housing;
each of the first housing, the first side housing, and the second side housing house a portion of the one or more battery modules; and
the inverter is mounted to a bottom of the chassis and under the first housing.

8. A vehicle comprising:
a chassis;
a housing to house one or more battery modules, the housing being supported by the chassis;
an electric motor to receive electrical power from the one or more battery modules;
a liquid cooling system including:
a radiator to cool a coolant when the coolant flows through the radiator;
one or more coolant pumps connected to the radiator to circulate the coolant;
an inverter to be cooled by the coolant;

an electric motor to be cooled by the coolant and connected to the inverter;

a heat exchanger through which the coolant and another liquid can circulate;

an Onboard Battery Charger with a DC-to-DC converter to be cooled by the coolant; and a secondary DC-to-DC converter to be cooled by the coolant; and an air cooling system to cool the one or more battery modules, the air cooling system including:

a compressor;

a condenser; and one or more evaporator coils; wherein the radiator and the condenser are located adjacent to each other; and the one or more coolant pumps include a first coolant pump and a second coolant pump to circulate the coolant.

9. The vehicle according to claim 8, wherein the first coolant pump, the inverter, and the electric motor are included in a first coolant path circuit; and the second coolant pump, the heat exchanger, the Onboard Battery Charger with the DC-to-DC converter, and the secondary DC-to-DC converter are included in a second coolant path circuit; and the first coolant path circuit and the second coolant path circuit are parallel coolant path circuits.

10. The vehicle according to claim 9, further comprising:

a first coolant path coupling; and a second coolant path coupling; wherein the first coolant path coupling is located between the radiator and each of the first coolant pump and the second coolant pump; and the second coolant path coupling is located between the radiator and an end of the first coolant path circuit and between the radiator and an end of the second coolant path circuit.

11. The vehicle according to claim 9, wherein in the first coolant path circuit, the coolant flows from the first coolant pump to the inverter and from the inverter to the electric motor.

12. The vehicle according to claim 9, wherein in the second coolant path circuit, the coolant flows from the second coolant pump to the heat exchanger, from the heat exchanger to the Onboard Battery Charger with the DC-to-DC converter, and from the Onboard Battery Charger with the DC-to-DC converter to the secondary DC-to-DC converter.

13. The vehicle according to claim 8, wherein the another liquid includes a hydraulic fluid; and the heat exchanger removes heat from the another liquid when the coolant and the another liquid are circulated through the heat exchanger.

14. A vehicle comprising:

a chassis;

a housing to house one or more battery modules, the housing being supported by the chassis;

an electric motor to receive electrical power from the one or more battery modules;

a liquid cooling system including:

a radiator to cool a coolant when the coolant flows through the radiator; and one or more coolant pumps connected to the radiator to circulate the coolant;

a heat exchanger through which the coolant and another liquid can circulate;

an Onboard Battery Charger with a DC-to-DC converter to be cooled by the coolant; and a secondary DC-to-DC converter to be cooled by the coolant; and an air cooling system to cool the one or more battery modules, the air cooling system including:

a compressor;

a condenser; and one or more evaporator coils; wherein the radiator and the condenser are located adjacent to each other.

15. The vehicle according to claim 14, wherein the housing includes:

a first housing supported by the chassis; and a first side housing and a second side housing arranged on opposing lateral sides of the first housing;

each of the first housing, the first side housing, and the second side housing house a portion of the one or more battery modules; and the Onboard Battery Charger with the DC-to-DC converter is mounted to a bottom of the chassis and under the first housing.

* * * * *